(12) United States Patent
Kim et al.

(10) Patent No.: US 12,321,526 B2
(45) Date of Patent: Jun. 3, 2025

(54) WEARABLE ELECTRONIC DEVICE FOR DISPLAYING VIRTUAL OBJECT AND METHOD OF CONTROLLING THE SAME

(71) Applicant: SAMSUNG ELECTRONICS CO., LTD., Suwon-si (KR)

(72) Inventors: Kyunghwa Kim, Suwon-si (KR); Shinjae Jung, Suwon-si (KR); Wonjun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 117 days.

(21) Appl. No.: 17/988,451

(22) Filed: Nov. 16, 2022

(65) Prior Publication Data
US 2023/0152900 A1   May 18, 2023

Related U.S. Application Data

(63) Continuation of application No. PCT/KR2022/016844, filed on Oct. 31, 2022.

(30) Foreign Application Priority Data

Nov. 16, 2021  (KR) .................. 10-2021-0158032
Jan. 7, 2022   (KR) .................. 10-2022-0002895

(51) Int. Cl.
*G06F 3/01*   (2006.01)
*G02B 27/01*  (2006.01)
*G06T 3/40*   (2024.01)

(52) U.S. Cl.
CPC .......... *G06F 3/017* (2013.01); *G02B 27/0172* (2013.01); *G06F 3/011* (2013.01); *G06T 3/40* (2013.01); *G02B 2027/0138* (2013.01)

(58) Field of Classification Search
CPC ...... G06F 3/017; G06F 3/011; G02B 27/0172; G02B 2027/0138; G06T 3/40
(Continued)

(56) References Cited

U.S. PATENT DOCUMENTS 9,497,501 B2   11/2016   Mount et al.
9,898,844 B2    2/2018   Mullins
(Continued)

FOREIGN PATENT DOCUMENTS

JP   2011-128220 A    6/2011
JP   6227732 B1      11/2017
(Continued)

OTHER PUBLICATIONS

International Search Report (PCT/ISA/210) issued by the International Searching Authority on Jan. 27, 2023 in International Application No. PCT/KR2022/016844.
(Continued)

*Primary Examiner* — Xiaolan Xu
(74) *Attorney, Agent, or Firm* — Sughrue Mion, PLLC

(57) ABSTRACT

A wearable electronic device, including a display, a camera, at least one sensor, memory, and at least one processor configured to: based on receiving, through the camera, a first user input for executing the workspace corresponding to a first space, stored in the memory, in a second space different from the first space, obtain spatial information about the second space using the at least one sensor, wherein the workspace includes at least one virtual objects, and display the at least one virtual object on the display, based on the spatial information about the second space.

16 Claims, 43 Drawing Sheets

(58) Field of Classification Search
USPC .......................................................... 348/53
See application file for complete search history.

(56) References Cited

U.S. PATENT DOCUMENTS

| | | | |
|---|---|---|---|
| 10,740,971 | B2 | 8/2020 | Ramsby et al. |
| 11,348,327 | B1 | 5/2022 | Ha et al. |
| 2011/0140994 | A1 | 6/2011 | Noma |
| 2012/0113092 | A1 | 5/2012 | Bar-Zeev et al. |
| 2012/0194541 | A1 | 8/2012 | Kim et al. |
| 2014/0306866 | A1 | 10/2014 | Miller et al. |
| 2015/0187108 | A1* | 7/2015 | Mullins .................. G06T 11/60 345/633 |
| 2015/0358614 | A1 | 12/2015 | Jin |
| 2019/0362557 | A1* | 11/2019 | Lacey ....................... G06T 5/20 |
| 2020/0167970 | A1 | 5/2020 | Kim et al. |
| 2021/0133448 | A1 | 5/2021 | Kim et al. |

FOREIGN PATENT DOCUMENTS

| | | | |
|---|---|---|---|
| KR | 10-2012-0087024 | A | 8/2012 |
| KR | 10-2013-0139280 | A | 12/2013 |
| KR | 10-2015-0126938 | A | 11/2015 |
| KR | 10-2017-0125618 | A | 11/2017 |
| KR | 10-2020-0142385 | A | 12/2020 |
| KR | 10-2021-0051469 | A | 5/2021 |
| KR | 10-2282739 | B1 | 7/2021 |
| KR | 10-2303115 | B1 | 9/2021 |
| KR | 10-2581146 | B1 | 9/2023 |

OTHER PUBLICATIONS

Written Opinion (PCT/ISA/237) issued by the International Searching Authority on Jan. 27, 2023 in International Application No. PCT/KR2022/016844.

* cited by examiner

WEARABLE ELECTRONIC DEVICE FOR DISPLAYING VIRTUAL OBJECT AND METHOD OF CONTROLLING THE SAME

CROSS REFERENCE TO RELATED APPLICATIONS

This application is a bypass continuation of International Application No. PCT/KR2022/016844 designating the United States, filed on Oct. 31, 2022 in the Korean Intellectual Property Receiving Office, which claims priority to Korean Patent Application No. 10-2021-0158032, filed on Nov. 16, 2021, and Korean Patent Application No. 10-2022-0002895, filed on Jan. 7, 2022, the disclosures of which are all hereby incorporated herein by reference for all purposes as if fully set forth herein.

BACKGROUND

1. Field

The disclosure relates to a wearable electronic device for displaying a virtual object, and a method of controlling the same.

2. Description of Related Art

Along with the development of electronic and communication technologies, an electronic device may become so small and lightweight that a user may use the electronic device without great inconvenience, even when it is worn on the user's body. For example, wearable electronic devices such as head mounted displays (HMDs), smart watches (or bands), contact lens-type devices, ring-type devices, glove-type devices, shoe-type devices, or clothing-type devices are commercially available. Because the wearable electronic devices may be directly worn on the body, portability and user accessibility may be improved.

An HMD is a device used while being worn on a user's head or face, and may provide augmented reality (AR) to the user. For example, the HMD that provides AR may be implemented in the form of glasses, and may provide information about objects in the form of images or text to the user in at least a partial space of the user's field of view.

In an augmented reality (AR) environment, when a wearable electronic device is used, it may be difficult to smoothly make a motion to press a virtual button in the air or a user movement with a depth according to a surrounding situation, and to clearly recognize a sense of distance to a virtual object. When an action is made with a whole arm for a long time, physical discomfort or pain may be caused.

In the AR environment, an operation of customizing a workspace by selecting an application and arranging virtual objects by a user may require a lot of time and effort, and if all information is reset when a device is shut down, this may cause inconvenience.

SUMMARY

Provided are a wearable electronic device for implementing a workspace customized by a user, while alleviating position restrictions in an AR environment, and a method of controlling the same.

Additional aspects will be set forth in part in the description which follows and, in part, will be apparent from the description, or may be learned by practice of the presented embodiments.

In accordance with an aspect of the disclosure, a wearable electronic device includes a display, a camera, at least one sensor, memory, and at least one processor. The at least one processor is configured to: based on receiving, through the camera, a first user input for executing the workspace corresponding to the first space, in a second space different from the first space, obtain spatial information about the second space using the at least one sensor, wherein the workspace including at least one virtual object, and display the at least one virtual object on the display, based on the spatial information about the second space.

The workspace may be obtained based on a second user input for positioning the at least one virtual object in the first space, the at least one virtual object corresponding to at least one application, and the second user input may include at least one of a gesture input received through the camera and a user input received through an external electronic device connected to the wearable electronic device.

The spatial information about the second space may include information about a space available to a user, and the at least one processor may be further configured to obtain the information about the space available to the user based on at least one of distances to a plurality of objects included in the second space, and sizes of at least some of the plurality of objects.

The at least one processor may be further configured to, based on a size of the space available to the user being less than a specified value based on the information about the space available to the user, change at least one of a size, a shape, or a position of a virtual object included in the workspace, and display the changed virtual object on the display.

The at least one processor may be further configured to, based on receiving a third user input for selecting an object from among a plurality of objects included in the second space as a reference object for executing the workspace, position the at least one virtual object based on the reference object.

The at least one processor may be further configured to, based on identifying that the at least one virtual object includes a non-displayable virtual object which is not displayable in the second space, display a different virtual object related to the non-displayable virtual object at a position corresponding to the non-displayable virtual object.

The at least one processor may be further configured to identify that the non-displayable virtual object is not displayable in the second space based on at least one application corresponding to the workspace being not executable in the second space, or based on a real object, to which the non-displayable virtual object is intended to be anchored, being not included in the second space.

The at least one processor may be further configured to, based on a first function of an application executed in the workspace being mapped to the first space, and a second function of the application being mapped to the second space, display a virtual object related to the second function instead of a virtual object related to the first function.

The at least one processor may be further configured to change at least one of a size or a shape of the at least one virtual object based on the spatial information about the second space, and display the changed virtual object on the display.

The at least one processor may be further configured to change a position the at least one virtual object based on the spatial information about the second space, and display the at least one virtual object at the changed position on the display.

In accordance with an aspect of the disclosure, a method of controlling a wearable electronic device includes based on receiving, through a camera, a first user input for executing a workspace corresponding to a first space in a second space different from the first space, the workspace being stored in a memory, obtaining spatial information about the second space using at least one sensor; and displaying at least one virtual object included in the workspace on a display, based on the spatial information about the second space.

The workspace may be obtained based on a second user input for positioning the at least one virtual object in the first space, the at least one virtual object corresponding to at least one application, and the second user input may include at least one of a gesture input received through the camera and a user input received through an external electronic device connected to the wearable electronic device.

The spatial information about the second space may include information about a space available to a user, and the method may further include obtaining the information about the space available to the user based on at least one of distances to a plurality of objects included in the second space, and sizes of at least some of the plurality of objects.

The displaying of the at least one virtual object on the display may include, based on a size of the space available to the user being less than a specified value based on the information about the space available to the user, changing at least one of a size, a shape, or a position of a virtual object included in the workspace, and displaying the changed virtual object on the display.

The method may further include, based on receiving a third user input for selecting an object from among a plurality of objects included in the second space as a reference object for executing the workspace, positioning the at least one virtual object based on the reference object.

The displaying of the at least one virtual object on the display may include, based on identifying that the at least one virtual object includes a non-displayable virtual object which is not displayable in the second space, displaying a different virtual object related to the non-displayable virtual object at a position corresponding to the non-displayable virtual object.

The displaying of the at least one virtual object on the display may include identifying that the non-displayable virtual object is not displayable in the second space based on at least one application corresponding to the workspace being not executable in the second space, or based on a real object, to which the non-displayable virtual object is intended to be anchored, being not included in the second space.

The displaying of the at least one virtual object on the display may include, based on a first function of an application executed in the workspace being mapped to the first space, and a second function of the application being mapped to the second space, displaying a virtual object related to the second function instead of a virtual object related to the first function.

The displaying of the at least one virtual object on the display may include changing at least one of a size or a shape of the at least one virtual object based on the spatial information about the second space, and displaying the changed virtual object on the display.

The displaying of the at least one virtual object on the display may include changing a position of the at least one virtual object based on the spatial information about the second space, and displaying the at least one virtual object at the changed position on the display.

According to an embodiment of the disclosure, even when it is impossible to fully implement a stored workspace customized for a specific space during execution of the workspace in a different space, the workspace may be implemented as much as possible by modifying the workspace based on a space in which the workspace is executed.

Further, according to an embodiment of the disclosure, even though a user does not wear a wearable electronic device, the user may modify a stored workspace through an external electronic device.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
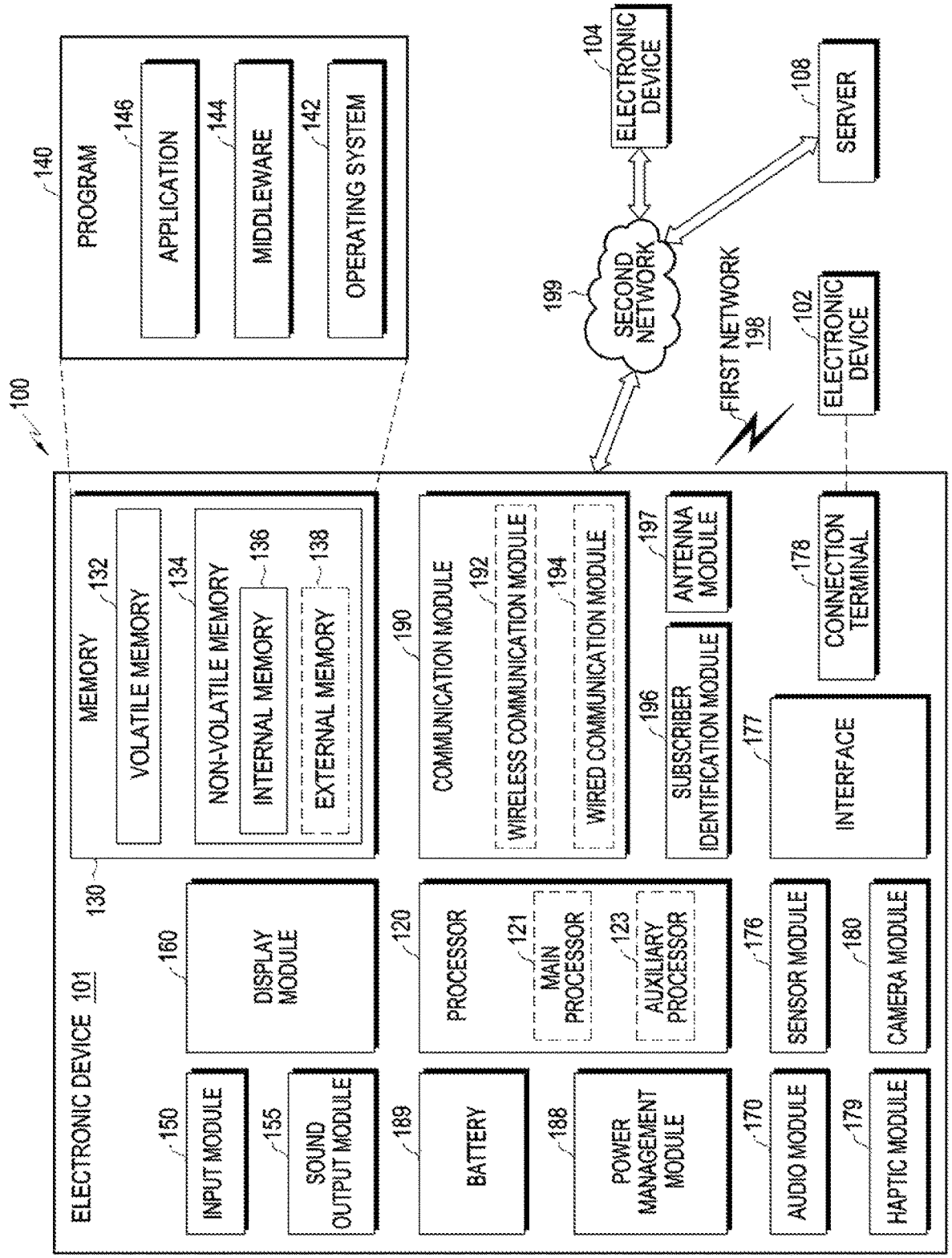
FIG. 1 is a block diagram illustrating an electronic device in a network environment according to an embodiment.

FIG. 1 is a block diagram illustrating an electronic device in a network environment according to various embodiments. Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

Antenna module 197 may transmit or receive a signal or power to or from the outside (e.g., the external electronic device) of the electronic device 101. According to an embodiment, antenna module 197 may include an antenna including a radiating element composed of a conductive material or a conductive pattern formed in or on a substrate (e.g., a printed circuit board (PCB)). According to an embodiment, antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of antenna module 197.

According to various embodiments, antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
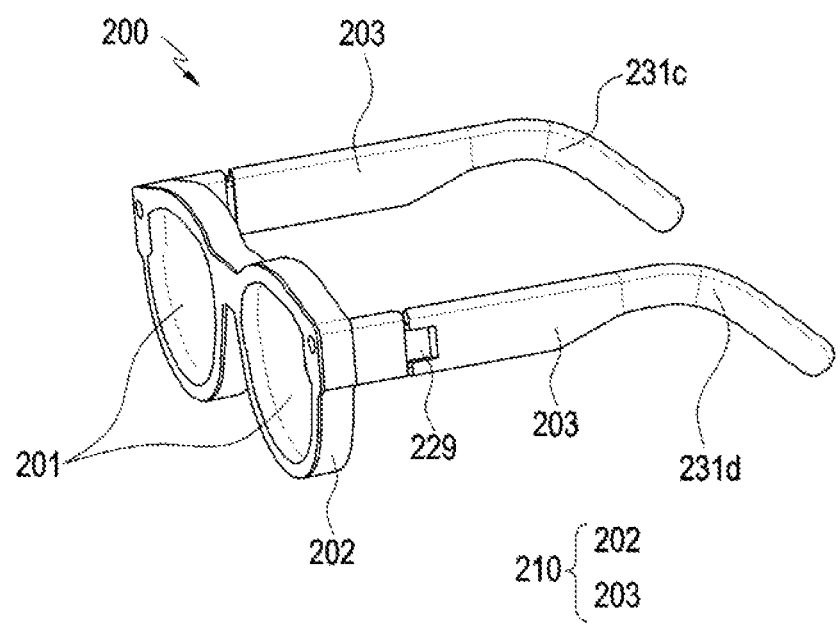
FIG. 2 is a perspective view illustrating an electronic device, according to an embodiment.

FIG. 2 is a perspective view illustrating an electronic device 200 (e.g., the electronic device 101 of FIG. 1) according to an embodiment.

Referring to FIG. 2, the electronic device 200 is a wearable electronic device in the form of glasses, and a user may visually recognize an object or an environment around the user, while wearing the electronic device 200. For example, the electronic device 200 may be a head mounted display (HMD) or smart glasses capable of providing an image directly in front of the user's eyes. The configuration of the electronic device 200 illustrated FIG. 2 may be wholly or partially identical to that of the electronic device 101 illustrated in FIG. 1.

According to an embodiment, the electronic device 200 may include a housing 210 that forms the exterior of the electronic device 200. The housing 210 may provide a space in which components of the electronic device 200 may be arranged. For example, the housing 210 may include a lens frame 202 and at least one wearing member 203.

According to an embodiment, the electronic device 200 may include at least one display member 201 capable of providing visual information to a user. For example, the display member 201 may include a module equipped with a lens, a display, a waveguide, and/or a touch circuit. According to an embodiment, the display member 201 may be formed to be transparent or semi-transparent. According to an embodiment, the display member 201 may include translucent glass or a window member having a light transmittance which is adjustable by adjusting a color concentration. According to an embodiment, a pair of display members 201 may be provided and disposed to correspond to the left eye and the right eye of the user, respectively, while the electronic device 200 is worn on the user's body.

According to an embodiment, the lens frame 202 may accommodate at least part of the display member 201. For example, the lens frame 202 may surround at least part of an edge of the display member 201. According to an embodiment, the lens frame 202 may position at least one of the display members 201 to correspond to the user's eyes. According to an embodiment, the lens frame 202 may be the rim of a general eyeglass structure. According to an embodiment, the lens frame 202 may include at least one closed curve surrounding the display member 201.

According to an embodiment, the wearing member 203 may extend from the lens frame 202. For example, the wearing member 203 may extend from an end of the lens frame 202 and may be supported or positioned on the user's body (e.g., an ear), together with the lens frame 202. According to an embodiment, the wearing member 203 may be rotatably coupled with the lens frame 202 through a hinge structure 229. According to an embodiment, the wearing member 203 may include an inner side surface 231c configured to face the user's body and an outer side surface 231d opposite to the inner side surface 231c.

According to an embodiment, the electronic device 200 may include the hinge structure 229 configured to fold the wearing member 203 with respect to the lens frame 202. The hinge structure 229 may be disposed between the lens frame 202 and the wearing member 203. Without wearing the electronic device 200, the user may carry or keep the electronic device 200 by folding the wearing member 203 to partially overlap with the lens frame 202.

Figure 3:
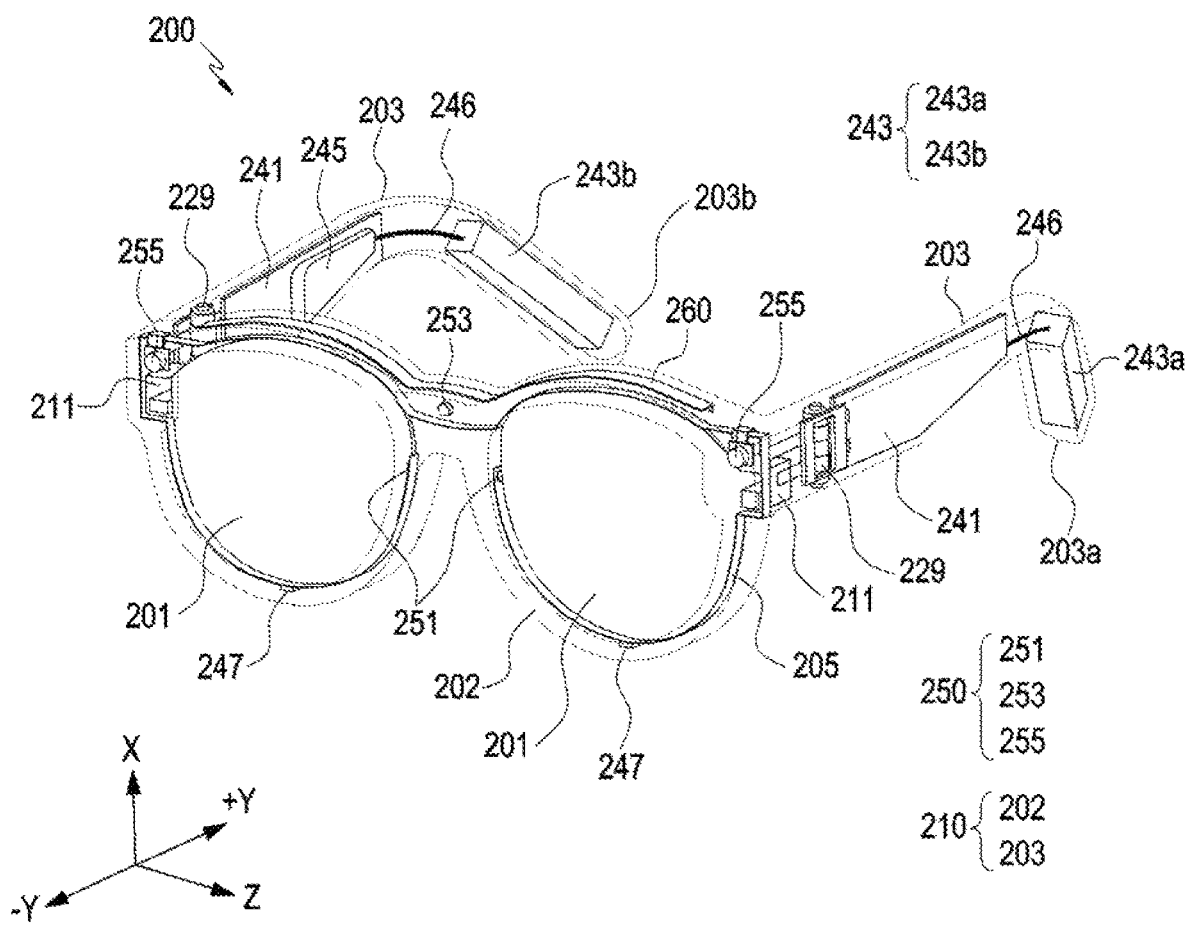
FIG. 3 is a first perspective view illustrating an internal configuration of an electronic device according to an embodiment.
Figure 4:
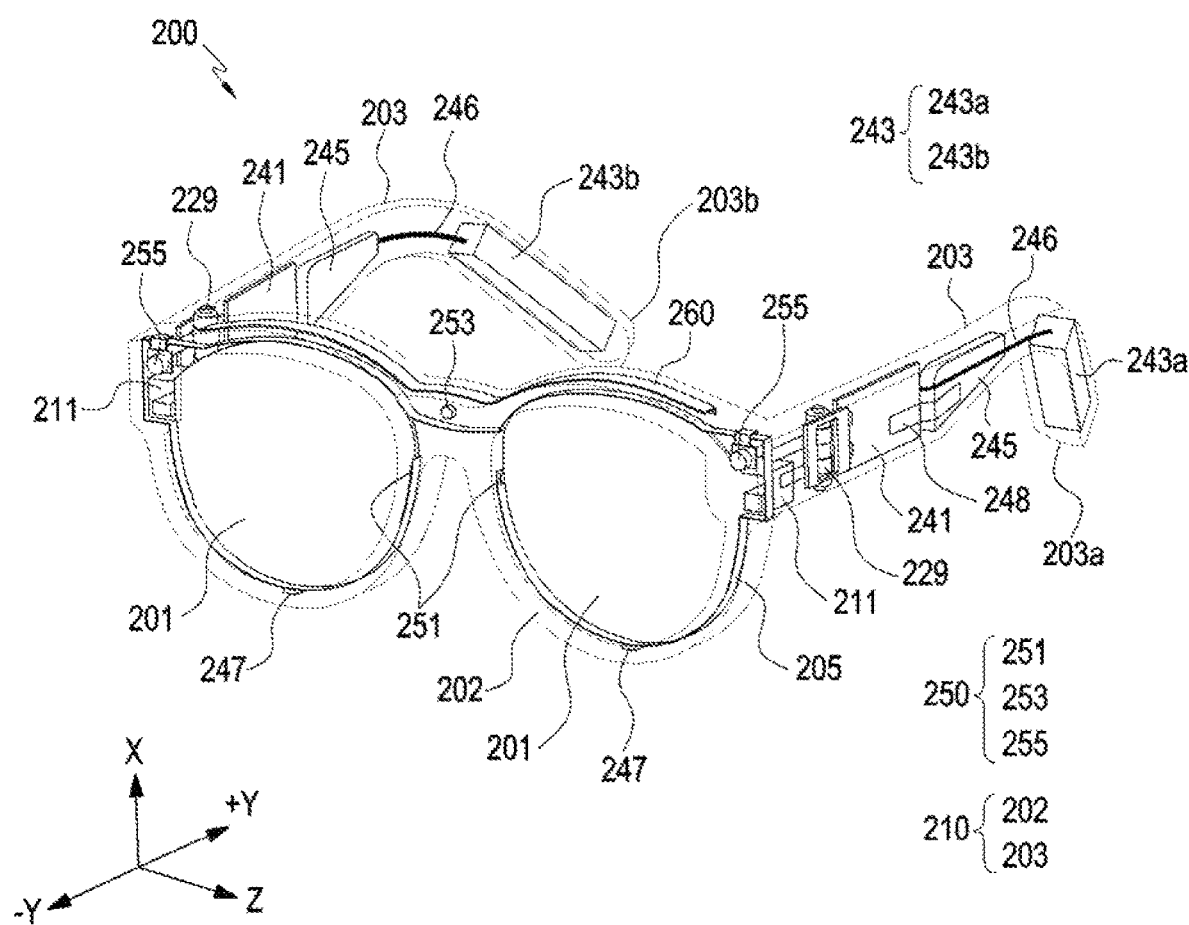
FIG. 4 is a second perspective view illustrating an internal configuration of an electronic device according to an embodiment.
Figure 5:
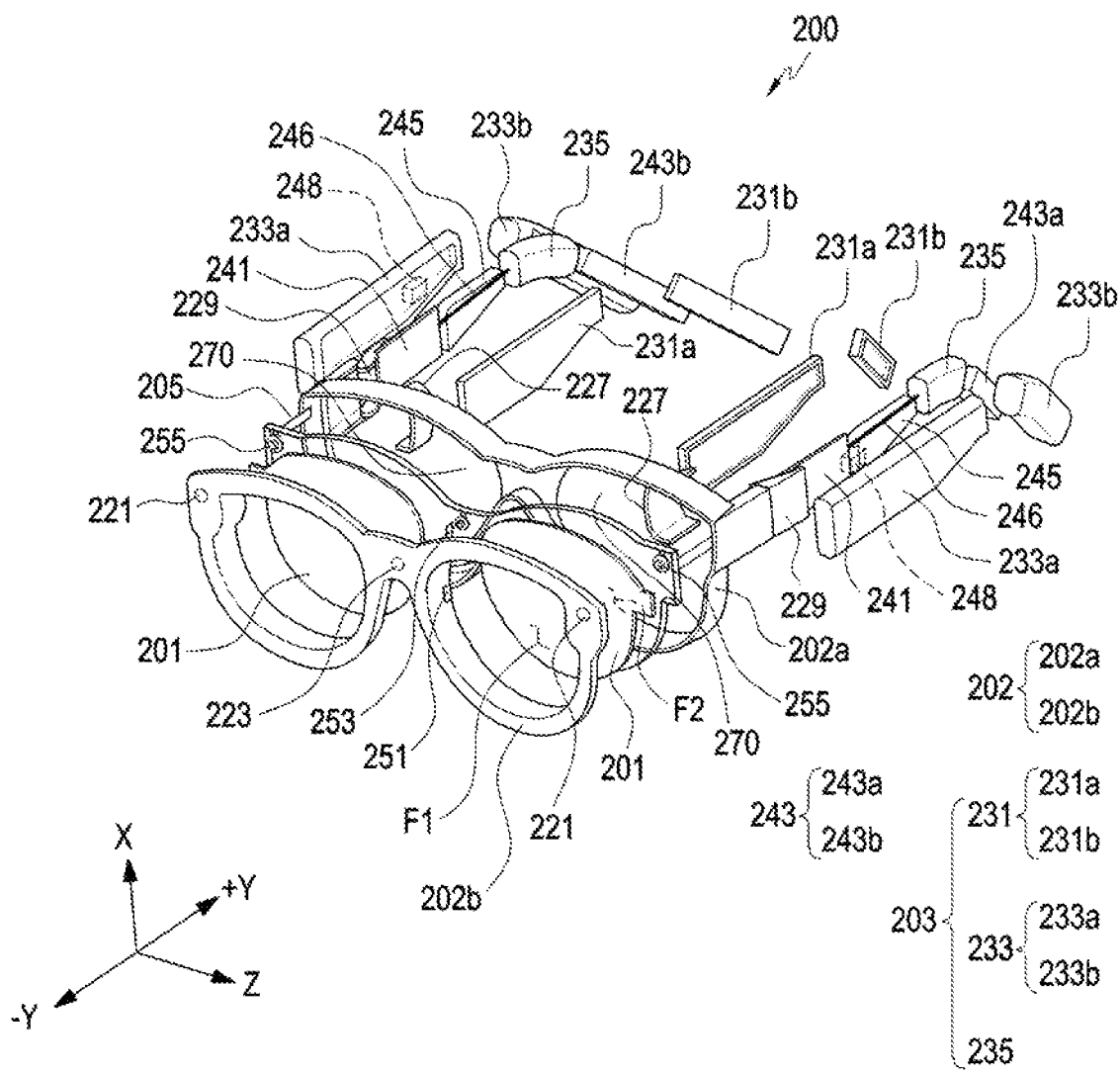
FIG. 5 is an exploded perspective view illustrating an electronic device according to an embodiment.

FIG. 3 is a first perspective view illustrating an internal configuration of an electronic device according to various embodiments. FIG. 4 is a second perspective view illustrating an internal configuration of an electronic device according to various embodiments. FIG. 5 is an exploded perspective view illustrating an electronic device according to various embodiments.

Referring to FIGS. 3, 4 and 5, the electronic device 200 may include components (e.g., at least one circuit board 241 accommodated in the housing 210, at least one battery 243, at least one speaker module 245, at least one power transfer structure 246, and a camera module 250). In embodiments, the at least one circuit board 241 may include at least one of a printed circuit board (PCB), a printed board assembly (PBA), a flexible PCB (FPCB), or a rigid-flexible PCB (RFPCB). The configuration of the housing 210 illustrated in FIGS. 3 and 4 may be wholly or partially identical to those of the display member 201, the lens frame 202, the wearing member 203, and the hinge structure 229 illustrated in FIG. 2.

According to an embodiment, the electronic device 200 may obtain and/or recognize a visual image of an object or an environment in a direction (e.g., a −Y direction) in which the user sees or the electronic device 200 faces, using the camera module 250 (e.g., the camera module 180 of FIG. 1), and receive information about the object or the environment from an external electronic device (e.g., the electronic device 102 or 104, or the server 108) through a network (e.g., the first network 198 or the second network 199 of FIG. 1). In another embodiment, the electronic device 200 may provide the received information about the object or environment to the user in an acoustic or visual form. The electronic device 200 may provide the received information about the object or the environment in a visual form to the user through the display member 201, using a display module (e.g., the display module 160 of FIG. 1). For example, the electronic device 200 may implement augmented reality (AR) by visually implementing the information about the object or the environment and combining the information with a real image of the ambient environment of the user.

According to an embodiment, the display member 201 may include a first surface F1 facing a direction (e.g., the −Y direction) from which external light is incident and a second surface F2 facing a direction (e.g., a +Y direction) opposite to the first surface F1. While the user wears the electronic device 200, at least part of light or an image incident through the first surface F1 may be introduced to the left eye and/or the right eye of the user through the second surface F2 of the display member 201 disposed to face the left eye and/or the right eye of the user.

According to an embodiment, the lens frame 202 may include at least two frames. For example, the lens frame 202 may include a first frame 202*a* and a second frame 202*b*. According to an embodiment, when the user wears the electronic device 200, the first frame 202*a* may be a part facing the user's face, and the second frame 202*b* may be part of the lens frame 202 spaced apart from the first frame 202*a* in the gaze direction (e.g., the −Y direction) of the user.

According to an embodiment, a light output module 211 may provide an image and/or a video to the user. For example, the light output module 211 may include a display panel capable of outputting an image, and a lens corresponding to the user's eye and guiding the image to the display member 201. For example, the user may obtain an image output from a display panel of the light output module 211 through a lens of the light output module 211. According to an embodiment, the light output module 211 may include a device configured to display various types of information. For example, the light output module 211 may include at least one of a liquid crystal display (LCD), a digital mirror device (DMD), a liquid crystal on silicon (LCoS), or an organic light emitting diode (OLED), or a micro light emitting diode (micro LED). According to an embodiment, when the light output module 211 and/or the display member 201 includes one of an LCD, a DMD, and an LCoS, the electronic device 200 may include a light source irradiating light to the display area of the output module 211 and/or the display member 201. According to another embodiment, when the light output module 211 and/or the display member 201 includes one of an OLED and a micro LED, the electronic device 200 may provide a virtual image to the user, without including a separate light source.

According to an embodiment, at least part of the light output module 211 may be disposed in the housing 210. For example, light output modules 211 may be disposed in the wearing member 203 or the lens frame 202 to correspond to the user's right eye and left eye, respectively. According to an embodiment, the light output module 211 may be coupled to the display member 201 and provide an image to the user through the display member 201. For example, an image output from the light output module 211 may be incident on the display member 210 through an input optical member located at one end of the display member 201, and radiated toward the user's eye through a waveguide and an output optical member located in at least part of the display member 210. According to an embodiment, the waveguide may be made of glass, plastic, or a polymer, and include a nano-pattern, for example, a polygonal or curved grating structure, formed on one surface inside or outside the waveguide. According to an embodiment, the waveguide may include at least one of at least one diffractive element (e.g., a diffractive optical element (DOE) or a holographic optical element (HOE)) or a reflective element (e.g., a reflective mirror).

According to an embodiment, the circuit board 241 may include components for driving the electronic device 200. For example, the circuit board 241 may include at least one integrated circuit (IC) chip, and at least one of the processor 120, the memory 130, the power management module 188, or the communication module 190 illustrated in FIG. 1 may be provided on the IC chip. According to an embodiment, the circuit board 241 may be disposed in the wearing member 203 of the housing 210. According to an embodiment, the circuit board 241 may be electrically coupled to the battery 243 through the power transfer structure 246. According to an embodiment, the circuit board 241 may be coupled to a flexible printed circuit board (FPCB) 205 and transmit an electrical signal to electronic components (e.g., the optical output module 211) of the electronic device, the camera module 250, and a light emitter through the FPCB 205. According to an embodiment, the circuit board 241 may be an interposer board.

According to various embodiments, the FPCB 205 may extend from the circuit board 241 across the hinge structure 229 into the lens frame 202, and may be disposed at least part of the circumference of the display member 201 inside the lens frame 202.

According to an embodiment, the battery 243 (e.g., the battery 189 of FIG. 1) may be electrically coupled to components (e.g., the optical output module 211, the circuit board 241, the speaker module 245, a microphone module 247, and/or the camera module 250 of the electronic device 200) of the electronic device 200, and supply power to the components of the electronic device 200.

According to an embodiment, at least part of the battery 243 may be disposed in the wearing member 203. According to an embodiment, the battery 243 may be disposed adjacent to ends 203*a* and 203*b* of wearing members 203. For example, the battery 243 may include a first battery 243*a* disposed at a first end 203*a* of the at least one wearing member 203 and a second battery 243*b* disposed at a second end 203*b* of the at least one wearing member 203.

According to various embodiments, the speaker module 245 (e.g., the audio module 170 or the sound output module 155 of FIG. 1) may convert an electrical signal into a sound. At least part of the speaker module 245 may be disposed in the wearing member 203 of the housing 210. According to an embodiment, the speaker module 245 may be located inside the wearing member 203 to correspond to the user's ear. According to an embodiment (e.g., embodiments corresponding to FIG. 3), the speaker module 245 may be disposed on the circuit board 241. For example, the speaker module 245 may be disposed between the circuit board 241 and an inner case (e.g., an inner case 231 of FIG. 5).

According to an embodiment (e.g., embodiments corresponding to FIG. 4), the speaker module 245 may be disposed next to the circuit board 241. For example, the speaker module 245 may be disposed between the circuit board 241 and the battery 243.

According to an embodiment, the electronic device 200 may include a connecting member 248 coupled to the speaker module 245 and the circuit board 241. The connecting member 248 may transmit at least part of a sound and/or a vibration generated by the speaker module 245 to the circuit board 241. According to an embodiment, the connecting member 248 may be integrally formed with the speaker module 245. For example, a portion extending from a speaker frame of the speaker module 245 may be interpreted as the connecting member 248. According to an embodiment (e.g., embodiments corresponding to FIG. 3), the connecting member 248 may be omitted. For example, when the speaker module 245 is disposed on the circuit board 241, the connecting member 248 may be omitted.

According to an embodiment, the power transfer structure 246 may transfer power from the battery 243 to an electronic component (e.g., the light output module 211) of the electronic device 200. For example, the power transfer structure 246 may be electrically coupled to the battery 243 and/or the circuit board 241, and the circuit board 241 may transfer power received through the power transfer structure 246 to the optical output module 211.

According to an embodiment, the power transfer structure 246 may be configured to transfer power. For example, the power transfer structure 246 may include an FPCB or a wire. For example, the wire may include a plurality of cables. In various embodiments, the shape of the power transfer structure 246 may be modified in various manners in consideration of the number and/or type of the cables.

According to an embodiment, the microphone module 247 (e.g., the input module 150 and/or the audio module 170 of FIG. 1) may convert a sound into an electrical signal. According to an embodiment, the microphone module 247 may be disposed on at least part of the lens frame 202. For example, at least one microphone module 247 may be disposed at a lower end (e.g., in a direction toward the −X axis) and/or at an upper end (e.g., in a direction toward the X axis) of the electronic device 200. According to an embodiment, the electronic device 200 may more clearly recognize the user's voice, using voice information (e.g., sound) obtained from the at least one microphone module 247. For example, the electronic device 200 may distinguish voice information from ambient noise based on the obtained voice information and/or additional information (e.g., low-frequency vibration of the user's skin and bones). For example, the electronic device 200 may clearly recognize the user's voice and perform a function of reducing ambient noise (e.g., noise canceling).

According to an embodiment, the camera module 250 may capture a still image and/or a video. The camera module 250 may include at least one of a lens, at least one image sensor, an image signal processor, or a flash. According to an embodiment, the camera module 250 may be disposed inside the lens frame 202 and disposed around the display member 201.

According to an embodiment, the camera module 250 may include at least one first camera module 251. According to an embodiment, the first camera module 251 may photograph the user's eye (e.g., a pupil) or the trajectory of a gaze. For example, the first camera module 251 may photograph a reflection pattern of light emitted from the light emitter to the user's eye. For example, the light emitter may emit light in an IR band for tracking the trajectory of the gaze using the first camera module 251. For example, the light emitter may include an IR LED. According to an embodiment, the processor (e.g., the processor 120 of FIG. 1) may adjust the position of the virtual image so that a virtual image projected on the display member 201 corresponds to the gaze direction of the user's pupil. According to an embodiment, the first camera module 251 may include a global shutter (GS)-type camera, and the user's eye or the trajectory of the gaze may be traced using a plurality of first camera modules 251 of the same standard and performance.

According to various embodiments, the first camera module 251 may periodically or aperiodically transmit information (e.g., trajectory information) related to the trajectory of the user's eye or gaze to the processor (e.g., the processor 120 of FIG. 1). According to another embodiment, when the first camera module 251 detects that the user's gaze has changed based on the trajectory information (e.g., the eye moves more than a reference value with the head stationary), the first camera module 251 may transmit the trajectory information to the processor.

According to an embodiment, the camera module 250 may include a second camera module 253. According to an embodiment, the second camera module 253 may capture an external image. According to an embodiment, the second camera module 253 may be a GS-type camera or a rolling shutter (RS)-type camera. According to an embodiment, the second camera module 253 may capture an external image through a second optical hole 223 formed in the second frame 202b. For example, the second camera module 253 may include a high-resolution color camera, and may be a high resolution (HR) or photo video (PV) camera. Further, the second camera module 253 may provide an auto focus function (AF) and an optical image stabilizer (OIS) function.

According to various embodiments, the electronic device 200 may include a flash located adjacent to the second camera module 253. For example, the flash may provide light to increase an ambient brightness (e.g., illuminance) of the electronic device 200, when the second camera module 253 obtains an external image, and reduce the difficulty of obtaining an image, caused by a darker environment, mixture of various light sources, and/or light reflection.

According to an embodiment, the camera module 250 may include at least one third camera module 255. According to an embodiment, the third camera module 255 may photograph a user motion through a first optical hole 221 formed in the lens frame 202. For example, the third camera module 255 may photograph a user gesture (e.g., hand gesture). Third camera modules 255 and/or first optical holes 221 may be formed respectively at both side ends of the lens frame 202 (e.g., the second frame 202b), for example, in the X direction. According to an embodiment, the third camera module 255 may be a GS-type camera. For example, the third camera module 255 may provide 360-degree spatial (e.g., omnidirectional) recognition, position recognition, and/or movement recognition with a camera supporting 3 degrees of freedom (3DoF) or 6DOF. According to an embodiment, the third camera module 255 may use a plurality of GS-type cameras of the same standard and performance as a stereo camera to perform a simultaneous localization and mapping (SLAM) function and a user movement recognition function. According to an embodiment, the third camera module 255 may include an IR camera (e.g., a time of flight (TOF) camera or a structured light camera). For example, the IR camera may operate as at least part of a sensor module (e.g., the sensor module 176 of FIG. 1) for detecting a distance to a subject.

According to an embodiment, at least one of the first camera module 251 or the third camera module 255 may be replaced with a sensor module (e.g., the sensor module 176 of FIG. 1). For example, the sensor module may include at least one of a vertical cavity surface emitting laser (VCSEL), an IR sensor, and/or a photodiode. For example, the photodiode may include a positive intrinsic negative (PIN) photodiode or an avalanche photodiode (APD). A photodiode may also be referred to as a photo detector or a photo sensor.

According to an embodiment, at least one of the first camera module 251, the second camera module 253, or the third camera module 255 may include a plurality of camera modules. For example, the second camera module 253 may include a plurality of lenses (e.g., wide-angle and telephoto lenses) and image sensors, and may be disposed on one surface (e.g., a surface facing the −Y axis) of the electronic device 200. For example, the electronic device 200 may include a plurality of camera modules having different attributes (e.g., angles of view (AOVs)) or functions, and control to change the AOVs of the camera modules based on a user selection and/or trajectory information. For example, at least one of the plurality of camera modules may be a wide-angle camera, and at least another may be a telephoto camera.

According to various embodiments, the processor (e.g., the processor 120 of FIG. 1) may determine a movement of the electronic device and/or a user movement, using information about the electronic device 200 obtained by at least one of a gesture sensor, a gyro sensor or gyroscopic sensor, or an acceleration sensor of the sensor module (e.g., the sensor module 176 of FIG. 1) and a user action (e.g., approach of the user body to the electronic device 200) detected by the third camera module 255. According to an embodiment, the electronic device 200 may include a magnetic (geomagnetic) sensor that measures a bearing using a magnetic field and a magnetic force line, and/or a hall sensor that obtains movement information (e.g., a movement direction or a movement distance) using the strength of a magnetic field. For example, the processor may determine a movement of the electronic device 200 and/or a user movement based on information obtained from the magnetic (geomagnetic) sensor and/or the hall sensor.

According to various embodiments, the electronic device 200 may perform an input function (e.g., a touch and/or pressure sensing function) enabling interaction with the user. For example, a component configured to perform the touch and/or pressure sensing function (e.g., a touch sensor and/or a pressure sensor) may be disposed in at least part of the wearing member 203. The electronic device 200 may control a virtual image output through the display member 201 based on information obtained through the component. For example, the sensor related to the touch and/or pressure sensing function may be configured in various types such as a resistive type, a capacitive type, an electro-magnetic (EM) type, or an optical type. According to an embodiment, the component configured to perform the touch and/or pressure sensing function may be wholly or partially identical to that of the input module 150 of FIG. 1.

According to an embodiment, the electronic device 200 may include a reinforcing member 260 disposed in an inner space of the lens frame 202 and formed to have a higher rigidity than that of the lens frame 202.

According to an embodiment, the electronic device 200 may include a lens structure 270. The lens structure 270 may refract at least part of light. For example, the lens structure 270 may be a prescription lens with a specified refractive power. According to an embodiment, the housing 210 may include a hinge cover 227 that may conceal part of the hinge structure 229. Another part of the hinge structure 229 may be accommodated or concealed between the inner case 231 and an outer case 233, examples of which are described below.

According to various embodiments, the wearing member 203 may include the inner case 231 and the outer case 233. The inner case 231, which is, for example, a case configured to face the user's body or directly contact the user's body, may be made of a material having low thermal conductivity, for example, a synthetic resin. According to an embodiment, the inner case 231 may include an inner surface (e.g., the inner side surface 231*c* of FIG. 2) facing the user's body. The outer case 233 may include, for example, a material (e.g., a metal material) which may at least partially transfer heat, and may be coupled with the inner case 231 to face the inner case 231. According to an embodiment, the outer case 233 may include an outer surface (e.g., the outer side surface 231*d* of FIG. 2) opposite to the inner side surface 231*c*. In an embodiment, at least one of the circuit board 241 or the speaker module 245 may be accommodated in a space separated from the battery 243 inside the wearing member 203. In the illustrated embodiment, the inner case 231 may include a first case 231*a* including the circuit board 241 and/or the speaker module 245, and a second case 231*b* accommodating the battery 243. The outer case 233 may include a third case 233*a* coupled with the first case 231*a* to face the first case 231*a*, and a fourth case 233*b* coupled with the second case 231*b* to face the second case 231*b*. For example, the first case 231*a* and the third case 233*a* may be coupled with each other to accommodate the circuit board 241 and/or the speaker module 245. The second case 231*b* and the fourth case 233*b* may be coupled with each other to accommodate the battery 243.

According to an embodiment, the coupled first case 231*a* and third case 233*a* may be rotatably coupled with the lens frame 202 through the hinge structure 229, and the coupled second case 231*b* and fourth case 233*b* may be coupled to an end of the coupled first case 231*a* and third case 233*a* through a connecting structure 235. In some embodiments, a part of the connecting structure 235 that comes into contact with the user's body may be made of a material having a low thermal conductivity, for example, silicon, polyurethane, or an elastic material such as rubber, whereas a part of the connecting structure 235 that does not come into contact with the user's body may be made of a material with a high thermal conductivity (e.g., a metal material). For example, when heat is generated from the circuit board 241 or the battery 243, the connecting structure 235 may block the heat from being transferred to the part in contact with the user's body, and disperse or release the heat through the part not in contact with the user's body. According to an embodiment, the part of the connecting structure 235 configured to come into contact with the user's body may be interpreted as part of the inner case 231, and the part of the connecting structure 235 that does not contact the user's body may be interpreted as part of the outer case 233. According to an embodiment, the first case 231*a* and the second case 231*b* may be integrally configured without the connecting structure 235, and the third case 233*a* and the fourth case 233*b* may be integrally configured without the connecting structure 235. According to various embodiments, other components (e.g., antenna module 197 of FIG. 1) may be further included in addition to the illustrated components, and information about an object or an environment may be provided from an external electronic device (e.g., the electronic device 102 or 104, or the server 108 of FIG. 1) through a network (e.g., the first network 198 or the second network 199 of FIG. 1), using the communication module 190.

Figure 6:
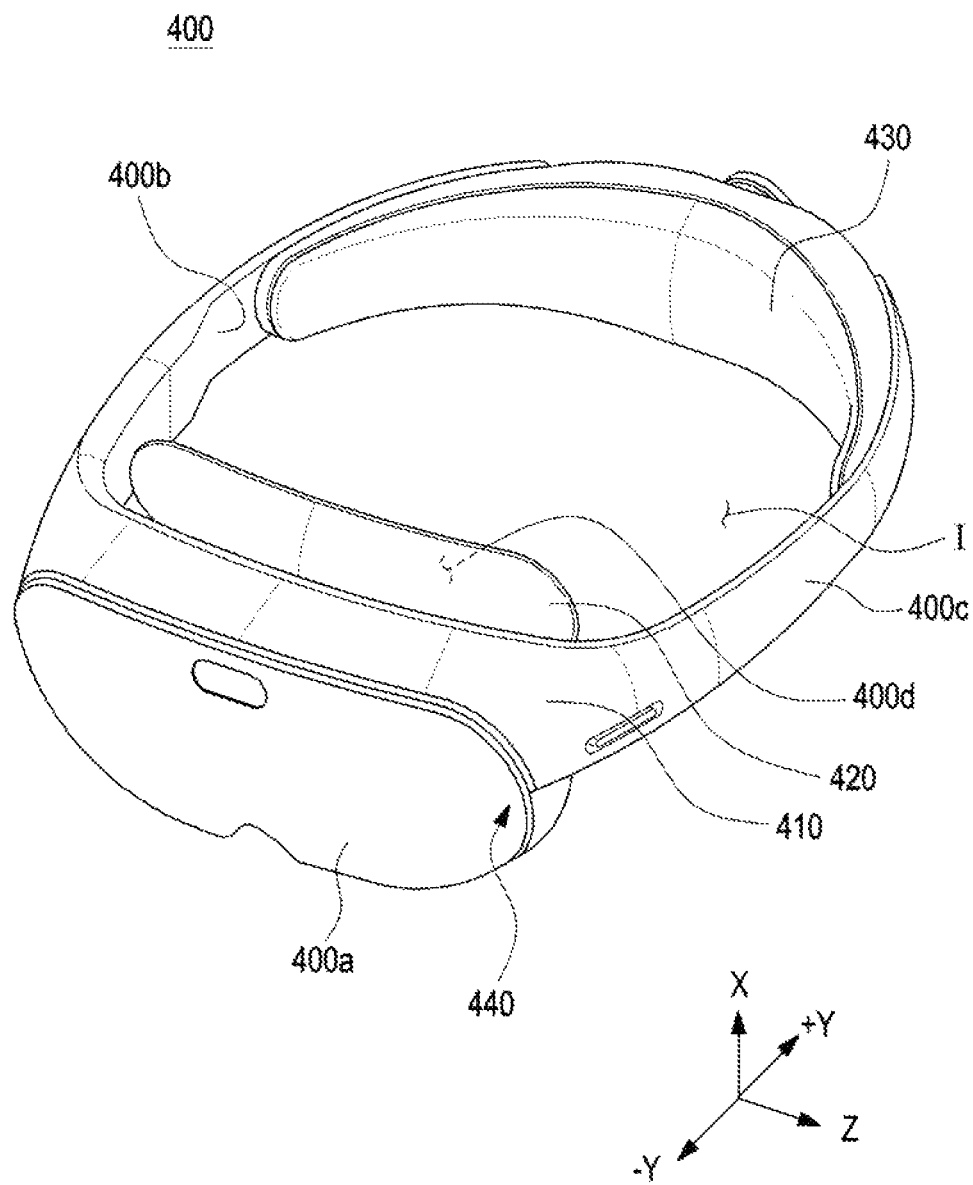
FIG. 6 is another perspective view illustrating a wearable electronic device according to an embodiment.

FIG. 6 is another perspective view illustrating an electronic device according to various embodiments of the disclosure.

Referring to FIG. 6, an electronic device 400 may be an HMD capable of providing an image in front of the user's eyes. The configuration of the electronic device 400 illustrated in FIG. 6 may be wholly or partially identical to that of the electronic device 200 illustrated in FIG. 2.

According to various embodiments, the electronic device 400 may include housings 410, 420 and 430 which may form the exterior of the electronic device 400 and provide a space in which components of the electronic device 400 may be disposed.

According to various embodiments, the electronic device 400 may include a first housing 410 that may surround at least part of a user's head. According to an embodiment, the first housing 410 may include a first surface 400a facing outward (e.g., a −Y direction) from the electronic device 400.

According to various embodiments, the first housing 410 may surround part of an inner space I. For example, the first housing 410 may include a second surface 400b facing the inner space I of the electronic device 400 and a third surface 400c opposite to the second surface 400b. According to an embodiment, the first housing 410 may be coupled to the third housing 430 to form a closed curve surrounding the inner space I.

According to various embodiments, the first housing 410 may accommodate at least some of the components of the electronic device 400. For example, an optical output module (e.g., the optical output module 211 of FIG. 3), a circuit board (e.g., the circuit board 241 and the speaker module 245 of FIG. 3) may be disposed inside the first housing 410.

According to various embodiments, one display member 440 corresponding to the left eye and the right eye of the electronic device 400 may be included. The display member 440 may be disposed in the first housing 410. The configuration of the display member 440 illustrated in FIG. 6 may be wholly or partially identical to that of the display member 201 of FIG. 2.

According to various embodiments, the electronic device 400 may include a second housing 420 that may be mounted on the user's face. According to an embodiment, the second housing 420 may include a fourth surface 400d that may at least partially face the user's face. According to an embodiment, the fourth surface 400d may be a surface in a direction (e.g., a +Y direction) to the inner space I of the electronic device 400. According to an embodiment, the second housing 420 may be coupled with the first housing 410.

According to various embodiments, the electronic device 400 may include a third housing 430 that may be mounted on the back of the user's head. According to an embodiment, the third housing 430 may be coupled with the first housing 410. According to an embodiment, the third housing 430 may accommodate at least some of the components of the electronic device 400. For example, a battery (e.g., the battery 243 of FIG. 3) may be disposed inside the third housing 430.

Figure 7A:
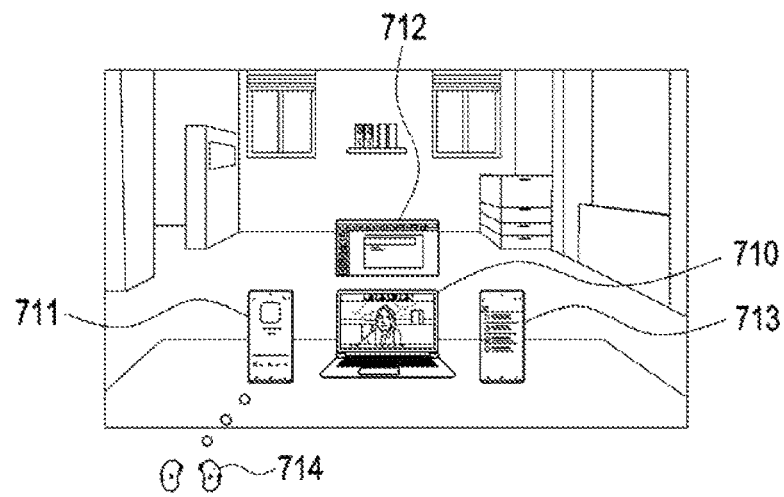
FIG. 7A is a diagram illustrating an operation of implementing a workspace according to a place in a wearable electronic device according to an embodiment.
Figure 7B:
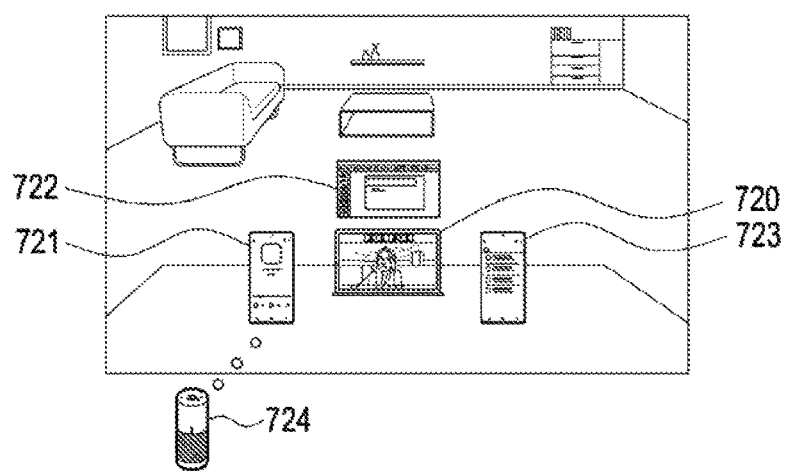
FIG. 7B is a diagram illustrating an operation of implementing a workspace according to a place in a wearable electronic device according to an embodiment.
Figure 7C:
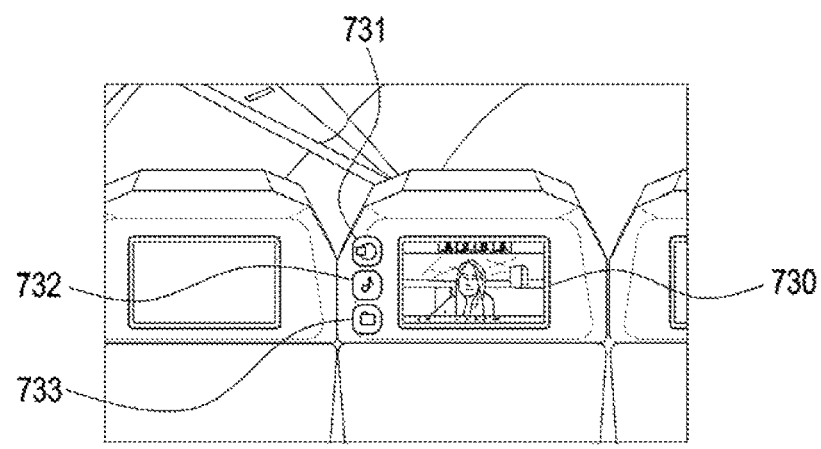
FIG. 7C is a diagram illustrating an operation of implementing a workspace according to a place in a wearable electronic device according to an embodiment.

FIG. 7A is diagram illustrating an operation of implementing a workspace according to a place in a wearable electronic device according to an embodiment of the disclosure. FIG. 7B is diagram illustrating an operation of implementing a workspace according to a place in a wearable electronic device according to an embodiment of the disclosure. FIG. 7C is diagram illustrating an operation of implementing a workspace according to a place in a wearable electronic device according to an embodiment of the disclosure. For example, FIG. 7A illustrates a workspace implemented in a first space (e.g., an office), FIG. 7B illustrates a workspace implemented in a second space (e.g., a house), and FIG. 7C illustrates a workspace implemented in a third space (e.g., an airplane).

According to an embodiment, referring to FIG. 7A, a wearable electronic device (e.g., the electronic device 101 of FIG. 1 or the processor 120 of FIG. 1) may display a workspace on the display (e.g., the display module 160 of FIG. 1). For example, the workspace may refer to a set of screens related to a plurality of functions that a user wants to use within a space available to the user in a specific space. For example, the workspace of the specific space may include information about a real object (e.g., type information, position information, and size information about the real object) included in the specific space, information about the type (e.g., execution screen, widget, or icon) of at least one virtual object disposed in the specific space by a user input, information about a related application (e.g., information about the type of the application), size information, position information, and arrangement information about the at least one virtual object, and/or information related to a relationship (e.g., anchored or not, or a relative position) between the at least one virtual object and the real object in the space.

According to an embodiment, the workspace may include execution screens of a plurality of functions (e.g., applications) provided by the wearable electronic device as a plurality of virtual objects in association with the real object included in the real space. For example, the plurality of virtual objects included in the workspace may be selected and arranged according to a user setting.

According to an embodiment, a workspace of the first space (e.g., the office) may include a real object 710 and a plurality of virtual objects 711, 712, and 713. For example, the workspace of the first space may include the real object 710 (e.g., a laptop computer) and the plurality of virtual objects 711, 712, and 713 related to executed applications, respectively. For example, the plurality of virtual objects 711, 712, and 713 may include a virtual object 711 related to a music application, a virtual object 712 related to a document application, and a virtual object 713 related to a file application. According to an embodiment, the virtual objects may include a plurality of execution screens of various types. For example, the plurality of execution screens may include an execution screen of an application, a widget screen for controlling an application, and/or an icon. According to an embodiment, the music application may interwork with the user's earphone (e.g. earphones 714).

According to an embodiment, a screen of an application executed in the laptop computer or a virtual object anchored to the laptop computer may be displayed on the display of the real object 710 being a laptop computer. For example, the virtual object anchored to the laptop computer may be an execution screen of the application.

According to an embodiment, the workspace of the first space illustrated in FIG. 7A may be set through a user input (e.g., a gesture input, a voice input, and/or eye tracking) in the first space, and stored in memory (e.g., the memory 130 of FIG. 1). For example, the wearable electronic device may set the workspace of the first space based on a user input (e.g., a gesture input, a voice input, and/or eye tracking) for selecting an application to be executed in the first space, and a user input (e.g., a gesture input, a voice input, and/or eye tracking) for disposing a virtual object of the application. For example, information about a real object (e.g., type information, position information, and size information about the real object) included in the first space, information about the type (e.g., execution screen, widget, or icon) of at least one virtual object disposed in the first space by a user input, information about a related application (e.g., information about the type of the application), size information, position information, and arrangement information about the at least one virtual object, and/or information related to a relationship (e.g., anchored or not, or a relative position) between the at least one virtual object and the real object in the space may be stored as the workspace of the first space in the memory. An example operation of setting a workspace according to an embodiment is described below with reference to FIGS. 8 and 9.

According to an embodiment, the wearable electronic device may set the workspace of the first space based on a user input received through an external electronic device (e.g., the electronic device 104 of FIG. 1) connected to the wearable electronic device. For example, upon receipt of a touch input or gesture input for setting the workspace of the first space through the external electronic device, the wearable electronic device may set the workspace of the first space by placing a virtual object of an application selected based on the user input received through the external electronic device at a selected position. According to an embodiment, the wearable electronic device may receive information (e.g., application type information) related to the application selected through the external electronic device from the external electronic device. According to an embodiment, an example of an operation of setting a workspace through an external electronic device is described below with reference to FIGS. 20A to 28C.

According to an embodiment, although the first space in which a workspace is set is shown as an office in FIG. 7A, the disclosure is not limited thereto, and the types and number of virtual objects included in the workspace are not limited to FIG. 7A.

According to an embodiment, referring to FIG. 7B, the wearable electronic device may display a workspace on the display. According to an embodiment, upon receipt of a user input for executing the workspace of the first space in the second space (e.g., the house), the wearable electronic device may execute the workspace of the first space in the second space. For example, executing the workspace of the first space in the second space means displaying at least one virtual object, which has been mapped to the first space and stored accordingly, at a position of the second space corresponding to the stored position of the first space.

According to an embodiment, upon receipt of a user input for executing the workspace of the first space in the second space, the wearable electronic device may identify a space available to the user. For example, the wearable electronic device may obtain information about the space available to the user, including about information about the size of the available space, based on a measurement of a distance to an object (e.g., a wall, a monitor, or another person) included in a real space, obtained through at least one sensor (e.g., the sensor module 176 of FIG. 1) or the size of an object (e.g., a monitor) included in the real space.

According to an embodiment, the wearable electronic device may obtain the information about the space available to the user by analyzing the use (e.g., a house, an office, an airplane, or a school) of the real space, and the number, positions, and/or types of a plurality of objects included in the real space, through the at least one sensor. For example, when the wearable electronic device is located in an airplane, the total size of a space recognized by the wearable electronic device may be large as a space inside the airplane. However, the wearable electronic device may identify that the wearable electronic device is inside the airplane through spatial analysis, and obtain the information about the space available to the user, including information about the position and/or size of the space available to the user out of the total space, based on an obtained distance to a front seat (or a distance to a monitor) and an obtained distance to a next seat or a monitor of the next seat.

According to an embodiment, when the space available to the user is equal to or greater than a specified value, the wearable electronic device may execute the workspace as illustrated in FIG. 7B, and when the space available to the user is less than the specified value, the wearable electronic device may execute the workspace as illustrated in FIG. 7C. For example, when the size of an object (e.g., a monitor) included in the real space is equal to or greater than a specified value, the wearable electronic device may execute the workspace as illustrated in FIG. 7B, and when the size of the object included in the real space is less than the specified value, the wearable electronic device may execute the workspace as illustrated in FIG. 7C.

According to an embodiment, referring to FIG. 7B, an executed workspace may include a real object 720 and a plurality of virtual objects 721, 722, and 723. For example, the workspace of the first space executed in the second space may include the real object 720 (e.g., a monitor) and the plurality of virtual objects 721, 722, and 723 respectively related to executed applications. For example, the plurality of virtual objects 721, 722, and 723 may include a virtual object 721 related to a music application, a virtual object 722 related to a document application, and a virtual object 723 related to a file application. According to an embodiment, the music application may interwork with a speaker included in the second space (e.g. speaker 724).

According to an embodiment, the wearable electronic device may search for a real object that is the same as or similar to a real object (e.g., a monitor) (e.g., the real object 710 of FIG. 1) included in the workspace of the first space in the second space, determine the positions and/or arrangement of the plurality of virtual objects 721, 722, and 723 based on the detected position of the real object 720 in the second space, and display the plurality of virtual objects 721, 722, and 723 accordingly.

According to an embodiment, a screen of an application executed on the monitor or a virtual object anchored to the monitor may be displayed on the display of the real object 720 being a monitor. For example, the virtual object anchored to the monitor may be the execution screen of the application.

According to an embodiment, at least one of the plurality of virtual objects 721, 722, and 723 may be a virtual object into which at least one of the plurality of virtual objects included in the workspace of the first space (e.g. at least one of the plurality of virtual objects 711, 712, and 713) has been converted based on at least one of spatial information about the second space, an application executable in the second space, or an application function executable in the second space. According to an embodiment, an example of an operation of converting a virtual object and displaying the converted virtual object is described below with reference to FIGS. 15A to 19B.

According to an embodiment, referring to FIG. 7C, upon receipt of user input for executing the workspace of the first space in the third space (e.g., the airplane), the wearable electronic device may execute the workspace of the first space in the third space.

According to an embodiment, when a space available to the user is less than a specified value, the wearable electronic device may change at least one of a size, a shape, or a position of a virtual object included in the workspace of the first space, and display the virtual object accordingly.

According to an embodiment, referring to FIG. 7C, the executed workspace may include a real object 730 and a plurality of virtual objects 731, 732, and 733. For example, the workspace of the first space executed in the third space may include the real object 730 (e.g., a monitor disposed on the front seat) and the plurality of virtual objects 731, 732 and 733 respectively related to executed applications. For example, the plurality of virtual objects 731, 732 and 733 may include a virtual object 731 related to a music application, a virtual object 732 related to a document application, and a virtual object 733 related to a file application.

According to an embodiment, when the space available to the user is less than a specified value, the wearable electronic device may convert a plurality of virtual objects (e.g., the plurality of virtual objects 711, 712 and 713 in FIG. 7A) implemented in the form of application execution screens or widgets in the workspace of the first space into icons, and dispose the icons on one side of the real object 730. According to an embodiment, an example of an operation of converting and displaying a plurality of virtual objects based on a space available to a user being less than a specified value is described below with reference to FIG. 16.

According to an embodiment, a screen of an application executed on the monitor disposed on the front seat or a virtual object anchored to the monitor disposed on the front seat may be displayed on the display of the real object 730 being a monitor. For example, the virtual object anchored to the monitor disposed on the front seat may be an execution screen of an application.

Figure 8:
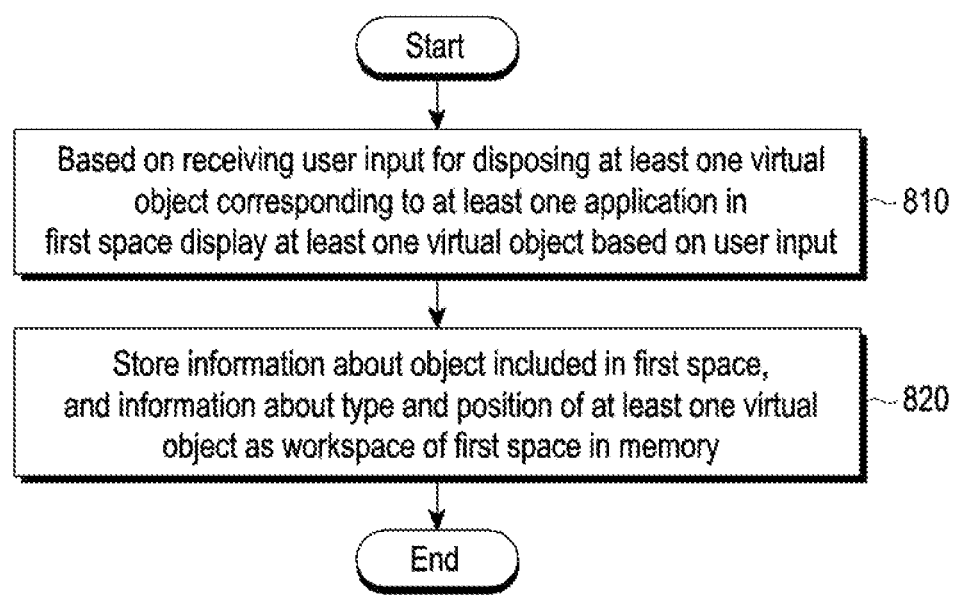
FIG. 8 is a flowchart illustrating an operation of storing a workspace in a wearable electronic device according to an embodiment.

FIG. 8 is a flowchart illustrating an operation of storing a workspace in a wearable electronic device according to an embodiment of the disclosure.

According to an embodiment, referring to FIG. 8, based on receiving a user input for disposing at least one virtual object corresponding respectively to at least one application in a first space, a wearable electronic device (e.g., the electronic device of FIG. 1 or the processor 120 of FIG. 1) may display the at least one virtual object on a display (e.g., the display module 160 of FIG. 1) based on the user input in operation 810.

According to an embodiment, a user input for disposing a virtual object in the first space may include one or more of a gesture input or eye tracking received through a camera (e.g., the camera module 180 of FIG. 1), a user voice received through a microphone (e.g., the input module 150 of FIG. 1), and/or a user input received through an external electronic device (e.g., the electronic device 104 of FIG. 1) connected to the wearable electronic device. For example, the gesture input of the user for disposing a virtual object in the first space may include a user gesture of selecting an application to be executed in the first space, and a user gesture of disposing a virtual object of the application.

According to an embodiment, the user input for disposing a virtual object in the first space may include a user input received through an external electronic device connected to the wearable electronic device. For example, the user input received through the external electronic device may include a user gesture of selecting an application to be executed in the first space, and a user gesture of disposing a virtual object of the application.

According to an embodiment, the user input received through the external electronic device may include a touch input or hovering input received through a touch screen of the external electronic device, or a gesture input received through a camera of the external electronic device. According to an embodiment, an example of an operation of setting a workspace through an external electronic device is described below with reference to FIGS. 20A to 28C.

According to an embodiment, in operation 820, the wearable electronic device may store information about a real object (e.g., type information, position information, and size information about the real object) included in the first space, information about the selected application (e.g., information about the type of the application), information about a type (e.g., execution screen, widget, or icon), size, position, and arrangement of at least one virtual object, and/or information related to a relationship (e.g., anchored or not, or a relative position) between the at least one virtual object and the real object in the space, as the workspace of the first space in memory (e.g., the memory 130 of FIG. 1).

According to an embodiment, when the user wears the wearable electronic device or receives a user input to start setting of a workspace from the user, the wearable electronic device may obtain spatial information about a space in which the wearable electronic device is located through at least one sensor. For example, the spatial information may include information about at least one of the structure of the space in which the wearable electronic device is located, the size of the space, a space available to the user in the space, the distance to a real object included in the space, the size of an object, the arrangement of the object, or the type of the object.

According to an embodiment, the wearable electronic device may obtain information about a real object included in a real space (e.g., type information, position information, and size information about the real object), information about the type (e.g., execution screen, widget or icon) of at least one virtual object disposed in the space by the user, size information, position information, and arrangement information about the at least one virtual object, and/or information about a relationship (e.g., anchored or not, or a relative position) between the at least one virtual object and the real object included in the space, and store the obtained information as the workspace of the first space. According to an embodiment, the wearable electronic device may store the obtained information as the workspace of the first space in the memory (e.g., the memory 130 of FIG. 1), an external electronic device (e.g., the electronic device 104 of FIG. 1) connected to the wearable electronic device, and/or a server (e.g., the server 108 of FIG. 1).

Figure 9:
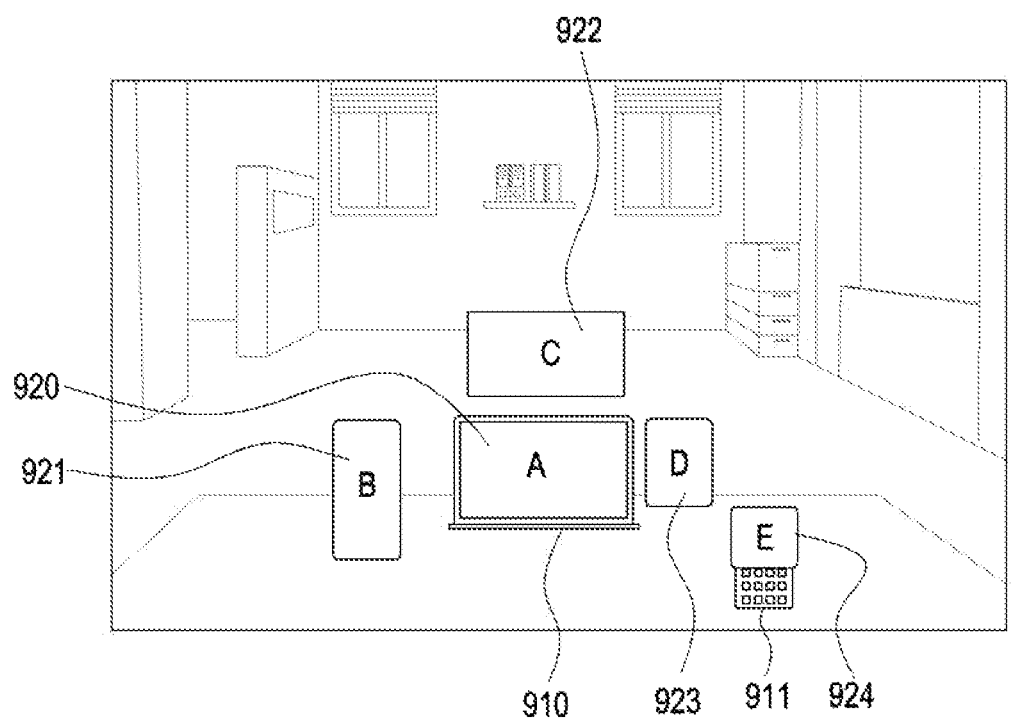
FIG. 9 is a diagram illustrating a workspace according to an embodiment.

FIG. 9 is a diagram illustrating a workspace according to an embodiment of the disclosure.

According to an embodiment, referring to FIG. 9, the workspace of a first space (e.g., an office) may include real object 910 (e.g., a monitor), real object 911 (e.g., a calendar) and virtual objects 921, 922, 923, and 924.

According to an embodiment, based on a user input for selecting applications to be executed in the first space, and a user input for disposing the virtual objects 921, 922, 923, and 924 corresponding respectively to the selected applications around the real object 910 (e.g., a monitor), the wearable electronic device (e.g., the electronic device 101 of FIG. 1 or the processor 120 of FIG. 1) may display the virtual objects 921, 922, 923, and 924 corresponding respectively to the selected applications. For example, the virtual objects 921, 922, 923, and 924 may be execution screens of the applications or widget screens for controlling the applications. According to an embodiment, the applications may be provided by the wearable electronic device.

For example, screen A 920 displayed on the display of the monitor 910 as a real object may be a screen output from the display of the monitor or a virtual object disposed by a user input. According to an embodiment, when screen A 920 is a screen output from the display of the monitor, the screen may be a user-set application screen or a screen displayed according to real-time control of the user. According to an embodiment, when screen A 920 is a virtual object, an area in which screen A 920 is displayed may be an area set through a user input (e.g., a gesture input, a voice input, and/or eye tracking), and may be a real object 910 (e.g., a monitor) recognized by the wearable electronic device and/or an area around the real object 910.

According to an embodiment, the wearable electronic device may display virtual object 921 (e.g., screen B) being a virtual object on the left side of the real object 910 (e.g., a monitor), virtual object 922 (e.g., screen C) being a virtual object above the real object 910 (e.g., a monitor), and virtual object 923 (e.g., screen D) being a virtual object on the right side of the real object 910 (e.g., a monitor), according to a user input. According to an embodiment, virtual object 924 (e.g., screen E) being a virtual object may be anchored to real object 911 (e.g., a calendar), being a real object.

According to an embodiment, the wearable electronic device may store information about the types of the virtual objects 921, 922, 923, and 924, the positions of the virtual objects 921, 922, 923, and 924 in space, and relationships (e.g., relative positions, or anchored or not) between the virtual objects 921, 922, 923, and 924 and the real object 910 (e.g., a monitor) and real object 911 (e.g., a calendar), as the workspace of the first space in memory.

According to an embodiment, while the first space is shown as an office in FIG. 9, the disclosure is not limited thereto, and the number, positions, and arrangement of virtual objects are not limited to FIG. 9.

Figure 10:
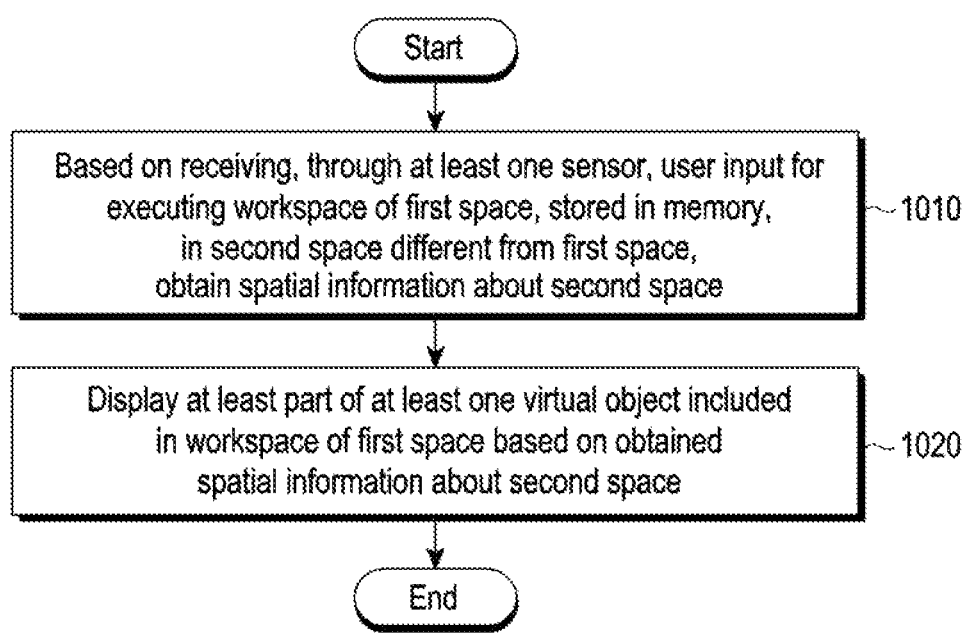
FIG. 10 is a flowchart illustrating an operation of executing a workspace in a space different from a space for which a workspace is stored in a wearable electronic device according to an embodiment.

FIG. 10 is a flowchart illustrating an operation of executing a workspace in a space different from a space for which the workspace is stored in a wearable electronic device according to an embodiment of the disclosure.

According to an embodiment, referring to FIG. 10, in operation 1010, based on receiving a user input for executing a workspace of a first space stored in memory (e.g., the memory 130 of FIG. 1) in a second space different from the first space, a wearable electronic device (e.g., the electronic device 101 or the processor 120 of FIG. 1) may obtain spatial information about the second space through at least one sensor (e.g., the sensor module 176 of FIG. 1).

According to an embodiment, the wearable electronic device may obtain or determine at least one of the structure of the second space in which the wearable electronic device is located, the position of the second space, the size of the second space, information about a space available to the user in the second space, a distance to a real object included in the second space, an object arrangement, or an object type, or information about the above, through at least one sensor.

According to an embodiment, the wearable electronic device may obtain the information about the space available to the user based on at least one of distances between the wearable electronic device and a plurality of objects included in the second space or the sizes of at least some of the plurality of objects through at least one sensor. For example, the wearable electronic device may obtain the information about the space available to the user based on at least one of a wall of the second space in which the wearable electronic device is located, a distance to a real object such as another person or a monitor which may serve as a reference for workspace implementation in the second space, or the size of the monitor.

According to an embodiment, the wearable electronic device may select a real object that may serve as a reference for implementing a workspace through a user input, and use information about the distance to the selected real object or information about the size of the real object to obtain the information about the space available to the user. According to an embodiment, the real object used to obtain the information about the space available to the user may not be selected by the user, but by analysis of the wearable electronic device. For example, a real object in the second space having a similar type to that of a real object included in the workspace of the first space may be used to obtain the information about the space available to the user, even though the real object is not selected by a user input.

According to an embodiment, in operation 1020, the wearable electronic device may display at least a part of the at least one virtual object included in the workspace of the first space on a display based on the obtained spatial information about the second space.

According to an embodiment, upon receipt of a user input for selecting one of a plurality of objects included in the second space as a reference for executing the workspace of the first space, the wearable electronic device may dispose at least one virtual object included in the workspace of the first space with respect to the selected object.

According to an embodiment, when the size of the space available to the user in the second space is equal to or greater than a specified value, the wearable electronic device may implement the workspace of the second space by maintaining the arrangement and shapes of the virtual objects included in the workspace of the first space.

According to an embodiment, when identifying a virtual object that is not displayable in the second space among the at least one virtual object included in the workspace of the first space, the wearable electronic device may display another virtual object related to the virtual object that is not displayable, at a position in the second space corresponding to the position of the virtual object displayed in the first space. For example, when an application is not executable in the second space or when a real object corresponding to a real object to which the virtual object is anchored in the first space does not exist in the second space, the wearable electronic device may identify that the virtual object corresponding to the application is not displayable in the second space.

For example, cases in which an application in the first space is not executable in the second space may include a case in which an application has different functions in the first space and the second space (e.g., a case in which an IoT device control application controls IoT devices having different functions according to spaces), and a case in which an application has different security levels in the first space and the second space. According to an embodiment, an example of an operation of converting a virtual object that is not displayable in the second space into another related virtual object and displaying the converted virtual object is described below with reference to FIGS. 15A, 15B and 15C.

According to an embodiment, when the size of the space available to the user is less than the specified value based on the information about the space available to the user, the wearable electronic device may change at least one of the sizes, shapes, or the positions of the virtual objects included in the first space, and display the changed virtual objects on the display. According to an embodiment, an example of an operation of the wearable electronic device, when the size of a space available to a user is less than a specified value is described below with reference to FIG. 16.

Figure 11A:
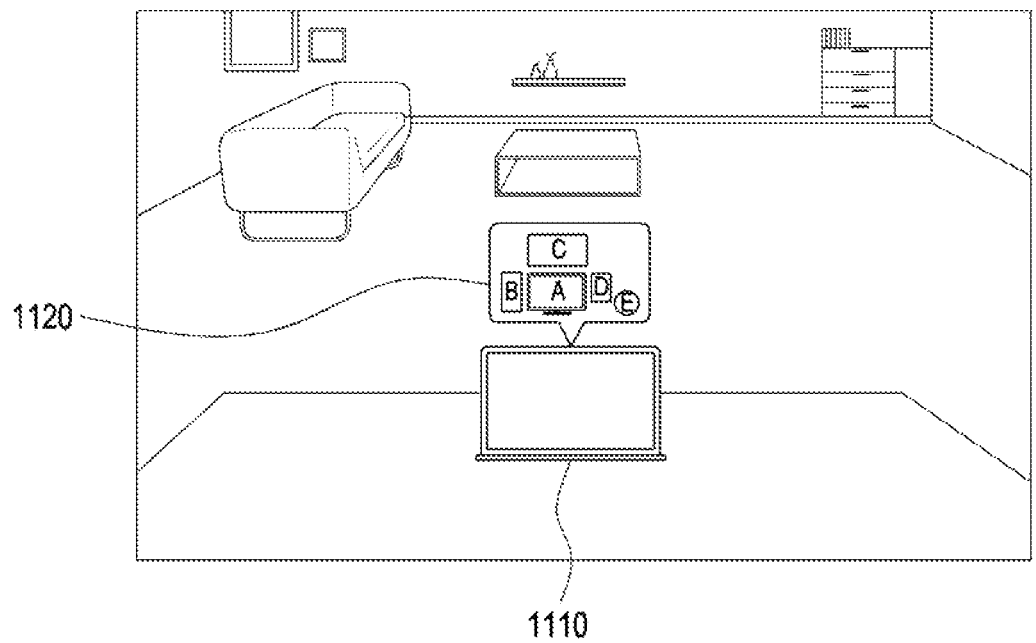
FIG. 11A is a diagram illustrating an operation of executing a workspace in a space different from a space for which a workspace is stored in a wearable electronic device according to an embodiment.

FIG. 11A is a diagram illustrating an operation of executing a workspace in a space different from a space for which the workspace is stored in a wearable electronic device according to an embodiment of the disclosure. For example, FIG. 11A illustrates an embodiment in which a first space for which a workspace stored is an office as illustrated in FIG. 9, and the stored workspace is executed in a house as a second space different from the first space. Although the second space is shown as a house in the disclosure, the disclosure is not limited thereto.

According to an embodiment, referring to FIG. 11A, a wearable electronic device (e.g., the electronic device 101 of FIG. 1 or the processor 120 of FIG. 1) may receive a user input for executing a workspace 1120 of the first space stored in memory (e.g., the memory 130 of FIG. 1), using a monitor 1110 being a real object included in the second space as a reference object. For example, the workspace 1120 of the first space may include screen A displayed on a real object, screen B displayed on the left side of the real object, screen C displayed above the real object, screen D displayed on the right side of the real object, and screen E anchored to another real object.

According to an embodiment, screen A displayed on the real object may be a screen displayed through a display of the real object or a user-set virtual object. According to an embodiment, when screen A is a screen output from the display of the real object, the screen may be a user-set application screen or a screen displayed according to real-time control of the user.

Figure 11B:
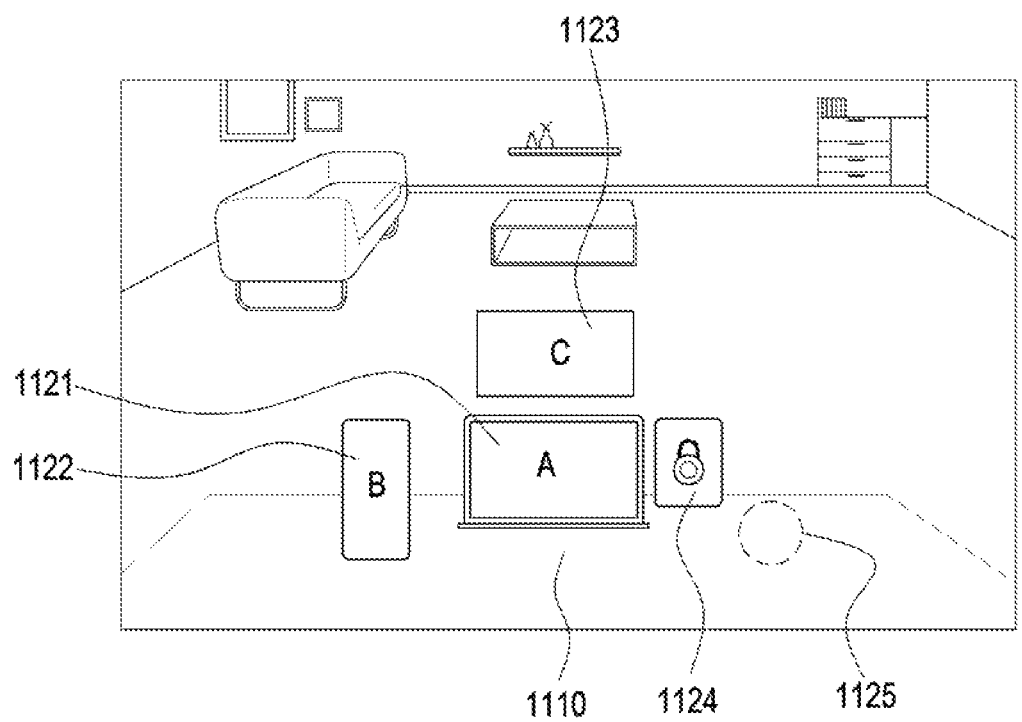
FIG. 11B is a diagram illustrating a workspace executed in a space different from a space for which the workspace is stored according to an embodiment.

FIG. 11B is a diagram illustrating a workspace executed in a space different from a space for which the workspace is stored according to an embodiment of the disclosure. For example, FIG. 11B illustrates an operation of the wearable electronic device, when the size of the space available to the user in the second space is equal to or greater than the specified value.

According to an embodiment, referring to FIG. 11B, the wearable electronic device may display screen A 1121 through the monitor 1110 being a real object included in the second space, screen B 1122 on the left side of the real object 1110, and screen C 1123 above the real object 1110.

According to an embodiment, when identifying screen D and screen E illustrated in FIG. 11A as virtual objects which are not executable in the second space, the wearable electronic device may display virtual objects 1124 and 1125 indicating that other virtual objects are non-executable in the second space. For example, the virtual objects indicating that other virtual objects are non-executable in the second space may be a virtual object 1124 indicating that another virtual object is non-executable for security reasons, and a virtual object 1125 indicating the absence of a real object to which a virtual object is to be anchored.

According to an embodiment, when identifying a virtual object that is not executable or is otherwise not displayable in the second space among a plurality of virtual objects included in the workspace of the first space, the wearable electronic device may convert the virtual object to another virtual object and display the converted virtual object. According to an embodiment, an example of an operation of converting a virtual object and displaying the converted virtual object, when a virtual object that is not displayable in the second space is identified is described below with reference to FIGS. 12 to 15C.

Figure 12:
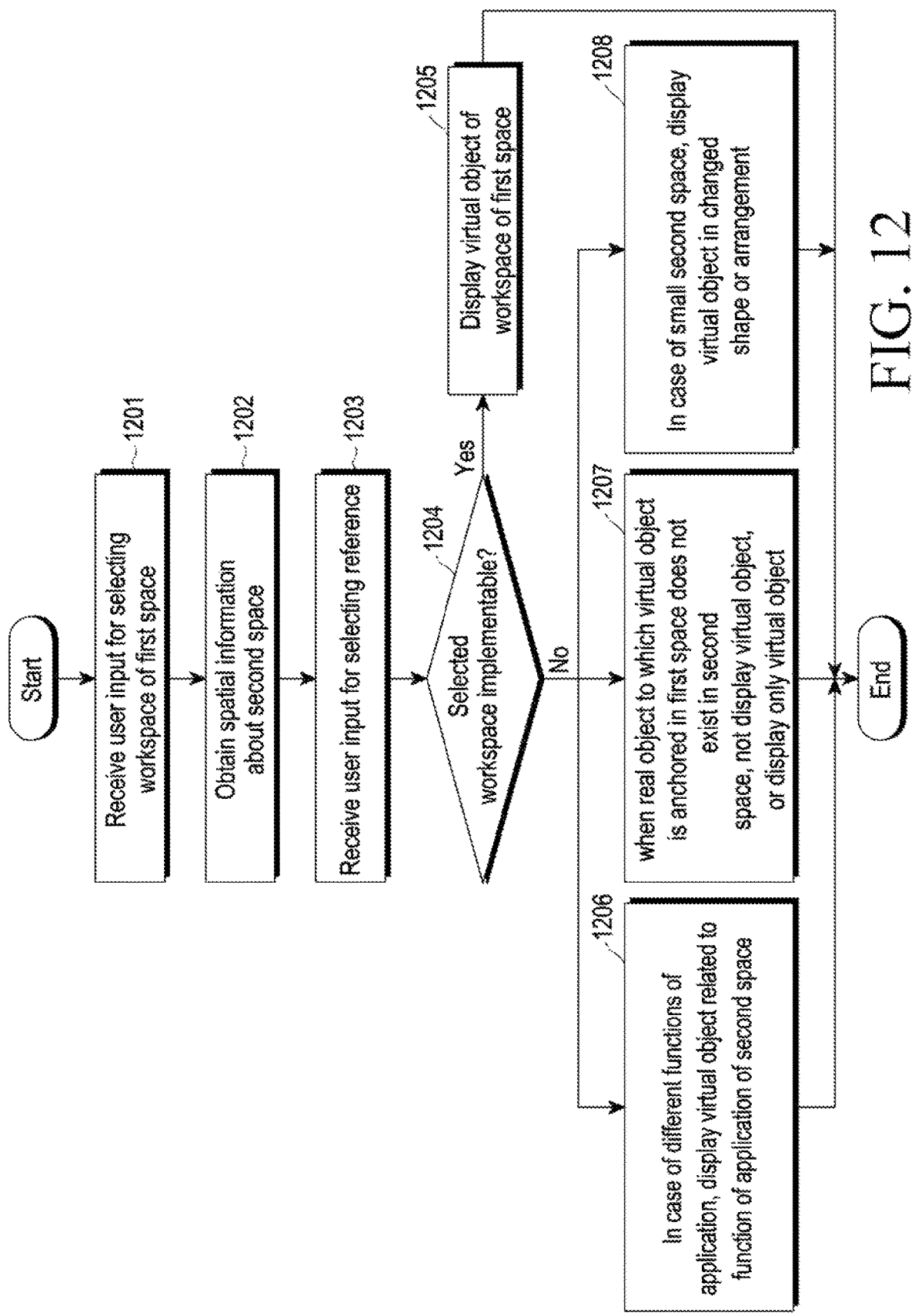
FIG. 12 is a flowchart illustrating an operation of executing a workspace in a wearable electronic device according to an embodiment.

FIG. 12 is a flowchart illustrating an operation of executing a workspace in a wearable electronic device according to an embodiment of the disclosure.

According to an embodiment, referring to FIG. 12, in operation 1201, a wearable electronic device (e.g., the electronic device of FIG. 1 or the processor 120 of FIG. 1) may receive a user input for selecting the workspace of a first space. For example, the wearable electronic device may receive a user input for selecting the workspace of the first space to execute the workspace of the first space in a second space. According to an embodiment, an example of an operation of receiving a user input for executing the workspace of a first space in a second space is described below with reference to FIG. 13.

According to an embodiment, in operation 1202, the wearable electronic device may obtain spatial information about the second space. For example, the wearable electronic device may obtain or determine at least one of the structure of the second space in which the wearable electronic device is located, the size of the second space, information about a space available to the user in the second space, a distance to a real object included in the second space, an object arrangement, or an object type, or information about the above, through at least one sensor (e.g., the sensor module 176 of FIG. 1).

While operation 1202 is shown as being performed after operation 1201 in FIG. 12, embodiments are not limited thereto. For example, in embodiments operation 1202 may be performed at another time, for example when the wearable electronic device is activated in the second space before operation 1201.

According to an embodiment, in operation 1203, the wearable electronic device may receive a user input for selecting a reference, for example a reference object. For example, the wearable electronic device may receive a user input for selecting a real object serving as a reference for implementing the workspace of the first space from among a plurality of real objects included in the second space. According to an embodiment, an example of an operation of receiving a user input for selecting a reference real object is described below with reference to FIG. 14.

According to an embodiment, in operation 1204, the wearable electronic device may identify whether the selected workspace is implementable. For example, the wearable electronic device may identify whether there is a virtual object that is not executable or otherwise not displayable in the second space among a plurality of virtual objects included in the workspace of the first space. According to an embodiment, when an application is not executable in the second space or when a real object to which a virtual object is anchored in the first space does not exist in the second space, the wearable electronic device may identify that a virtual object corresponding to the application is not displayable in the second space. For example, when an application has different functions in the first space and the second space, or when an application has a lower security level in the second space than in the first space, the application is not executable in the second space.

According to an embodiment, when identifying that the selected workspace is implementable (YES at operation 1204), the wearable electronic device may display the plurality of virtual objects included in the workspace of the first space on a display (e.g., the display module 160 of FIG. 1) by maintaining the arrangement and shapes of the virtual objects in operation 1205.

According to an embodiment, when the selected workspace is implementable, but the structure of the second space is different from that of the first space, the wearable electronic device may change at least one of the size or shape of a part of at least one virtual object included in the workspace of the first space based on the spatial information about the second space, and display the changed virtual object on the display. According to an embodiment, an example of an embodiment of changing at least one of the size or shape of a virtual object based on spatial information about a second space is described below with reference to FIGS. 18A to 19B.

According to an embodiment, when identifying that the selected workspace is not implementable in part (NO at operation 1205), the wearable electronic device may perform at least one of operations 1206, 1207 and 1208.

According to an embodiment, in operation 1206 performed when an application has different functions in the first space and the second space, when the application has different functions, the wearable electronic device may convert the virtual object to a virtual object related to the function of the application in the second space.

For example, based on a function of some application mapped to the first space among at least one application included in the workspace of the first space being different from a function of the application mapped to the second space, the wearable electronic device may replace a virtual object related to the function mapped to the first space with a virtual object related to the function mapped to the second space, and display the virtual object related to the function mapped to the second space on the display. According to an embodiment, an example of an operation of a wearable electronic device when an application has different functions in a first space and a second space is described below with reference to FIGS. 17A and 17B.

According to an embodiment, in operation 1207 performed when a real object to which a virtual object is anchored in the first space does not exist in the second space, the wearable electronic device may not display the virtual object anchored to the real object or may display only the virtual object. For example, the wearable electronic device may not display the virtual object according to a user selection, while displaying a message notifying that there is no real object to which the virtual object is to be anchored in the second space, or may display only the virtual object at a corresponding position in the second space.

According to an embodiment, in operation 1208 performed when the second space is too small to implement the workspace of the first space, the wearable electronic device may change at least one of the shapes or arrangement of the plurality of virtual objects included in the workspace of the first space, and display the changed virtual objects on the display. For example, when the size of a space available to the user in the second space is less than a specified value, the wearable electronic device may identify that the second space is small. When the second space is small, the wearable electronic device may convert a virtual object which is an execution screen or a widget screen to an icon, and dispose the icon on one side of a real object regardless of the arrangement of the workspace of the first space. According to an embodiment, an example of an operation of a wearable electronic device, when a second space is small is described below with reference to FIG. 16.

Figure 13:
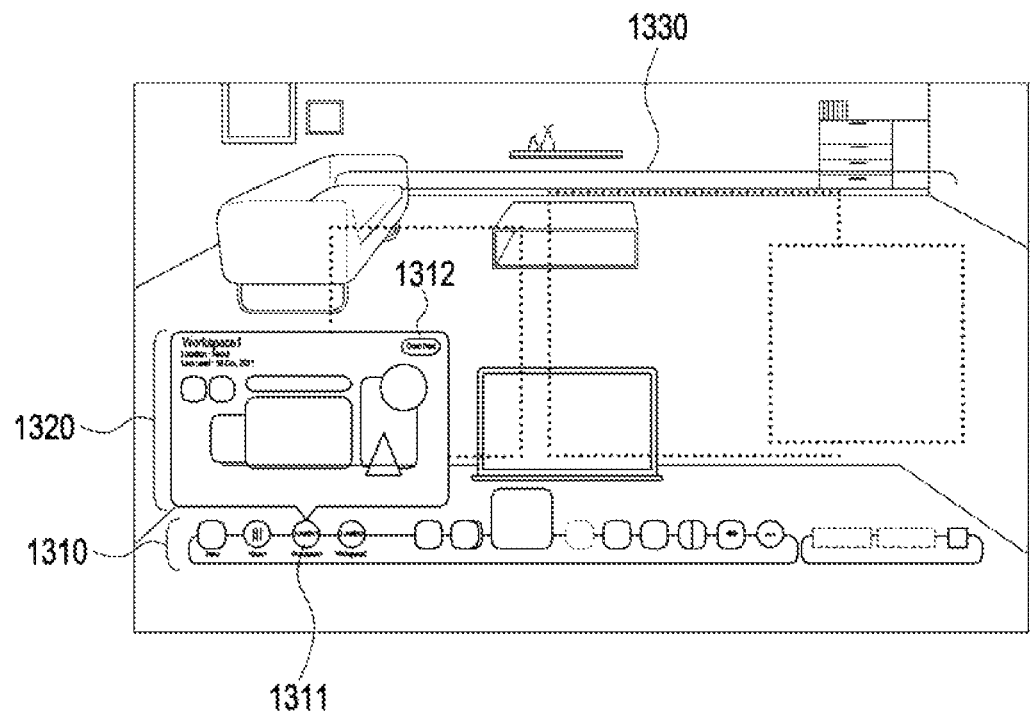
FIG. 13 is a flowchart illustrating an operation of selecting a workspace in a wearable electronic device according to an embodiment.

FIG. 13 is a diagram illustrating an operation of selecting a workspace in a wearable electronic device according to an embodiment of the disclosure.

According to an embodiment, referring to FIG. 13, a wearable electronic device (e.g., the electronic device 101 of FIG. 1 or the processor 120 of FIG. 1) may display a task bar 1310 including icons for executing a plurality of functions on a display (e.g., the display module 160 of FIG. 1).

According to an embodiment, upon receipt of a user input for selecting an icon 1311 for executing a workspace from the task bar 1310, the wearable electronic device may display a preview 1320 of a stored workspace. For example, the workspace displayed in the preview 1320 may be set for a space different from a space in which the wearable electronic device is located and stored in memory (e.g., the memory 130 of FIG. 1).

According to an embodiment, upon receipt of a user input for selecting a button 1312 for applying the workspace included in the preview 1320, the wearable electronic device may perform an operation of displaying the selected workspace in a space 1330 available to the user. For example, the space 1330 available to the user may be determined based on spatial information about a second space obtained through at least one sensor (e.g., the sensor module 176 of FIG. 1).

Figure 14:
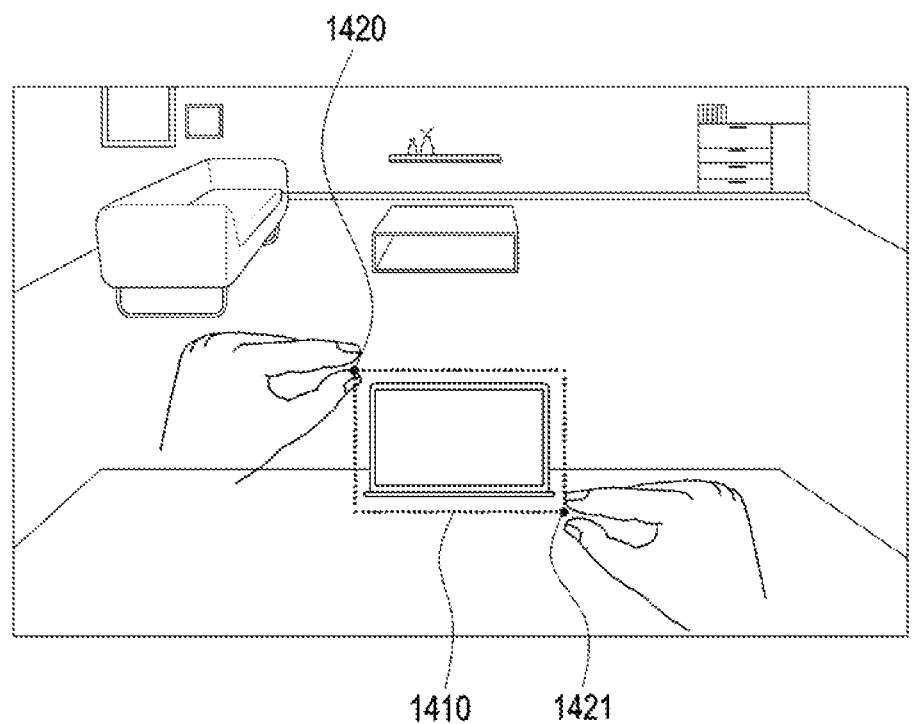
FIG. 14 is a diagram illustrating a reference object selection operation for executing a workspace according to an embodiment.

According to an embodiment, the operation of displaying the selected workspace in the space 1330 available to the user may be a reference object selection operation of FIG. 14.

FIG. 14 is a diagram illustrating a reference object selection operation for implementing a workspace according to an embodiment of the disclosure.

According to an embodiment, referring to FIG. 14, a wearable electronic device (e.g., the electronic device 101 of FIG. 1 or the processor 120 of FIG. 1) may receive a user input for selecting a reference object to implement a selected workspace from among real objects included in a second space. For example, the wearable electronic device may receive a gesture input designating or locating a first vertex 1420 and a second vertex 1421 to select a monitor 1410, which is a real object included in the second space, as a reference object. According to an embodiment, the user input for selecting the reference object may include a gesture input of drawing a boundary of the reference object in a closed curve or a gesture input of touching, pinching, or tapping to select the reference object.

Figure 15A:
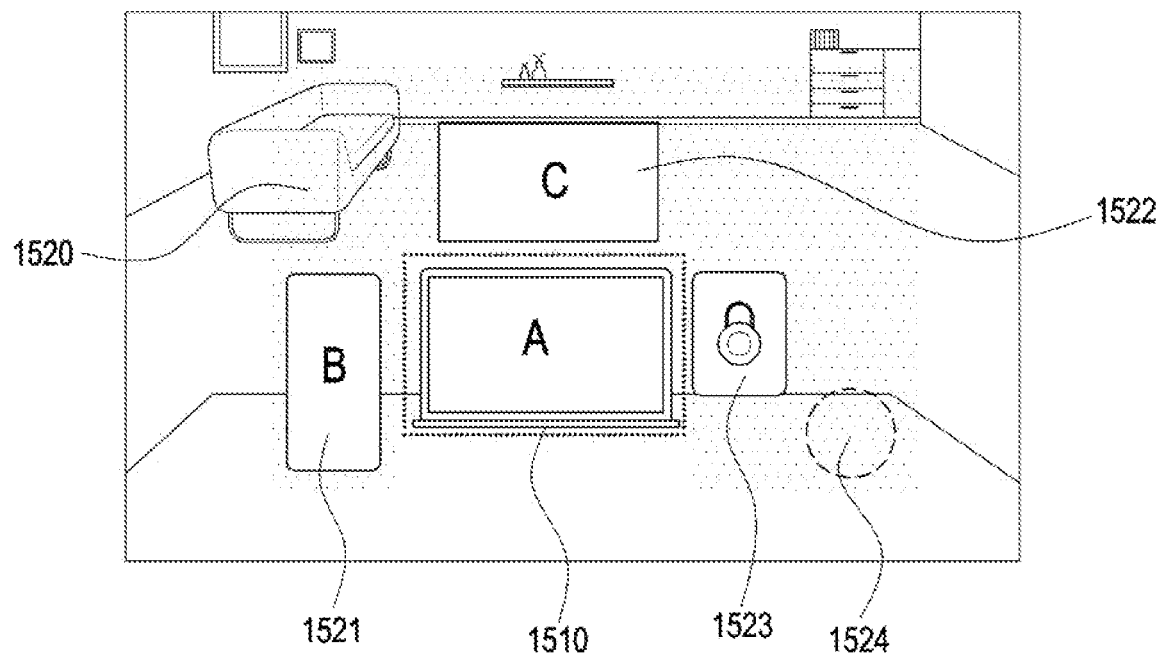
FIG. 15A is a diagram illustrating a workspace which is executed in a space different from a space in which the workspace is stored and thus is not capable of displaying some virtual objects according to an embodiment.

FIG. 15A is a diagram illustrating a workspace in which some virtual object is not displayable because of execution of a workspace stored for a space in a different space according to an embodiment of the disclosure.

According to an embodiment, referring to FIG. 15A, a wearable electronic device (e.g., the electronic device 101 of FIG. 1 or the processor 120 of FIG. 1) may display a workspace stored in memory (e.g., the memory 130 of FIG. 1) on a display (e.g., the display module 160 of FIG. 1). For example, the wearable electronic device may display a plurality of virtual objects 1521, 1522, 1523, and 1524 in a workspace area 1520 based on a monitor 1510 which is a real object included in a second space. According to an embodiment, the workspace selected in FIG. 15A may be the workspace set in FIG. 9A.

According to an embodiment, the wearable electronic device may select a workspace from the task bar illustrated in FIG. 13. Upon receipt of a user input for selecting the real object 1510 (e.g., a monitor) that is a real object included in the second space as a reference object as illustrated in FIG. 14, the wearable electronic device may display the selected workspace as illustrated in FIG. 15A.

According to an embodiment, the wearable electronic device may display screen A on the real object 1510 (e.g., a monitor) that is a real object included in the second space, virtual object 1521 (e.g., screen B) on the left side of the real object 1510 (e.g., a monitor), and virtual object 1522 (e.g., screen C) above the real object 1510 (e.g., a monitor).

According to an embodiment, when identifying that screen D and screen E illustrated in FIG. 9A as virtual objects that are not displayable in the second space, the wearable electronic device may display virtual objects 1523 and 1524 indicating that other virtual objects are non-displayable in the second space. For example, the virtual objects indicating that other virtual objects are non-displayable in the second space may be a virtual object 1523 indicating that another virtual object is non-displayable for security reasons, and a virtual object 1524 indicating the absence of a real object to which a virtual object is to be anchored.

Figure 15B:
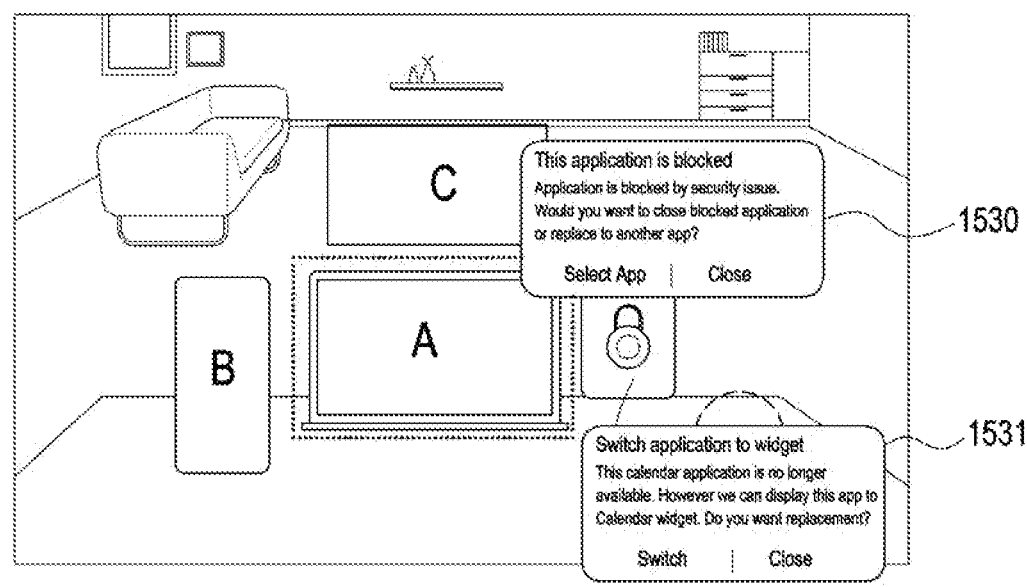
FIG. 15B is a diagram illustrating an operation of a wearable electronic device, when some of virtual objects included in an executed workspace may not be displayed according to an embodiment.

According to an embodiment, when identifying a virtual object that is not displayable in the second space, the wearable electronic device may receive a user input for selecting whether to replace the virtual object with another virtual object or not to display the virtual object that is not displayable, as illustrated in FIG. 15B.

FIG. 15B is a diagram illustrating an operation of a wearable electronic device, when some of virtual objects included in an executed workspace are not displayable according to an embodiment of the disclosure.

According to an embodiment, referring to FIG. 15B, when identifying a virtual object that is not displayable for security reasons, a wearable electronic device (e.g., the electronic device 101 of FIG. 1 or the processor 120 of FIG. 1) may display a message 1530 notifying that the virtual object is not displayable and asking whether to replace the virtual object with a virtual object of another application.

According to an embodiment, when identifying that there is no real object to which a virtual object is to be anchored, the wearable electronic device may display a message 1531 notifying that an application is not executable and asking whether to replace an application screen with a widget screen.

Figure 15C:
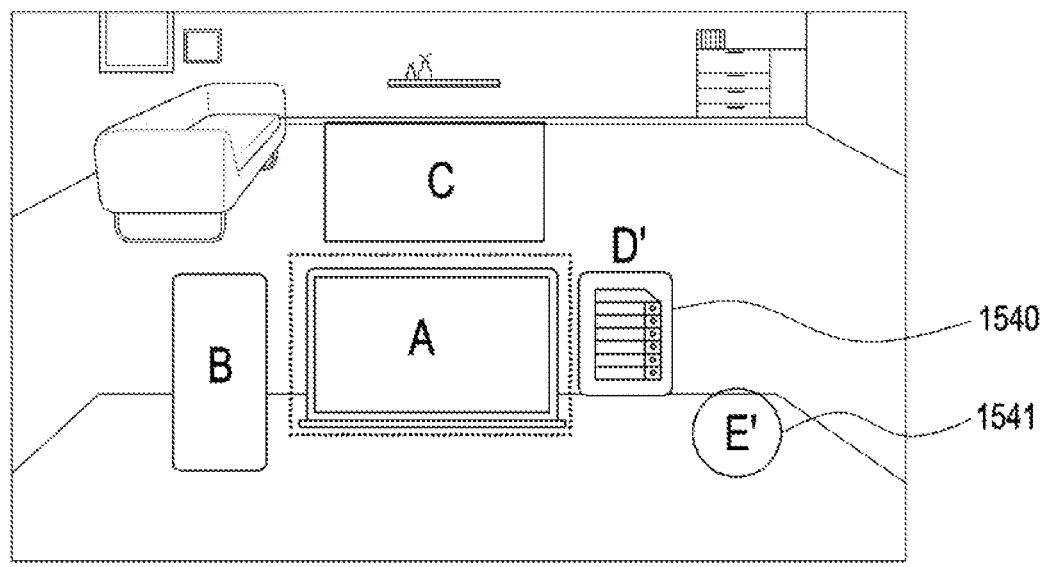
FIG. 15C is a diagram illustrating a changed workspace, when some of virtual objects included in a workspace may not be displayed according to an embodiment.

According to an embodiment, upon receipt of a user input for replacing the virtual object with another virtual object after displaying the message 1530 or 1531, the wearable electronic device may display a workspace in which the virtual object has been replaced with another virtual object as illustrated in FIG. 15C. Upon receipt of a user input for not replacing the virtual object with another virtual object, the wearable electronic device may maintain the virtual object 1523 indicating that a virtual object is not displayable for security reasons, and the virtual object 1524 indicating that there is no real object to which a virtual object is to be anchored, as illustrated in FIG. 15A. According to an embodiment, the wearable electronic device may display nothing instead of the virtual object 1524 indicating that there is no real object to which a virtual object is to be anchored.

FIG. 15C is a diagram illustrating a changed workspace, when some of virtual objects included in a workspace are not displayable according to an embodiment of the disclosure.

According to an embodiment, referring to FIG. 15C, upon receipt of a user input for replacing the virtual object with another virtual object after displaying the message 1530 or 1531 as illustrated in FIG. 15B, the wearable electronic device (e.g., the electronic device 101 of FIG. 1 or the processor 120 of FIG. 1) may display virtual object 1540 (e.g., screen D'), which is an execution screen of an application of a similar type to that of the application corresponding to the stored virtual object, or display virtual object 1541 (e.g., screen E'), being a widget screen, instead of the stored virtual object which is an application execution screen.

As such, when it is impossible to fully implement a workspace customized for a specific space during execution of the workspace in a different space, the stored workspace may be implemented as much as possible by modifying the workspace based on the space in which the workspace is executed.

Figure 16:
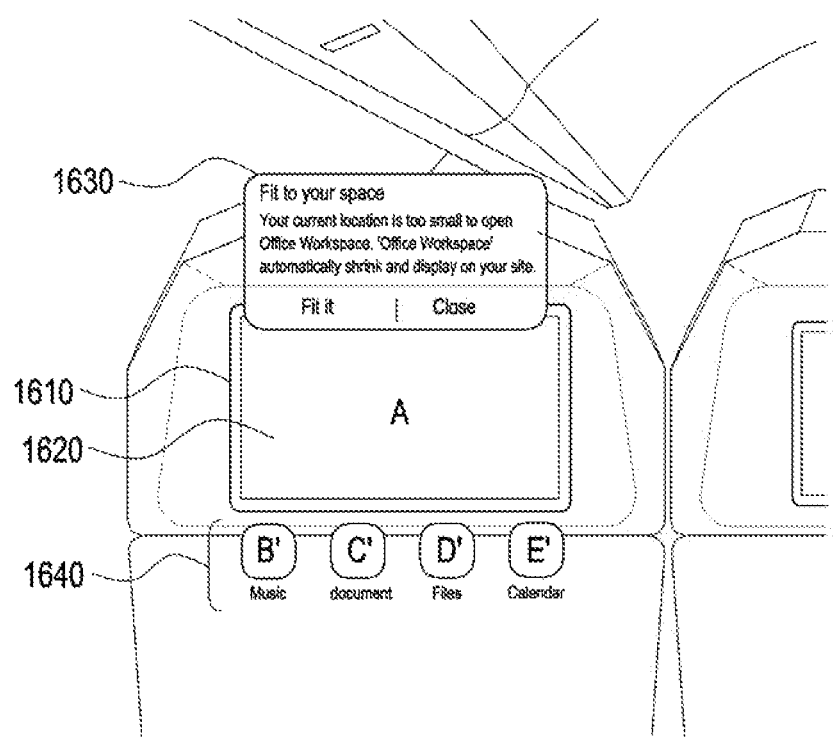
FIG. 16 is a diagram illustrating a workspace changed according to a space available for a user according to an embodiment.

FIG. 16 is a diagram illustrating a changed workspace based on a space available to a user according to an embodiment of the disclosure.

According to an embodiment, referring to FIG. 16, a wearable electronic device (e.g., the electronic device 101 of FIG. 1 or the processor 120 of FIG. 1) may receive a user input for executing the workspace of a first space in a second space (e.g., an airplane). When the second space is too small to execute the workspace of the first space, the wearable electronic device may change at least one of the shapes or arrangement of a plurality of virtual objects included in the workspace of the first space, and display the changed virtual objects on a display (e.g., the display module 160 of FIG. 1). For example, the wearable electronic device may obtain the size of a space available to the user in the second space through at least one sensor (e.g., the sensor module 176 of FIG. 1). When the size of the space available to the user is less than a specified value, the wearable electronic device may change at least one of the shapes or arrangement of the plurality of virtual objects included in the workspace of the first space, and display the changed virtual objects on the display.

According to an embodiment, the wearable electronic device may receive a user input for selecting a workspace in the task bar illustrated in FIG. 13 and selecting, as a reference object, a real object 1610 (e.g., a monitor), being a real object included in the second space as illustrated in FIG. 14. When the size of the space available to the user is less than the specified value, the wearable electronic device may display a message 1630 notifying that the size of the space available to the user is less than the specified value, and asking the user whether to change at least one of the shapes or arrangement of a plurality of virtual objects included in the workspace.

According to an embodiment, upon receipt of a user input for changing at least one of the shapes or arrangement of the plurality of virtual objects included in the workspace after displaying the message 1630, the wearable electronic device may display a plurality of virtual objects 1640 based on the monitor 1610 being a real object included in the second space. For example, the wearable electronic device may display screen A 1620 on the monitor 1610 being a real object, and the plurality of changed virtual objects 1640 being icons on one side of (e.g., below) the real object 1610 (e.g., a monitor), being a real object. For example, the wearable electronic device may change screen B, the screen C, screen D, and screen E illustrated in FIG. 9 to screen B', screen C', screen D', and screen E', respectively and display the changed screens.

As described above, even when a space is too small to implement a workspace, the wearable electronic device according to the disclosure may provide the user with an application or function executed in the workspace by changing and displaying the shape and arrangement of a virtual object.

Figure 17A:
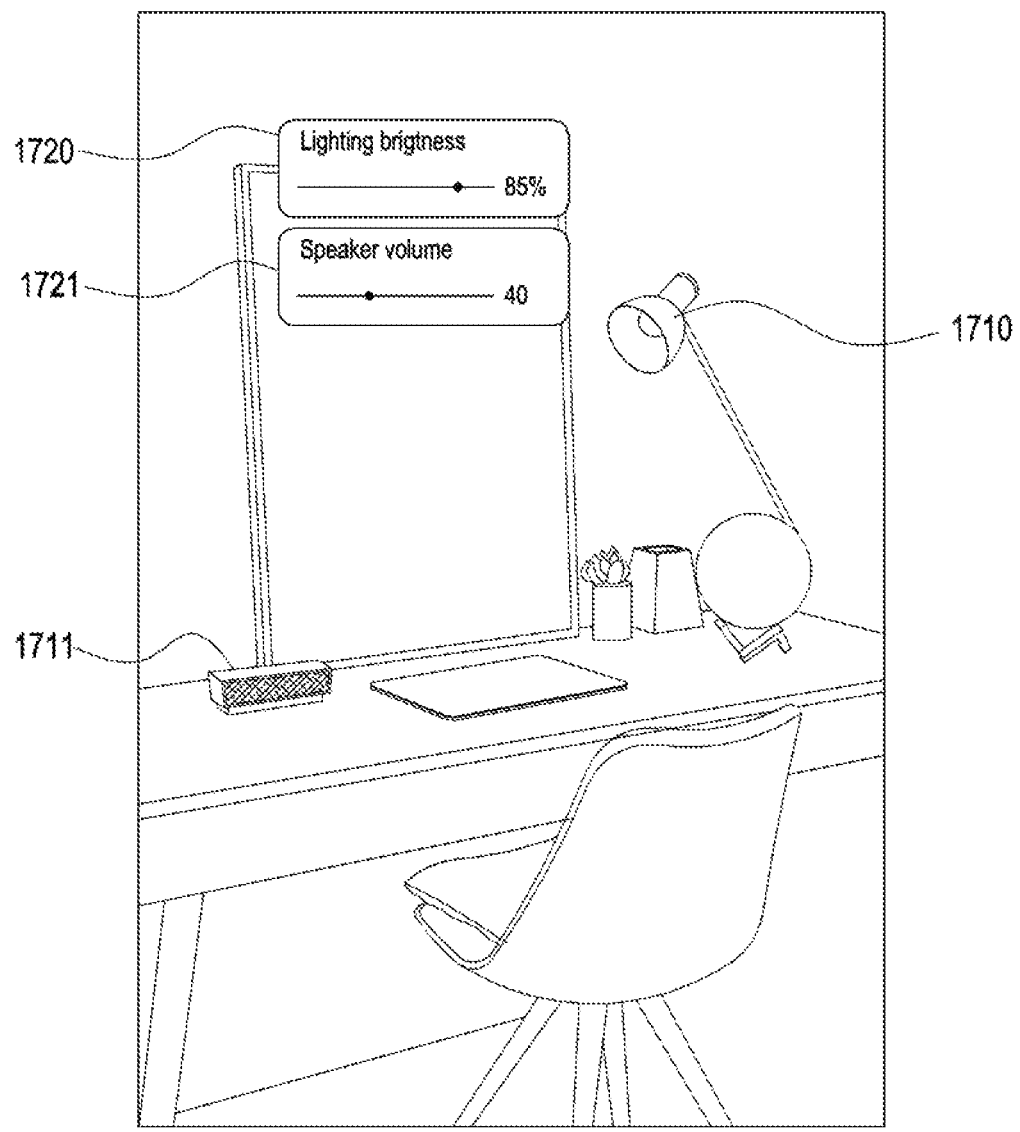
FIG. 17A is a diagram illustrating an operation of displaying a virtual object related to a function mapped to an application in a first space according to execution of a workspace according to an embodiment.

FIG. 17A is a diagram illustrating an operation of displaying a virtual object related to a function mapped to an application in a first space according to execution of a workspace according to an embodiment of the disclosure.

According to an embodiment, referring to FIG. 17A, upon receipt of a user input for executing a workspace stored in memory (e.g., the memory 130 of FIG. 1) in a first space (e.g., an office), a wearable electronic device (e.g., the electronic device of FIG. 1 or the processor 120 of FIG. 1) may display virtual objects 1720 and 1721 corresponding respectively to real object 1710 (e.g., a stand light) and a real object 1711 (e.g., a speaker), which are real objects included in the first space. It may be displayed on a display (e.g., the display module 160 of FIG. 1).

According to an embodiment, the stored workspace may have been set and stored for the first space or may have been set and stored for another space.

According to an embodiment, the virtual object 1720 may correspond to an application for controlling the real object 1710 (e.g., a stand light) by interworking with the real object 1710 (e.g., a stand light) and the virtual object 1721 may correspond to an application for controlling the real object 1711 (e.g., a speaker) by interworking with the real object 1711 (e.g., a speaker).

Figure 17B:
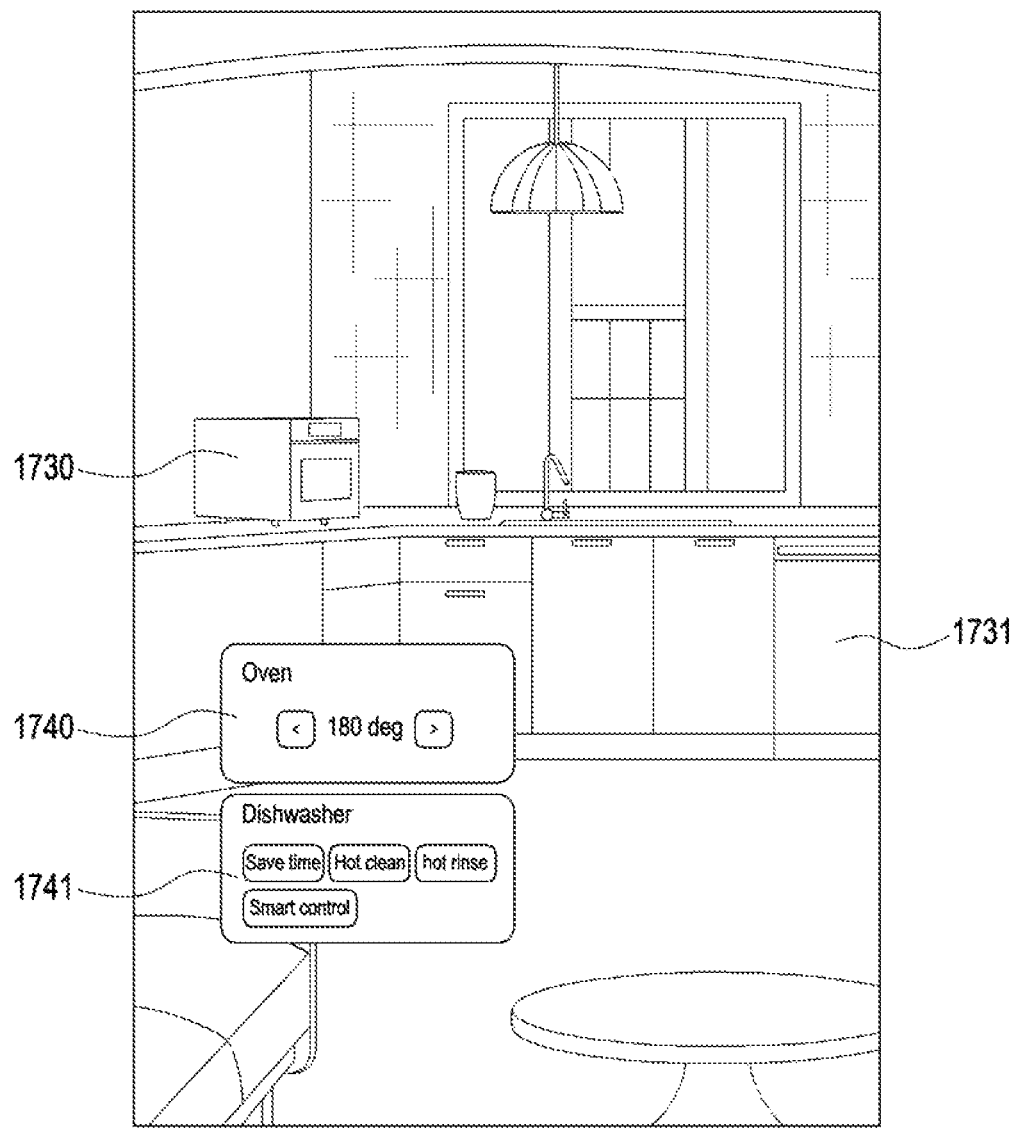
FIG. 17B is a diagram illustrating an operation of displaying a virtual object related to a function mapped to an application in a second space according to execution of a workspace according to an embodiment.

FIG. 17B is a diagram illustrating an operation of displaying a virtual object related to a function mapped to an application in a second space according to execution of a workspace according to an embodiment of the disclosure. For example, FIG. 17B is for the case where an application included in the workspace of a first space has a function of controlling the real object 1710 (e.g., a stand light) and the real object 1711 (e.g., a speaker) in the first space, whereas the application has a function of controlling a real object 1730 (e.g., an oven) and a real object 1731 (e.g., a dishwasher) in the second space.

According to an embodiment, referring to FIG. 17B, upon receipt of a user input for executing a workspace stored in memory (e.g., the memory 130 of FIG. 1) in a second space (e.g., a house), the wearable electronic device (e.g., the electronic device of FIG. 1 or the processor 120 of FIG. 1) may display virtual object 1740 related to functions of controlling the real object 1730 (e.g., an oven) and virtual object 1741 related to functions of controlling the real object 1731 (e.g., a dishwasher) on a display (e.g., the display module 160 of FIG. 1).

Figure 18A:
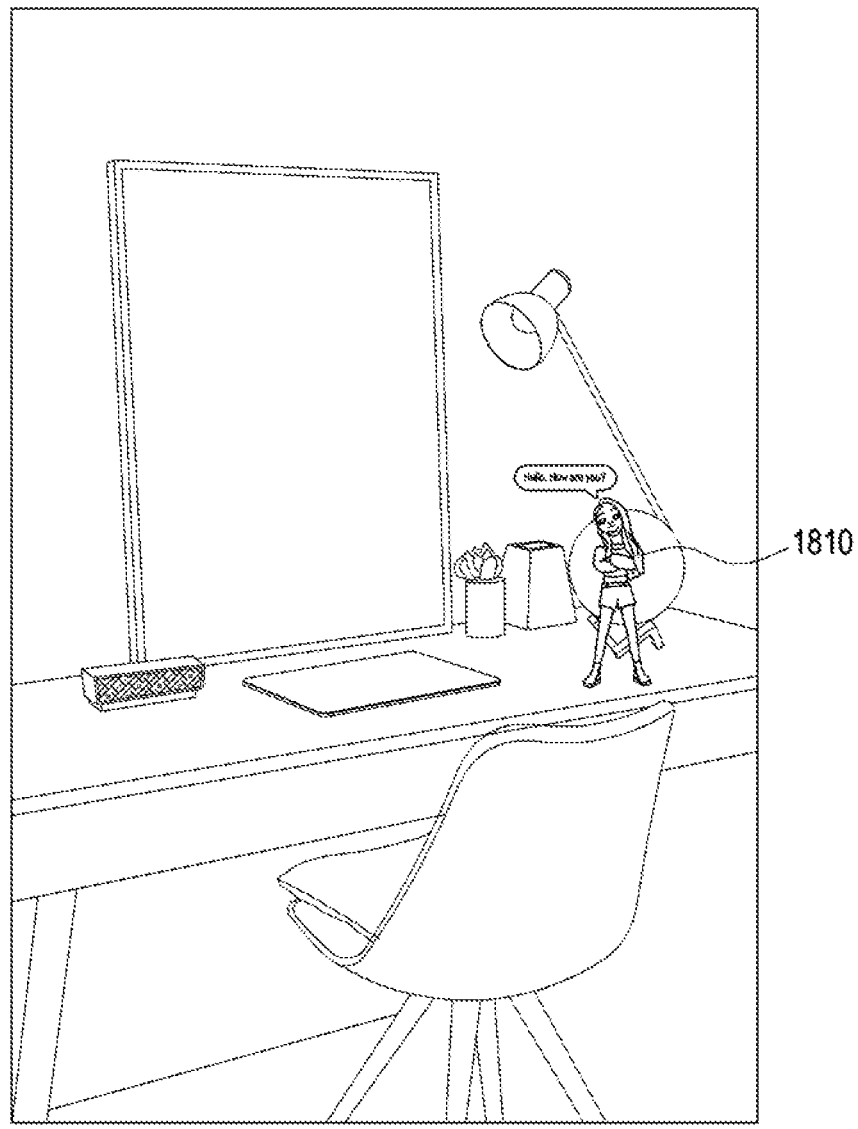
FIG. 18A is a diagram illustrating an operation of displaying a virtual object in a first size based on spatial information about a first space according to execution of a workspace according to an embodiment.

FIG. 18A is a diagram illustrating an operation of displaying a virtual object of a first size based on spatial information about a first space according to execution of a workspace according to an embodiment of the disclosure.

According to an embodiment, referring to FIG. 18A, upon receipt of a user input for executing a workspace stored in memory (e.g., the memory 130 of FIG. 1) in a first space (e.g., an office), a wearable electronic device (e.g., the electronic device of FIG. 1 or the processor 120 of FIG. 1) may display a virtual object 1810 having a small size on a display (e.g., the display module 160) based on the structure of the first space, such that the virtual object 1810 may be placed on a desk, which is a real object included in the first space.

According to an embodiment, the stored workspace may have been set and stored for the first space or may have been set and stored for another space.

For example, the virtual object 1810 may correspond to, but is not limited to, a messenger application.

Figure 18B:
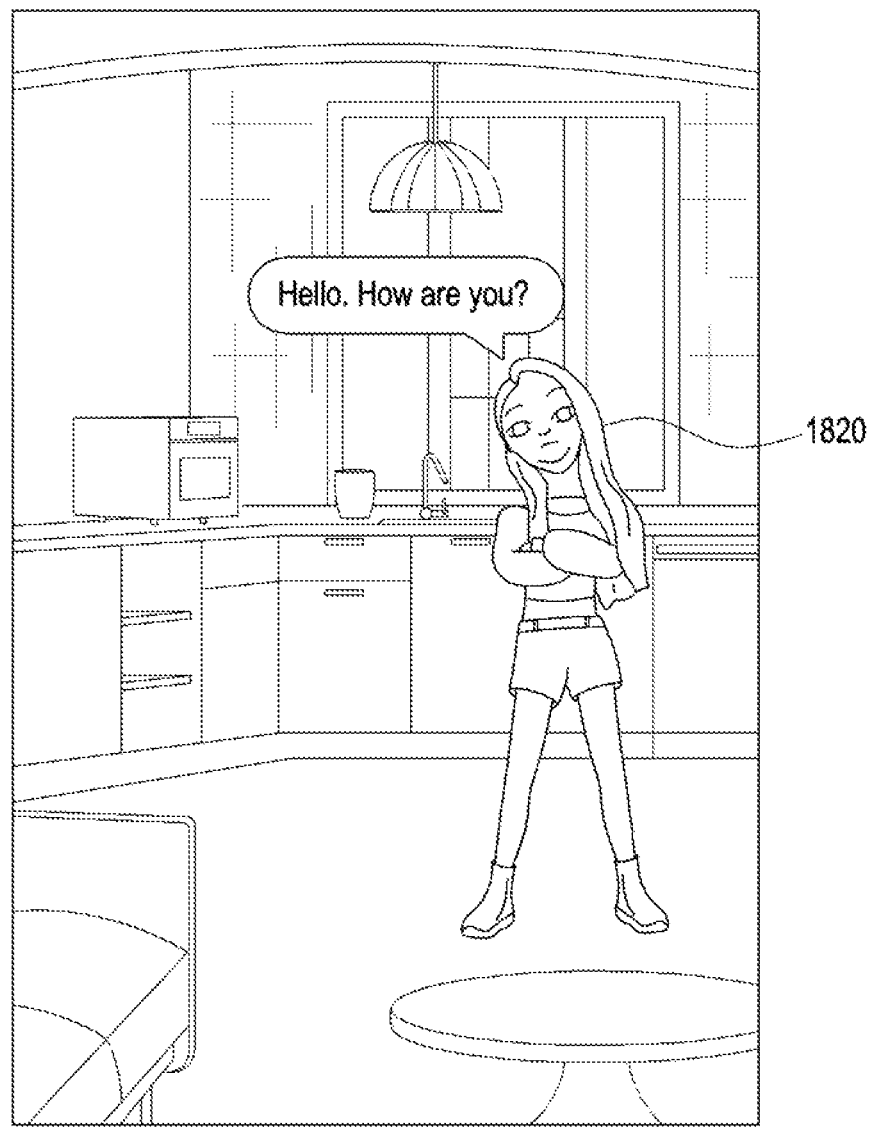
FIG. 18B is a diagram illustrating an operation of displaying a virtual object in a second size based on spatial information about a second space according to execution of a workspace according to an embodiment.

FIG. 18B is a diagram illustrating an operation of displaying a virtual object of a second size based on spatial information about a second space according to execution of a workspace according to an embodiment of the disclosure.

According to an embodiment, referring to FIG. 18B, upon receipt of a user input for executing a workspace stored in memory (e.g., the memory 130 of FIG. 1) in a second space (e.g., a house), a wearable electronic device (e.g., the electronic device of FIG. 1 or the processor 120 of FIG. 1) may display a virtual object 1820 having a large size on a display (e.g., the display module 160) based on the structure of the second space, such that the virtual object 1820 may be placed on the floor, which is a real object included in the second space.

According to an embodiment, when the second space is more personal than the first space based on the position and structure of the second space, the wearable electronic device may greatly increase the size of the virtual object and display the increased virtual object, for active interaction.

Figure 19A:
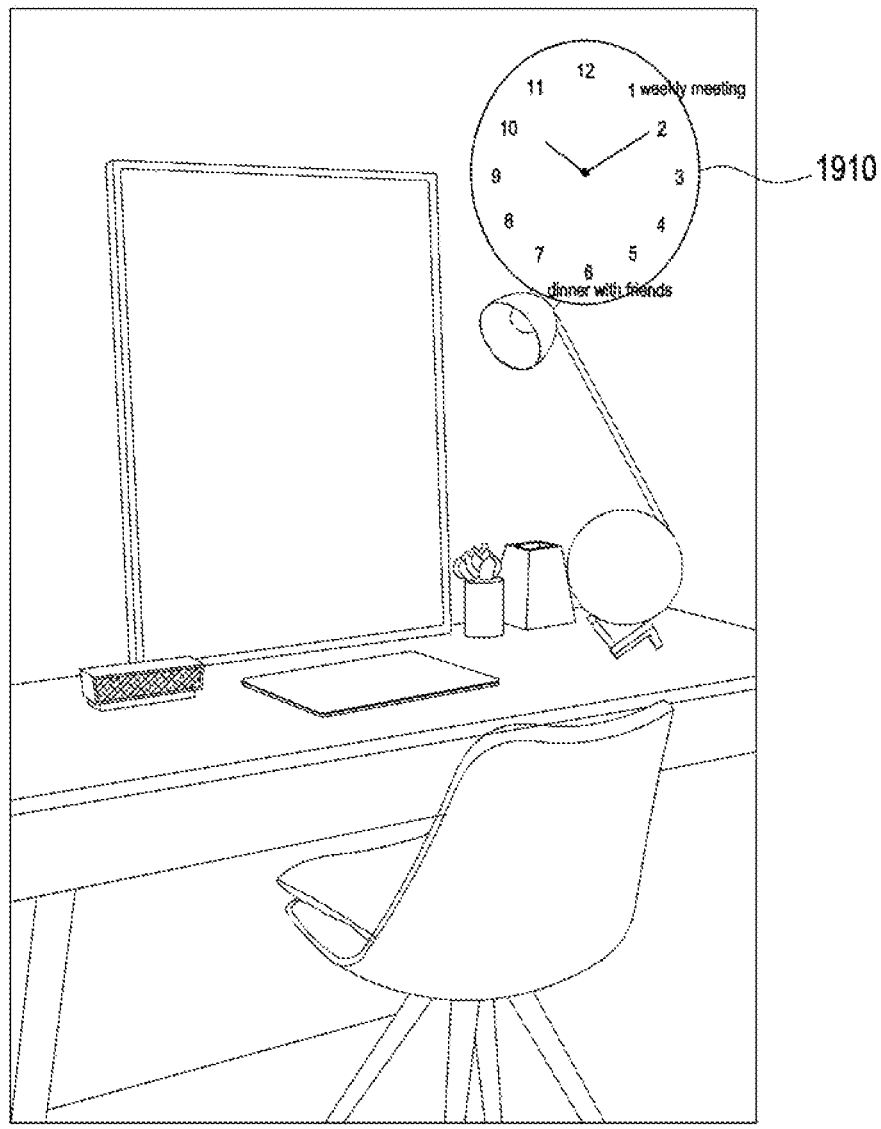
FIG. 19A is a diagram illustrating an operation of displaying a virtual object at a first position based on spatial information about a first space according to execution of a workspace according to an embodiment.

FIG. 19A is a diagram illustrating an operation of displaying a virtual object at a first position based on spatial information about a first space according to execution of a workspace according to an embodiment of the disclosure.

According to an embodiment, referring to FIG. 19A, upon receipt of a user input for executing a workspace stored in memory (e.g., the memory 130 of FIG. 1) in a first space (e.g., an office), a wearable electronic device (e.g., the electronic device of FIG. 1 or the processor 120 of FIG. 1) may display a virtual object 1910 in the form of a wall clock on a display (e.g., the display module 160) based on the structure of the first space, such that the virtual object 1910 may be placed on a wall, which is a real object included in the first space.

According to an embodiment, the stored workspace may have been set and stored for the first space or may have been set and stored for another space.

Figure 19B:
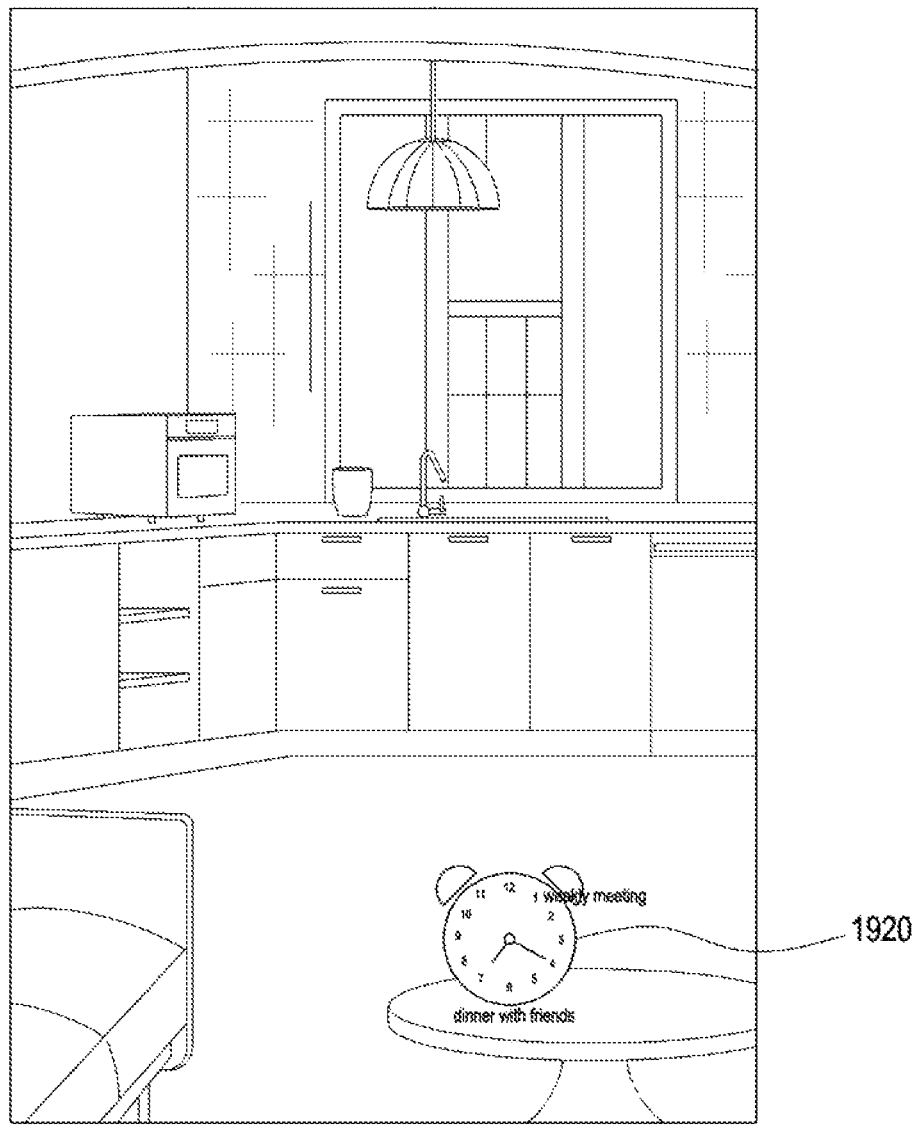
FIG. 19B is a diagram illustrating an operation of displaying a virtual object at a second position based on spatial information about a second space according to execution of a workspace according to an embodiment.

FIG. 19B is a diagram illustrating an operation of displaying a virtual object at a second position based on spatial information about a second space according to execution of a workspace according to an embodiment of the disclosure.

According to an embodiment, referring to FIG. 19B, upon receipt of a user input for executing a workspace stored in memory (e.g., the memory 130 of FIG. 1) in a second space (e.g., a house), a wearable electronic device (e.g., the electronic device of FIG. 1 or the processor 120 of FIG. 1) may display a virtual object 1920 in the form of a table clock on a display (e.g., the display module 160) based on the structure of the second space, such that the virtual object 1920 may be placed on a table, which is a real object included in the second space.

According to an embodiment, when there is no wall on which the wall clock may be disposed in the second space based on the structure of the second space, the wearable electronic device may change the size and shape of the virtual object and display the changed virtual object.

Figure 20A:
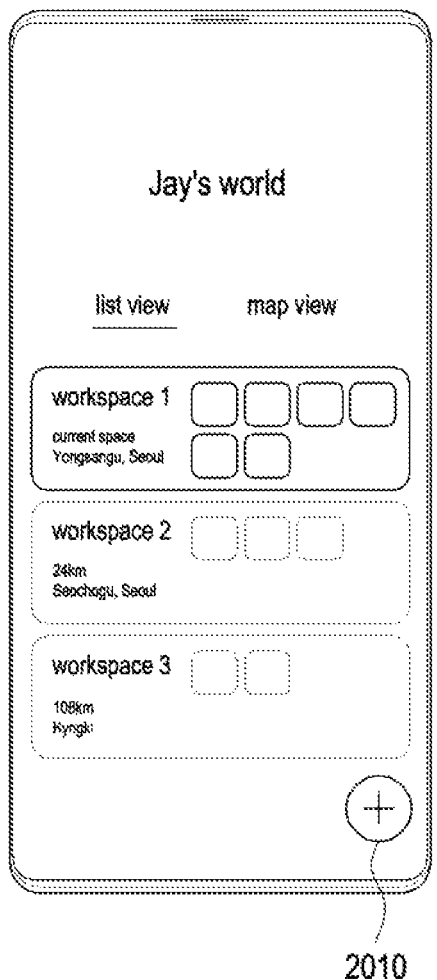
FIG. 20A is a diagram illustrating an operation of setting a workspace through an external electronic device connected to a wearable electronic device according to an embodiment.

FIG. 20A is a diagram illustrating an operation of setting a workspace through an external electronic device connected to a wearable electronic device according to an embodiment of the disclosure.

According to an embodiment, referring to FIG. 20A, an external electronic device (e.g., the electronic device 104 of FIG. 1) may display a stored workspace list. According to an embodiment, each workspace stored in the workspace list, for example workspace 1, workspace 2, and workspace 3, may include information about a location for which the workspace has been stored, and information about a selected application.

Figures 23A, 23B:
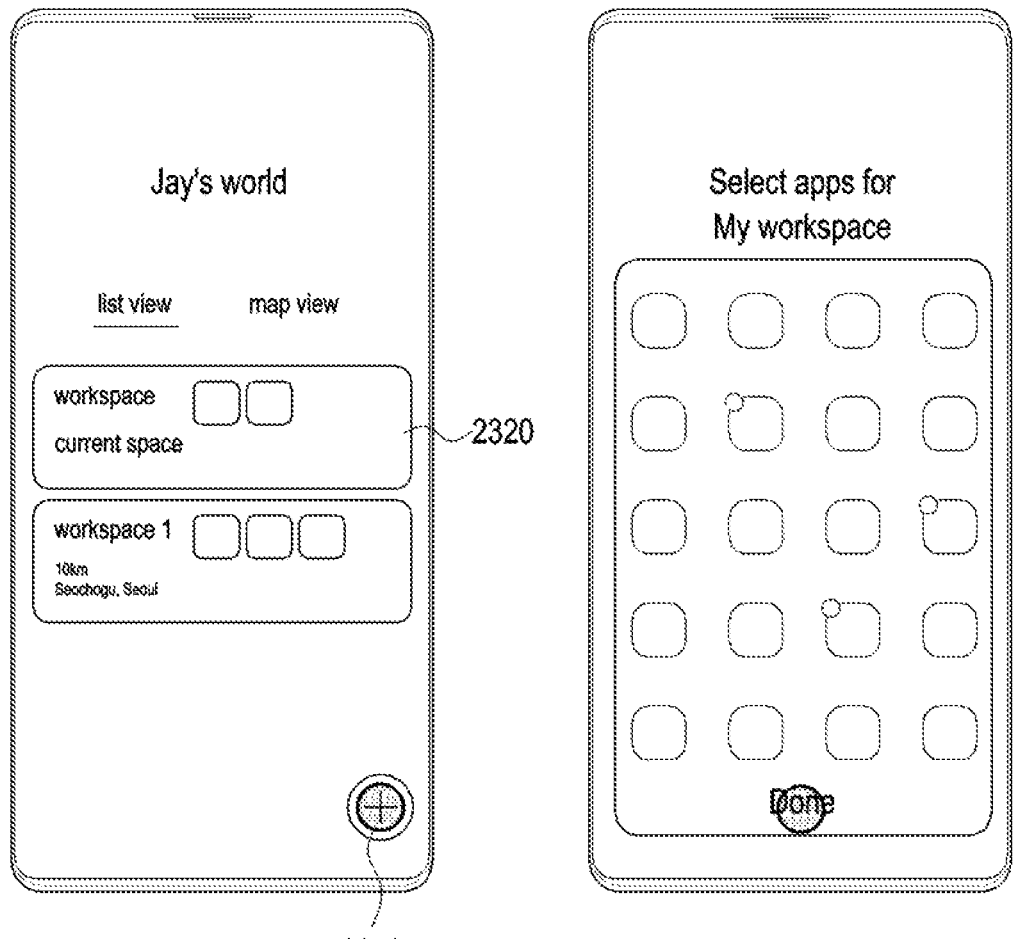
FIG. 23A is a diagram illustrating an operation of setting a workspace through an external electronic device connected to a wearable electronic device according to an embodiment.
FIG. 23B is a diagram illustrating an operation of setting a workspace through an external electronic device connected to a wearable electronic device according to an embodiment.
Figure 23C:
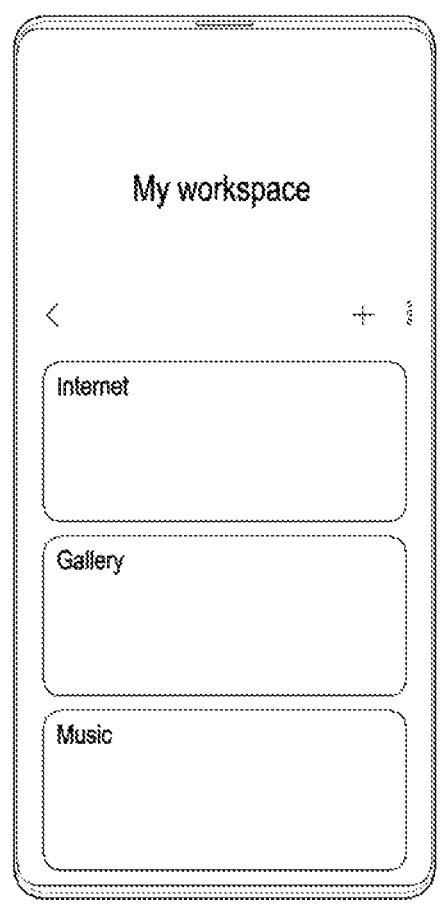
FIG. 23C is a diagram illustrating an operation of setting a workspace through an external electronic device connected to a wearable electronic device according to an embodiment.

According to an embodiment, upon receipt of a user input for selecting a button 2010 to add a workspace, the external electronic device may display a screen for setting a workspace, as illustrated in FIGS. 23A, 23B and 23C.

Figure 20B:
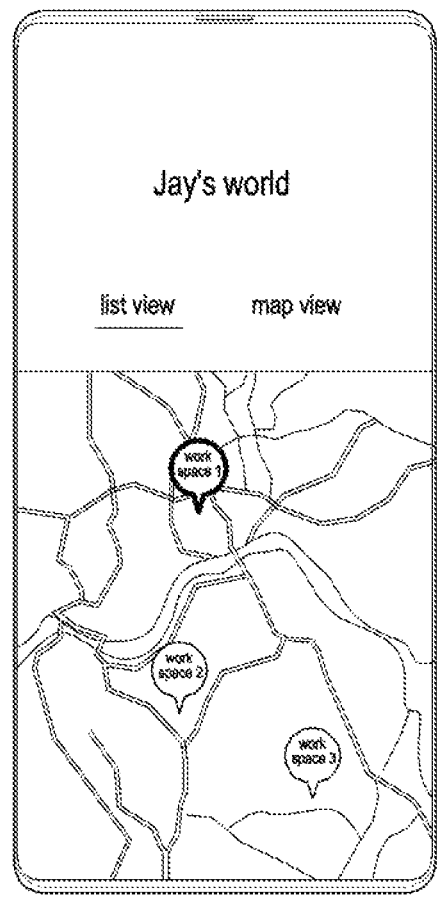
FIG. 20B is a diagram illustrating an operation of setting a workspace through an external electronic device connected to a wearable electronic device according to an embodiment.

FIG. 20B is a diagram illustrating an operation of setting a workspace through an external electronic device connected to a wearable electronic device according to an embodiment of the disclosure.

According to an embodiment, referring to FIG. 20B, an external electronic device (e.g., the electronic device 104 of FIG. 1) may display a stored workspace list on a map. According to an embodiment, the external electronic device may display each workspace on the map based on a location for which the workspace has been stored.

Each workspace stored in the workspace list may include information about a location for which the workspace has been stored, and information about a selected application.

Figure 21A:
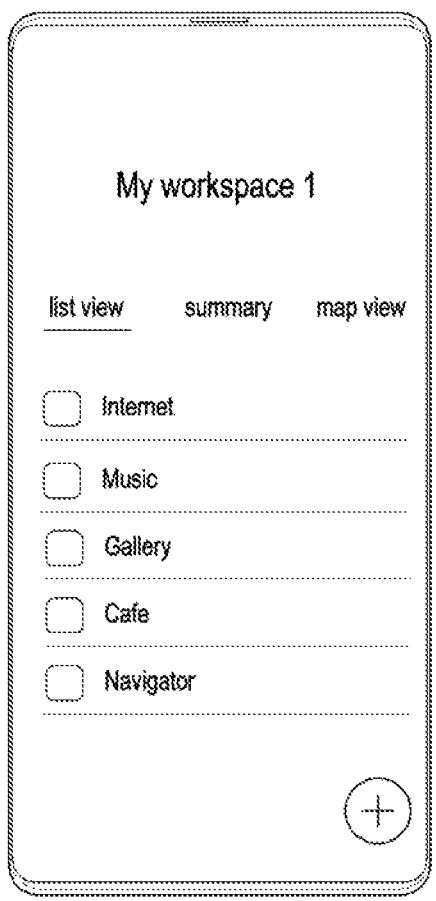
FIG. 21A is a diagram illustrating an operation of setting a workspace through an external electronic device connected to a wearable electronic device according to an embodiment.

FIG. 21A is a diagram illustrating an operation of setting a workspace through an external electronic device connected to a wearable electronic device according to an embodiment of the disclosure.

Figure 21B:
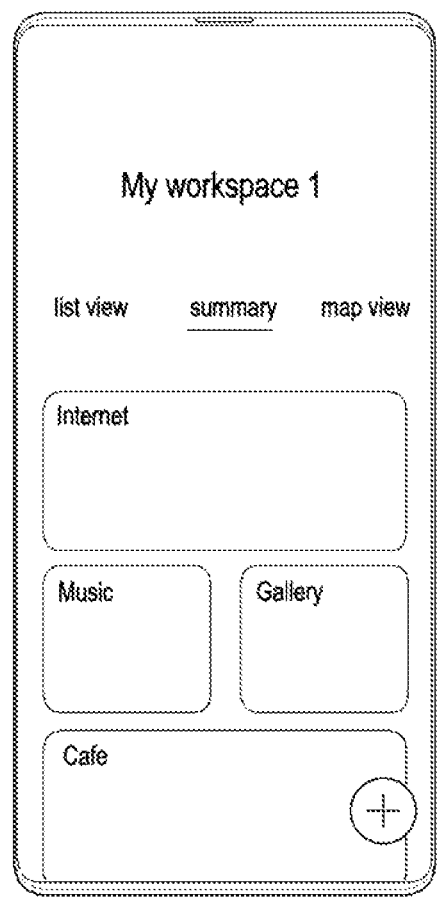
FIG. 21B is a diagram illustrating an operation of setting a workspace through an external electronic device connected to a wearable electronic device according to an embodiment.

FIG. 21B is a diagram illustrating an operation of setting a workspace through an external electronic device connected to a wearable electronic device according to an embodiment of the disclosure.

Figure 21C:
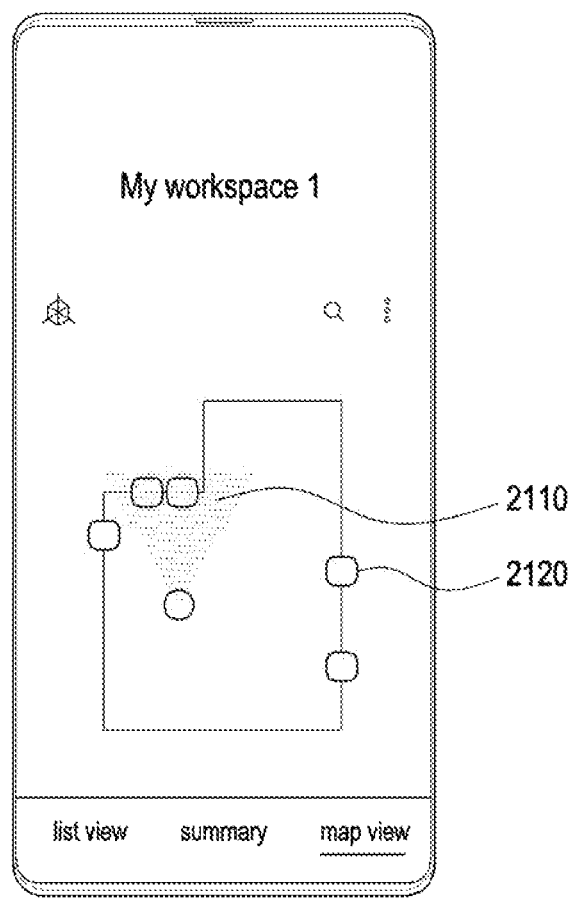
FIG. 21C is a diagram illustrating an operation of setting a workspace through an external electronic device connected to a wearable electronic device according to an embodiment.

FIG. 21C is a diagram illustrating an operation of setting a workspace through an external electronic device connected to a wearable electronic device according to an embodiment of the disclosure. For example, FIGS. 21A, 21B and 21C illustrate an operation of displaying information about a selected workspace, when the workspace is selected from the list of FIG. 20A or the map of FIG. 20B, according to embodiments.

According to an embodiment, referring to FIG. 21A, an external electronic device (e.g., the electronic device 104 of FIG. 1) may display a list of applications, for example an internet application, a music application, a gallery application, a cafe application, and a navigator application, executed in a selected workspace, workspace 1.

According to an embodiment, referring to FIG. 21B, the external electronic device (e.g., the electronic device 104 of FIG. 1) may display the application list executed in the selected workspace, workspace 1, in the form of thumbnails including virtual objects.

According to an embodiment, referring to FIG. 21C, the external electronic device (e.g., the electronic device 104 of FIG. 1) may display a layout view of a plurality of virtual objects executed in the selected workspace, workspace 1 on a map. According to an embodiment, the map on which the layout of the plurality of virtual objects is displayed may be an illustration of the shape of a space.

According to an embodiment, the external electronic device may visualize the position and viewing direction 2110 of the user on the map, and display the positions of a plurality of virtual objects 2120 arranged in the space.

Figure 22A:
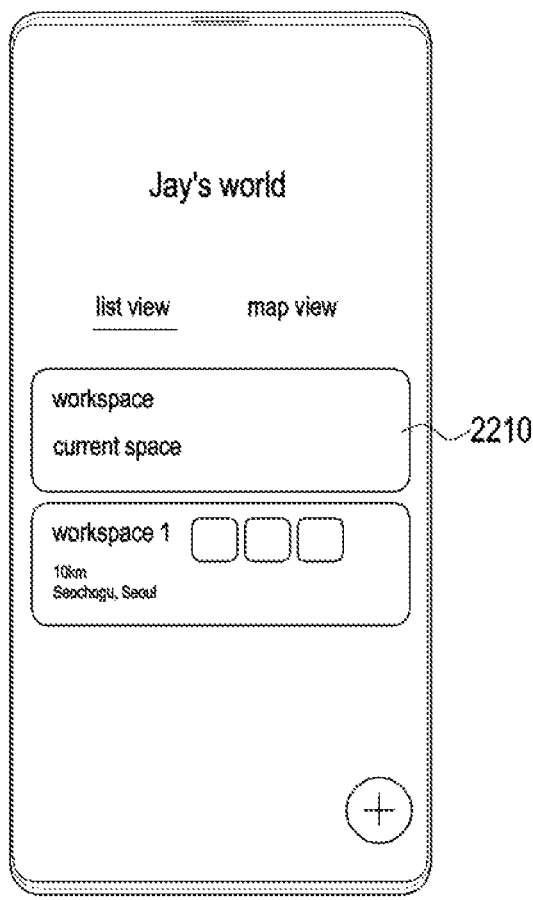
FIG. 22A is a diagram illustrating an operation of setting a workspace through an external electronic device connected to a wearable electronic device according to an embodiment.

FIG. 22A is a diagram illustrating an operation of setting a workspace through an external electronic device connected to a wearable electronic device according to an embodiment of the disclosure.

Figure 22B:
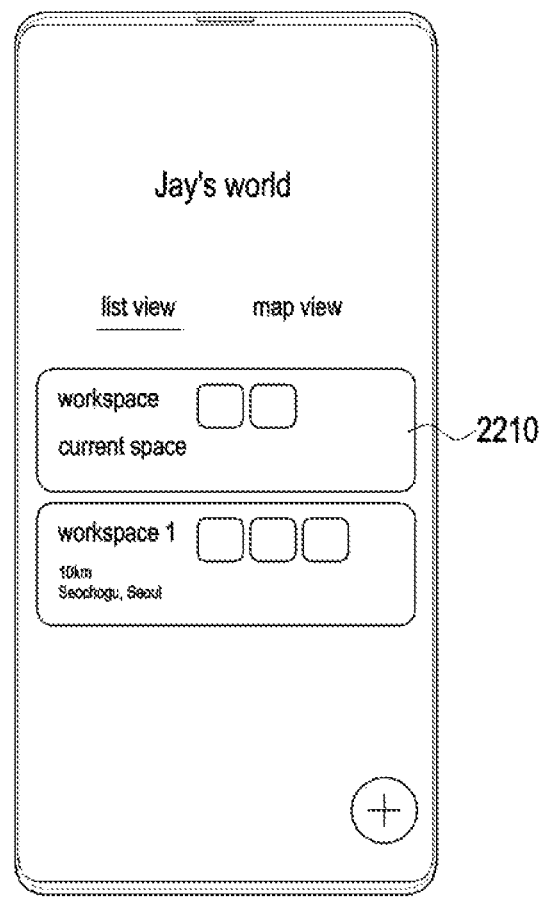
FIG. 22B is a diagram illustrating an operation of setting a workspace through an external electronic device connected to a wearable electronic device according to an embodiment.

FIG. 22B is a diagram illustrating an operation of setting a workspace through an external electronic device connected to a wearable electronic device according to an embodiment of the disclosure.

Figure 22C:
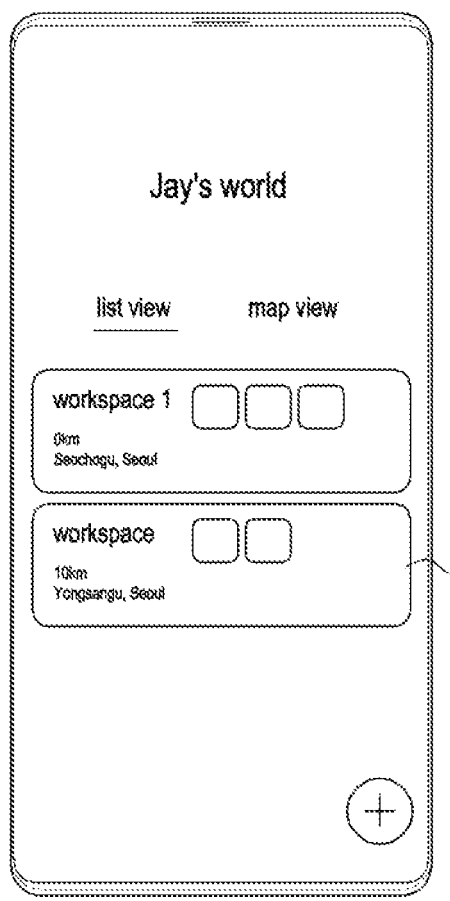
FIG. 22C is a diagram illustrating an operation of setting a workspace through an external electronic device connected to a wearable electronic device according to an embodiment.

FIG. 22C is a diagram illustrating an operation of setting a workspace through an external electronic device connected to a wearable electronic device according to an embodiment of the disclosure.

Figure 22D:
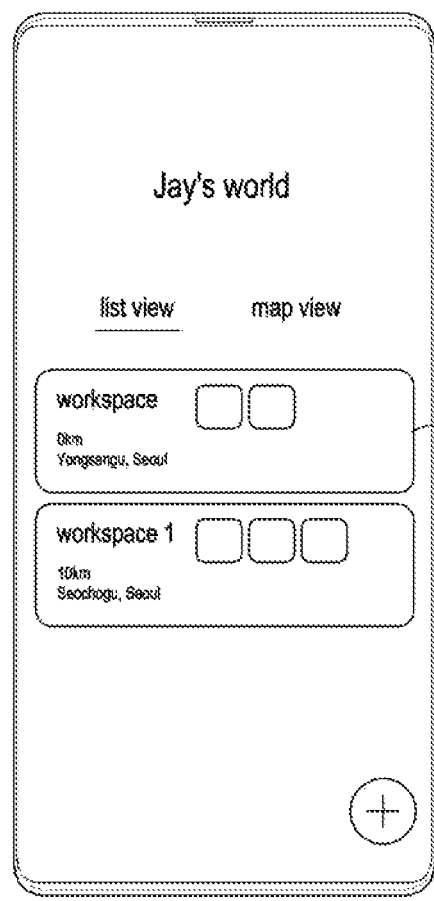
FIG. 22D is a diagram illustrating an operation of setting a workspace through an external electronic device connected to a wearable electronic device according to an embodiment.

FIG. 22D is a diagram illustrating an operation of setting a workspace through an external electronic device connected to a wearable electronic device according to an embodiment of the disclosure.

According to an embodiment, referring to FIG. 22A, when a wearable electronic device (e.g., the electronic device 101 of FIG. 1) is used in space A for which a workspace has not been stored, an external electronic device (e.g., the electronic device 104 of FIG. 1) may automatically generate and display a new workspace 2210.

According to an embodiment, referring to FIG. 22B, the external electronic device (e.g., the electronic device 104 of FIG. 1) may select two applications through the wearable electronic device (e.g., the electronic device 101 of FIG. 1), and upon receipt of a user input for arranging two virtual objects corresponding respectively to the two applications in space A, display the two selected applications in a new workspace 2210.

According to an embodiment, referring to FIG. 22C, when the wearable electronic device (e.g., the electronic device 101 of FIG. 1) moves from space A to space B for which a workspace has been stored, the wearable electronic device may automatically execute the workspace of space B, and the external electronic device may display that a workspace 1 of space B is being executed. According to an embodiment, the workspace 2210 of space A may be automatically stored in the state at the time when the use of the wearable electronic device in space A ends.

According to an embodiment, referring to FIG. 22D, when the wearable electronic device (e.g., the electronic device 101 of FIG. 1) moves from space B to space A again, the wearable electronic device may automatically execute the workspace 2210 of space A, and the external electronic device may display that the workspace 2210 of space A is being executed.

FIG. 23A is a diagram illustrating an operation of setting a workspace through an external electronic device connected to a wearable electronic device according to an embodiment of the disclosure.

FIG. 23B is a diagram illustrating an operation of setting a workspace through an external electronic device connected to a wearable electronic device according to an embodiment of the disclosure.

FIG. 23C is a diagram illustrating an operation of setting a workspace through an external electronic device connected to a wearable electronic device according to an embodiment of the disclosure.

According to an embodiment, referring to FIG. 23A, an external electronic device (e.g., the electronic device 104 of FIG. 1) may receive a user input for selecting a button 2310 to generate a new workspace 2320 in space A in which a wearable electronic device (e.g., the electronic device 101 of FIG. 1) is currently located.

According to an embodiment, upon receipt of a user input for selecting the button 2310 to generate a new workspace, the external electronic device may identify whether there is an application being executed in the space in which the wearable electronic device is currently located. In the absence of any application being executed, the external electronic device may display a screen for selecting an application after storing current location information. According to an embodiment, in the presence of an application being executed in the space in which the wearable electronic device is currently located, the external electronic device may identify whether there is a currently executed workspace. When a workspace is being executed, the external electronic device may receive a user input for confirming whether to set a new workspace different from the workspace which is being executed, and then display a screen for selecting an application.

According to an embodiment, referring to FIG. 23B, the external electronic device (e.g., the electronic device 104 of FIG. 1) may display a screen for receiving a selection of an application to be included in the new workspace 2320. For example, the external electronic device may display an application list, and receive a user input for selecting an application.

According to an embodiment, upon receipt of a user input for completing the application selection, the external electronic device may display applications to be included in the workspace 2320, as illustrated in FIG. 23C.

Figure 24A:
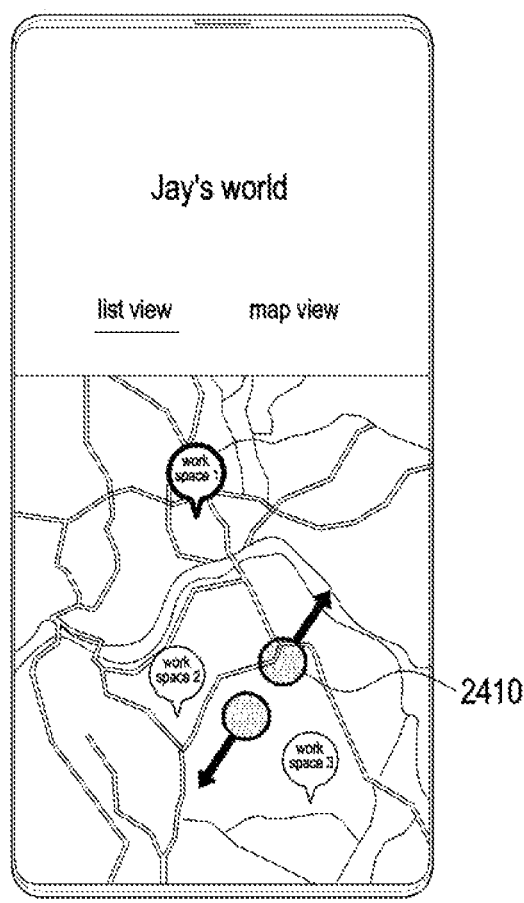
FIG. 24A is a diagram illustrating an operation of setting a workspace through an external electronic device connected to a wearable electronic device according to an embodiment.

FIG. 24A is a diagram illustrating an operation of setting a workspace through an external electronic device connected to a wearable electronic device according to an embodiment of the disclosure.

Figure 24B:
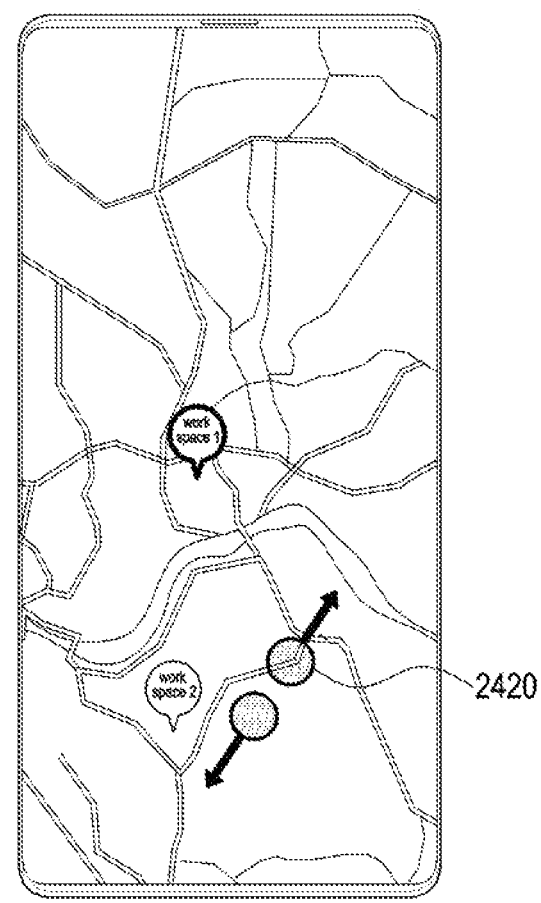
FIG. 24B is a diagram illustrating an operation of setting a workspace through an external electronic device connected to a wearable electronic device according to an embodiment.

FIG. 24B is a diagram illustrating an operation of setting a workspace through an external electronic device connected to a wearable electronic device according to an embodiment of the disclosure.

Figure 24C:
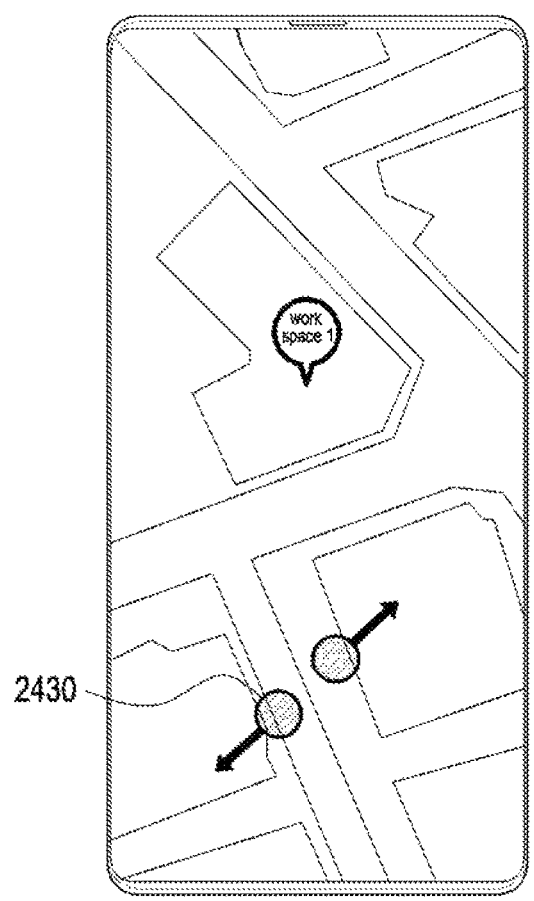
FIG. 24C is a diagram illustrating an operation of setting a workspace through an external electronic device connected to a wearable electronic device according to an embodiment.

FIG. 24C is a diagram illustrating an operation of setting a workspace through an external electronic device connected to a wearable electronic device according to an embodiment of the disclosure.

Figure 24D:
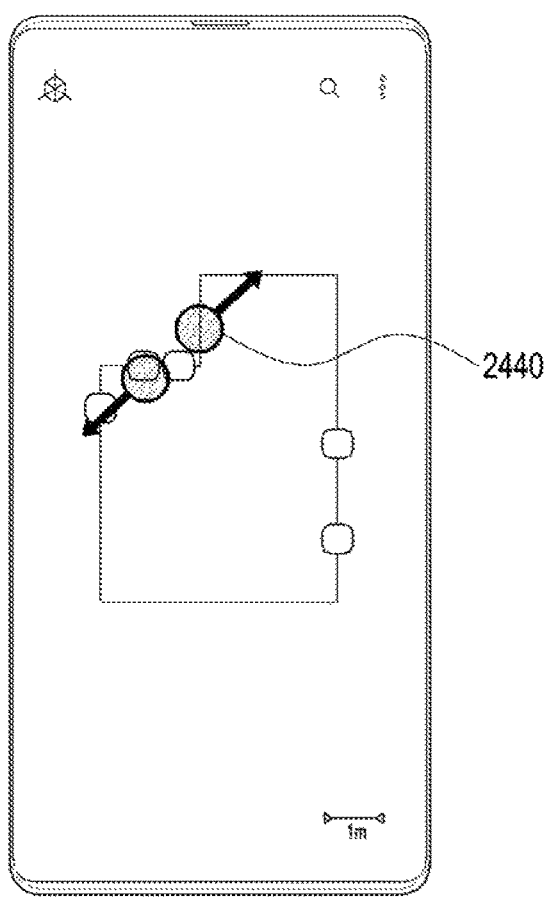
FIG. 24D is a diagram illustrating an operation of setting a workspace through an external electronic device connected to a wearable electronic device according to an embodiment.

FIG. 24D is a diagram illustrating an operation of setting a workspace through an external electronic device connected to a wearable electronic device according to an embodiment of the disclosure.

Figure 24E:
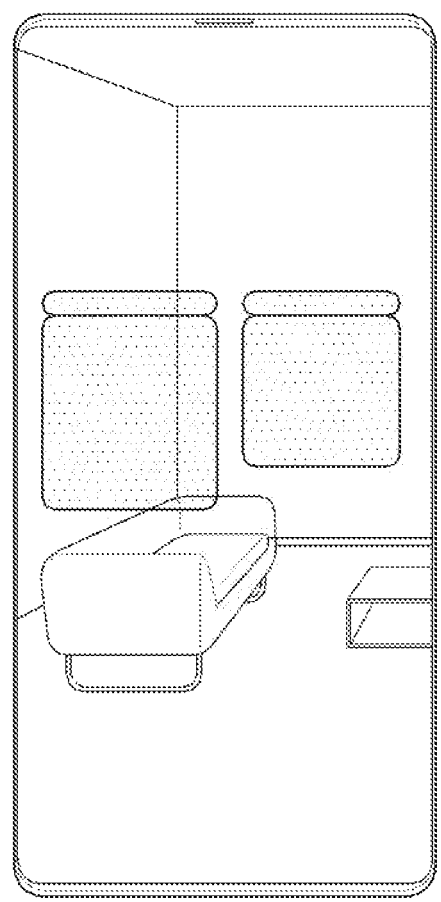
FIG. 24E is a diagram illustrating an operation of setting a workspace through an external electronic device connected to a wearable electronic device according to an embodiment.

FIG. 24E is a diagram illustrating an operation of setting a workspace through an external electronic device connected to a wearable electronic device according to an embodiment of the disclosure.

Figure 24F:
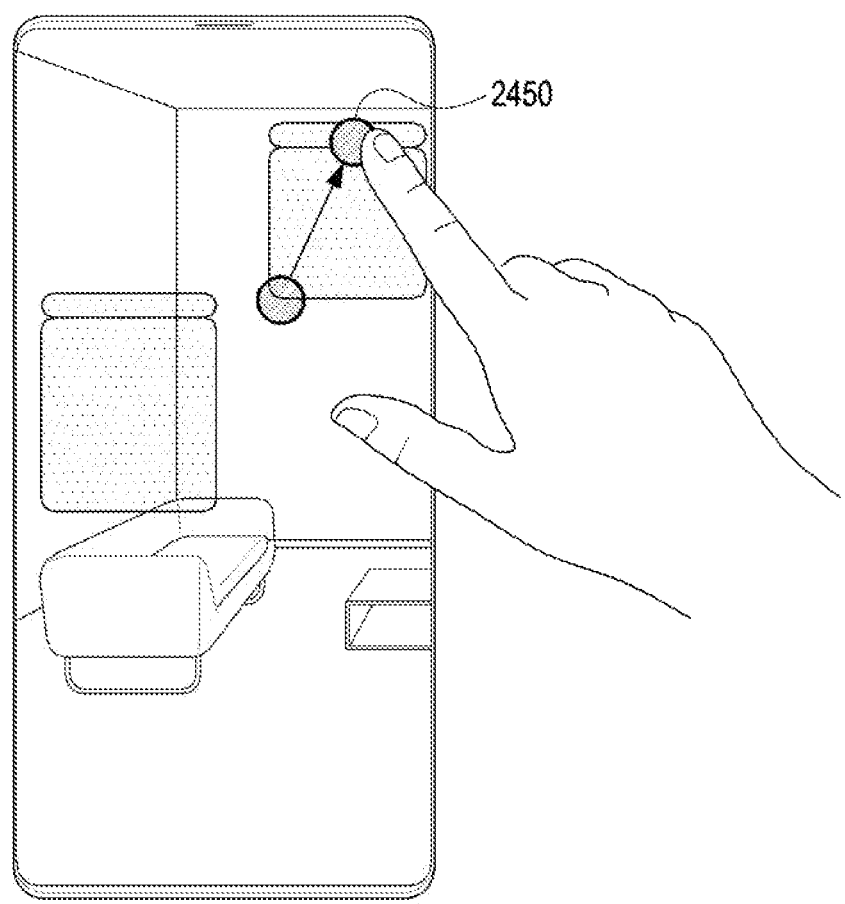
FIG. 24F is a diagram illustrating an operation of setting a workspace through an external electronic device connected to a wearable electronic device according to an embodiment.

FIG. 24F is a diagram illustrating an operation of setting a workspace through an external electronic device connected to a wearable electronic device according to an embodiment of the disclosure.

According to an embodiment, referring to FIG. 24A, an external electronic device (e.g., the electronic device 104 of FIG. 1) may display a stored workspace on a map, based on information about a location for which the workspace has been stored. According to an embodiment, upon receipt of a user input 2410 for zooming, for example zooming in, on the map, the external electronic device may display the stored workspace on an enlarged map, as illustrated in FIG. 24B.

According to an embodiment, referring to FIG. 24B, upon receipt of a user input 2420 for zooming, for example zooming in, again on the enlarged map, the external electronic device (e.g., the electronic device 104 of FIG. 1) may display the stored workspace on a more enlarged map, as illustrated in FIG. 24C.

According to an embodiment, referring to FIG. 24C, upon further receipt of a user input 2430 for zooming, for example zooming in, on a map enlarged by a predetermined multiple, the external electronic device (e.g., the electronic device 104 of FIG. 1) may display the shape of the space of the stored workspace and the arrangement of a plurality of virtual objects, as illustrated in FIG. 24D.

According to an embodiment, referring to FIG. 24D, upon further receipt of a user input 2440 for zooming, for example zooming in, on the map on which the spatial form of the workspace and the arrangement of the plurality of virtual objects, the external electronic device (e.g., the electronic device 104 of FIG. 1) may display a real space and virtual objects disposed in the real space, as illustrated in FIG. 24E.

According to an embodiment, referring to FIG. 24F, upon receipt of a drag input 2450 for selecting and moving a virtual object disposed in the real space, the external electronic device (e.g., the electronic device 104 of FIG. 1) may change the position of the selected virtual object based on the drag input.

In this manner, even though the user does not wear a wearable electronic device, the user may modify a stored workspace through an external electronic device.

Figure 25A:
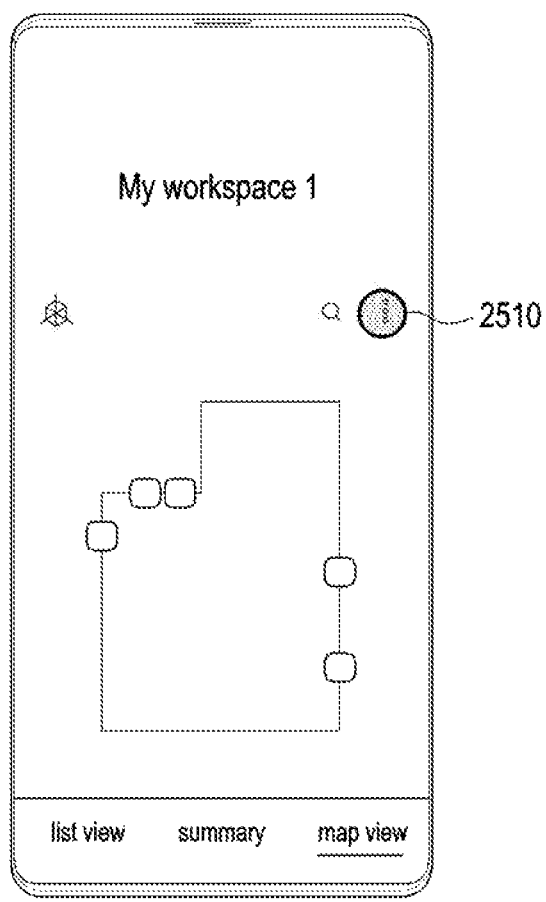
FIG. 25A is a diagram illustrating an operation of setting a workspace through an external electronic device connected to a wearable electronic device according to an embodiment.

FIG. 25A is a diagram illustrating an operation of setting a workspace through an external electronic device connected to a wearable electronic device according to an embodiment of the disclosure.

Figure 25B:
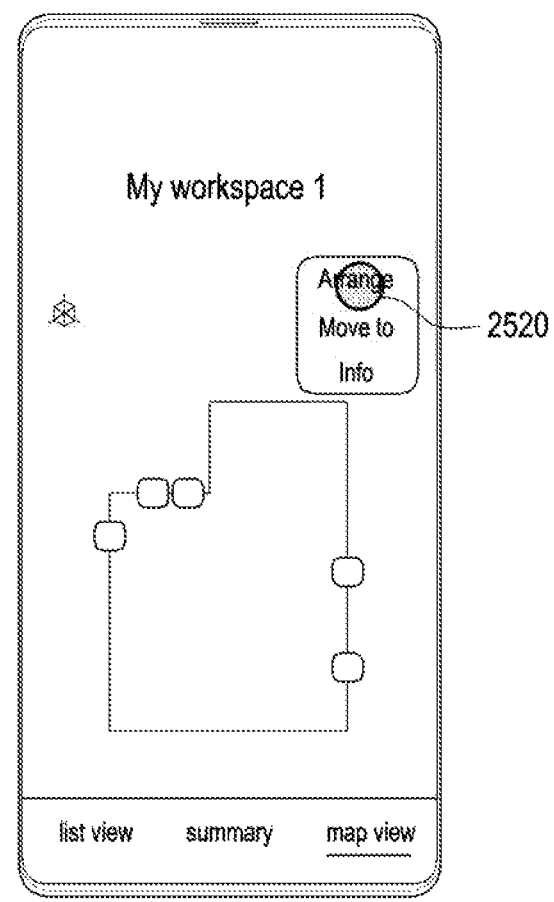
FIG. 25B is a diagram illustrating an operation of setting a workspace through an external electronic device connected to a wearable electronic device according to an embodiment.

FIG. 25B is a diagram illustrating an operation of setting a workspace through an external electronic device connected to a wearable electronic device according to an embodiment of the disclosure.

Figure 25C:
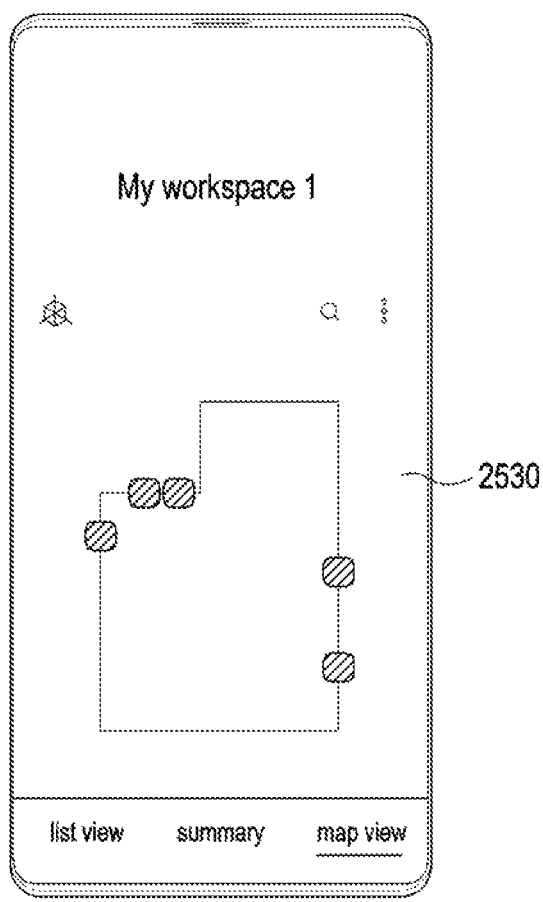
FIG. 25C is a diagram illustrating an operation of setting a workspace through an external electronic device connected to a wearable electronic device according to an embodiment.

FIG. 25C is a diagram illustrating an operation of setting a workspace through an external electronic device connected to a wearable electronic device according to an embodiment of the disclosure.

Figure 25D:
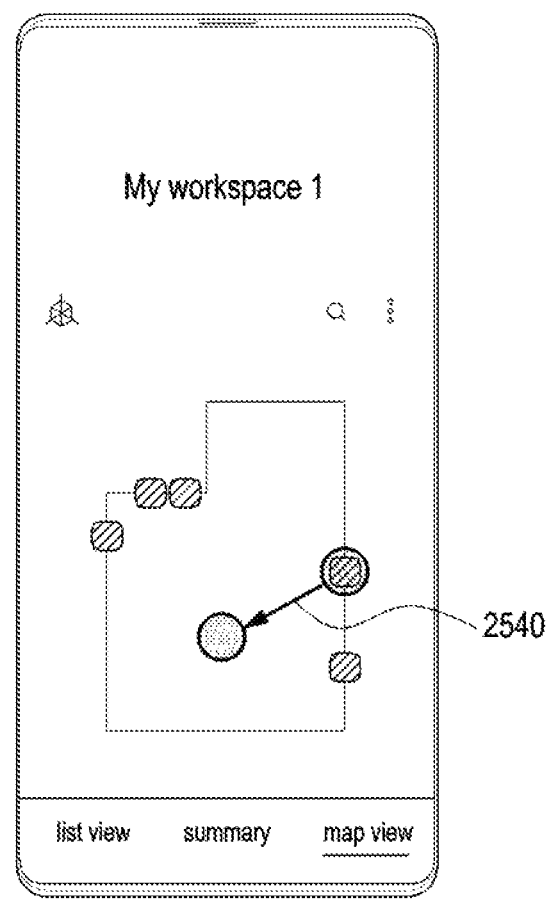
FIG. 25D is a diagram illustrating an operation of setting a workspace through an external electronic device connected to a wearable electronic device according to an embodiment.

FIG. 25D is a diagram illustrating an operation of setting a workspace through an external electronic device connected to a wearable electronic device according to an embodiment of the disclosure.

Figure 25E:
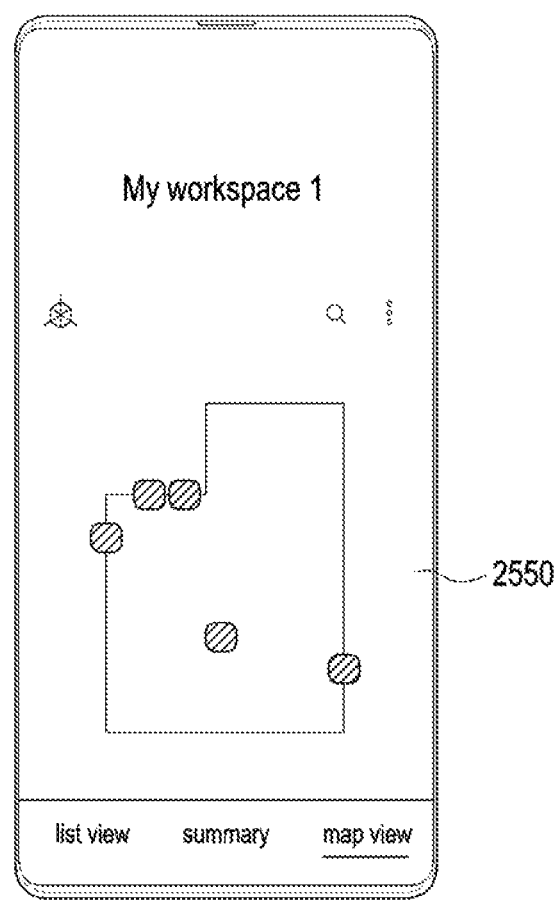
FIG. 25E is a diagram illustrating an operation of setting a workspace through an external electronic device connected to a wearable electronic device according to an embodiment.

FIG. 25E is a diagram illustrating an operation of setting a workspace through an external electronic device connected to a wearable electronic device according to an embodiment of the disclosure.

According to an embodiment, referring to FIG. 25A, upon receipt of a user input for selecting workspace 1, an external electronic device (e.g., the electronic device 104 of FIG. 1) may display information about workspace 1. For example, the external electronic device may display the shape of a space for which workspace 1 has been stored and the arrangement of virtual objects.

According to an embodiment, upon receipt of a user input for selecting a button 2510 for modifying workspace 1, the external electronic device may display a modification item list, as illustrated in FIG. 25B.

According to an embodiment, referring to FIG. 25B, upon receipt of a user input for selecting an item 2520 for modifying the arrangement of the virtual objects in the modification item list, the external electronic device (e.g., the electronic device 104 of FIG. 1) may display a screen 2530 indicating that the virtual objects are activated for modification, as illustrated in FIG. 25C.

According to an embodiment, referring to FIG. 25D, upon receipt of a user input 2540 for selecting and moving one of the plurality of activated virtual objects, the external electronic device (e.g., the electronic device 104 of FIG. 1) may display a screen 2550 including a modified arrangement of the plurality of virtual objects, as illustrated in FIG. 25E.

In this manner, even though the user does not wear a wearable electronic device, the user may modify a stored workspace through an external electronic device.

Figure 26A:
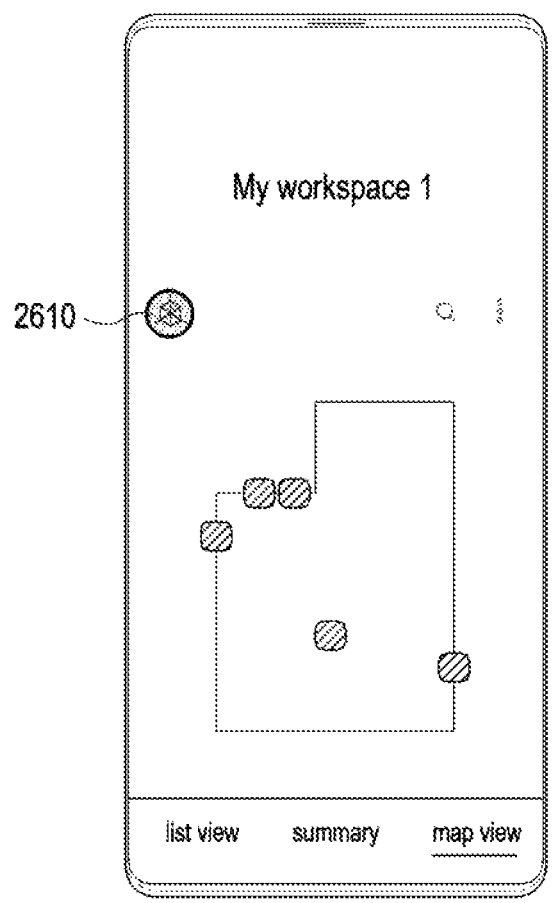
FIG. 26A is a diagram illustrating an operation of setting a workspace through an external electronic device connected to a wearable electronic device according to an embodiment.

FIG. 26A is a diagram illustrating an operation of setting a workspace through an external electronic device connected to a wearable electronic device according to an embodiment of the disclosure.

Figure 26B:
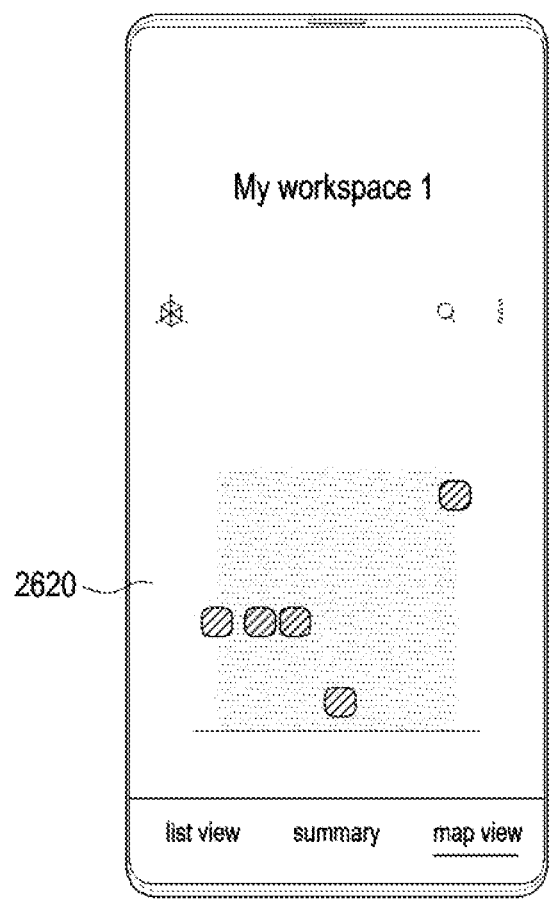
FIG. 26B is a diagram illustrating an operation of setting a workspace through an external electronic device connected to a wearable electronic device according to an embodiment.

FIG. 26B is a diagram illustrating an operation of setting a workspace through an external electronic device connected to a wearable electronic device according to an embodiment of the disclosure.

According to an embodiment, referring to FIG. 26A, upon receipt of a user input for selecting workspace 1, an external electronic device (e.g., the electronic device 104 of FIG. 1) may display information about workspace 1. For example, the external electronic device may display the shape of a space for which workspace 1 has been stored and the arrangement of virtual objects.

According to an embodiment, upon receipt of a user input for selecting a button 2610 to change the viewpoint of workspace 1, the external electronic device may change and display the viewpoint of workspace 1, as illustrated in FIG. 26B. For example, the external electronic device may display a screen 2620 in a bird's eye view in which the space is seen from above, switched from a front view in which the space is seen from the front.

Figure 27A:
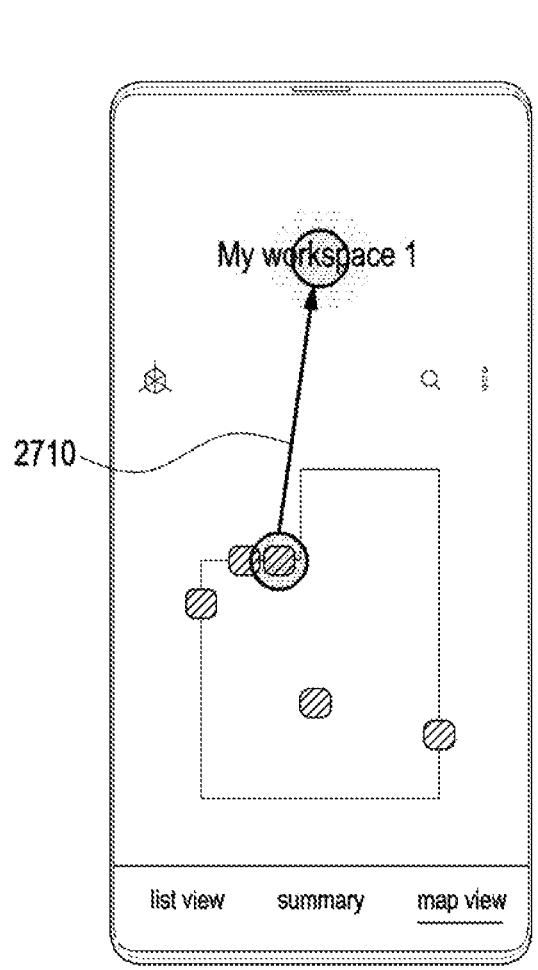
FIG. 27A is a diagram illustrating an operation of setting a workspace through an external electronic device connected to a wearable electronic device according to an embodiment.

FIG. 27A is a diagram illustrating an operation of setting a workspace through an external electronic device connected to a wearable electronic device according to an embodiment of the disclosure.

Figure 27B:
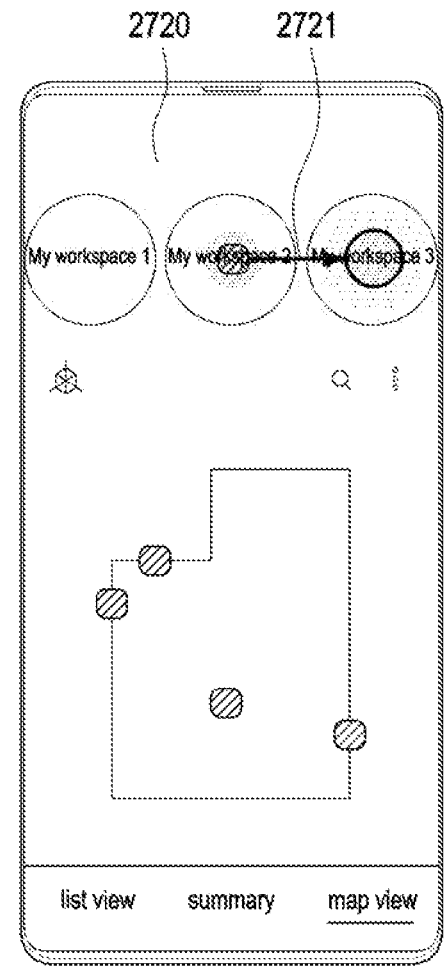
FIG. 27B is a diagram illustrating an operation of setting a workspace through an external electronic device connected to a wearable electronic device according to an embodiment.

FIG. 27B is a diagram illustrating an operation of setting a workspace through an external electronic device connected to a wearable electronic device according to an embodiment of the disclosure.

Figure 27C:
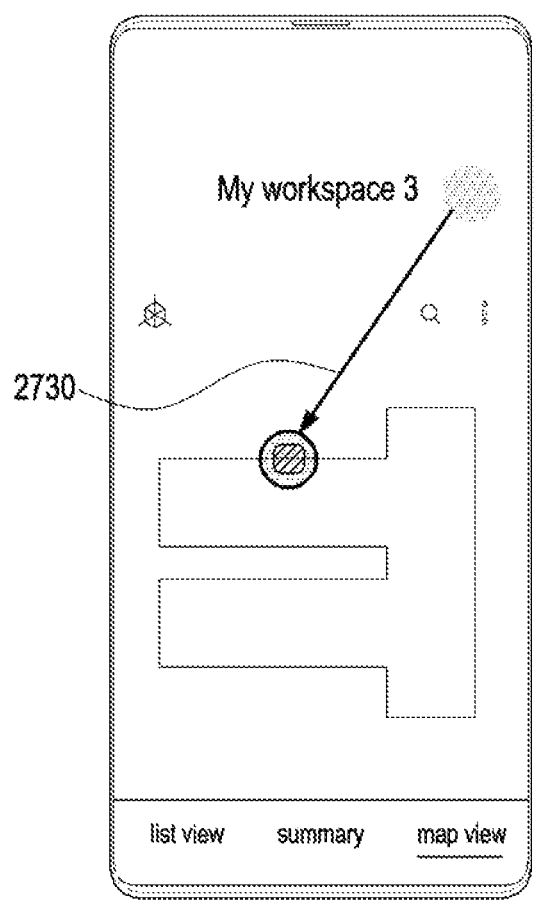
FIG. 27C is a diagram illustrating an operation of setting a workspace through an external electronic device connected to a wearable electronic device according to an embodiment.

FIG. 27C is a diagram illustrating an operation of setting a workspace through an external electronic device connected to a wearable electronic device according to an embodiment of the disclosure.

Figure 27D:
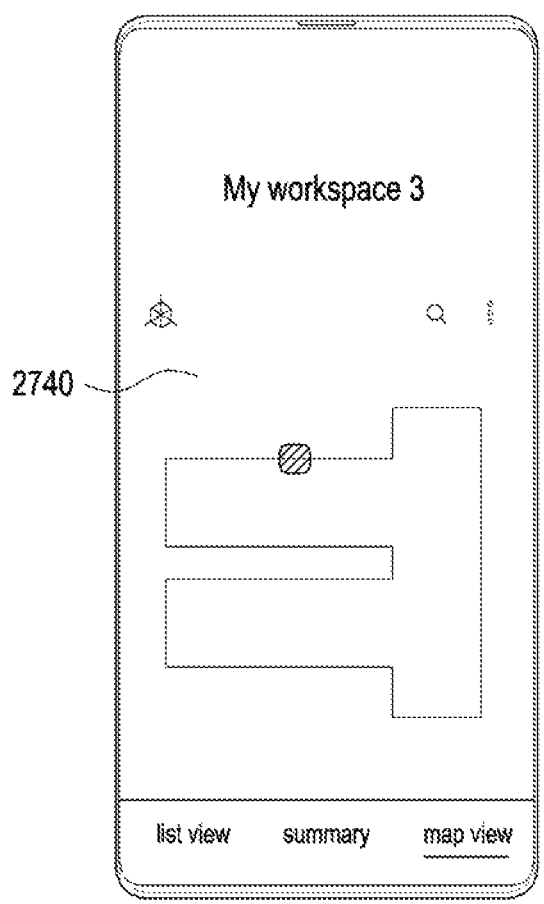
FIG. 27D is a diagram illustrating an operation of setting a workspace through an external electronic device connected to a wearable electronic device according to an embodiment.

FIG. 27D is a diagram illustrating an operation of setting a workspace through an external electronic device connected to a wearable electronic device according to an embodiment of the disclosure.

According to an embodiment, referring to FIG. 27A, upon receipt of a user input for selecting workspace 1, an external electronic device (e.g., the electronic device 104 of FIG. 1) may display information about workspace 1. For example, the external electronic device may display the shape of a space for which workspace 1 has been stored and the arrangement of virtual objects.

According to an embodiment, upon receipt of a user input 2710 for selecting one of a plurality of virtual objects and moving the selected virtual object to the position of a workspace title area, 'workspace 1', the external electronic device may change the workspace title area from 'workspace 1' to a changed screen 2720 in which a plurality of stored workspaces may be displayed.

According to an embodiment, referring to FIG. 27B, upon receipt of a drag input 2721 for moving the selected virtual object to workspace 3 that is one of the plurality of displayed workspaces, the external electronic device (e.g., the electronic device 104 of FIG. 1) may display information about workspace 3, as illustrated in FIG. 27C. For example, the external electronic device may display the shape of a space for which workspace 3 has been stored and the arrangement of virtual objects.

According to an embodiment, referring to FIG. 27C, upon receipt of a user input 2730 for arranging the selected virtual object in the space for which workspace 3 has been stored, the external electronic device (e.g., the electronic device 104 of FIG. 1) may display a screen 2740 in which the virtual object is arranged in the form of the space for which workspace 3 has been stored, as illustrated in FIG. 27D.

As such, even though the user does not wear a wearable electronic device, the user may modify a stored workspace by using a virtual object stored in another workspace through an external electronic device.

Figure 28A:
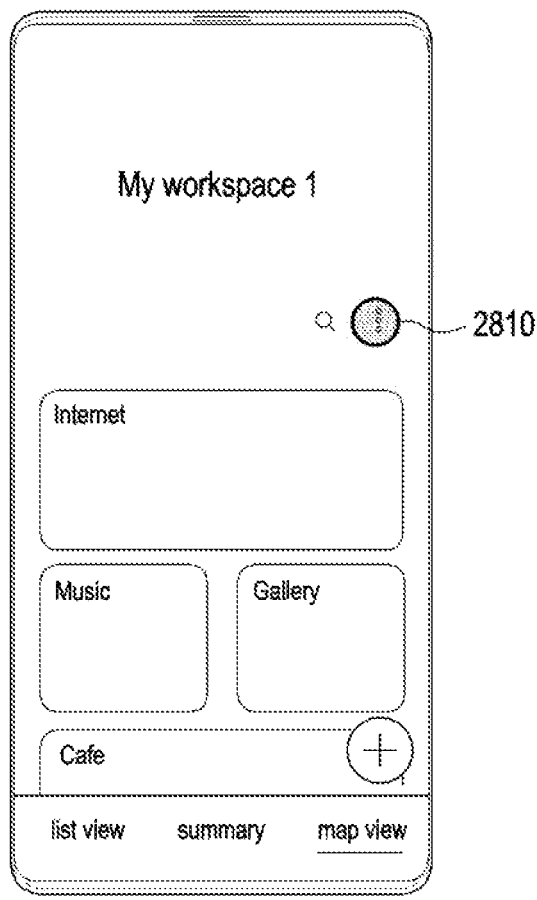
FIG. 28A is a diagram illustrating an operation of setting a workspace through an external electronic device connected to a wearable electronic device according to an embodiment.

FIG. 28A is a diagram illustrating an operation of setting a workspace through an external electronic device connected to a wearable electronic device according to an embodiment of the disclosure.

Figure 28B:
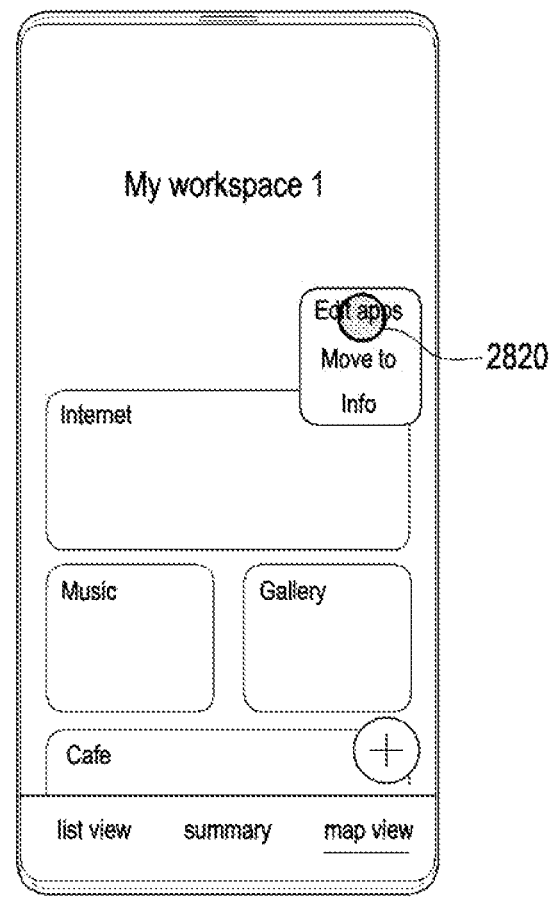
FIG. 28B is a diagram illustrating an operation of setting a workspace through an external electronic device connected to a wearable electronic device according to an embodiment.

FIG. 28B is a diagram illustrating an operation of setting a workspace through an external electronic device connected to a wearable electronic device according to an embodiment of the disclosure.

Figure 28C:
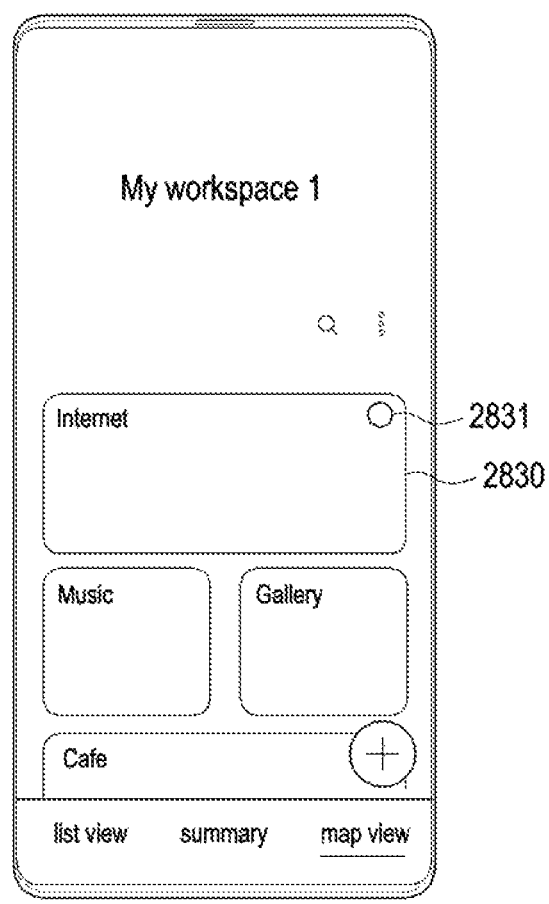
FIG. 28C is a diagram illustrating an operation of setting a workspace through an external electronic device connected to a wearable electronic device according to an embodiment.

FIG. 28C is a diagram illustrating an operation of setting a workspace through an external electronic device connected to a wearable electronic device according to an embodiment of the disclosure.

According to an embodiment, referring to FIG. 28A, upon receipt of a user input for selecting workspace 1, an external electronic device (e.g., the electronic device 104 of FIG. 1) may display information about workspace 1. For example, the external electronic device may display thumbnails of applications executed in workspace 1.

According to an embodiment, upon receipt of a user input for selecting a button 2810 to modify workspace 1, the external electronic device may display a modification item list, as illustrated in FIG. 28B.

According to an embodiment, referring to FIG. 28B, upon receipt of a user input for selecting an item 2820 for editing applications from the modification item list, the external electronic device (e.g., the electronic device 104 of FIG. 1) may display a screen 2830 for selecting an application to be edited among a plurality of applications, as illustrated in FIG. 28C. For example, the screen 2830 for selecting an application to be edited may include an object 2831 indicating a selected application among the plurality of applications.

Figure 29:
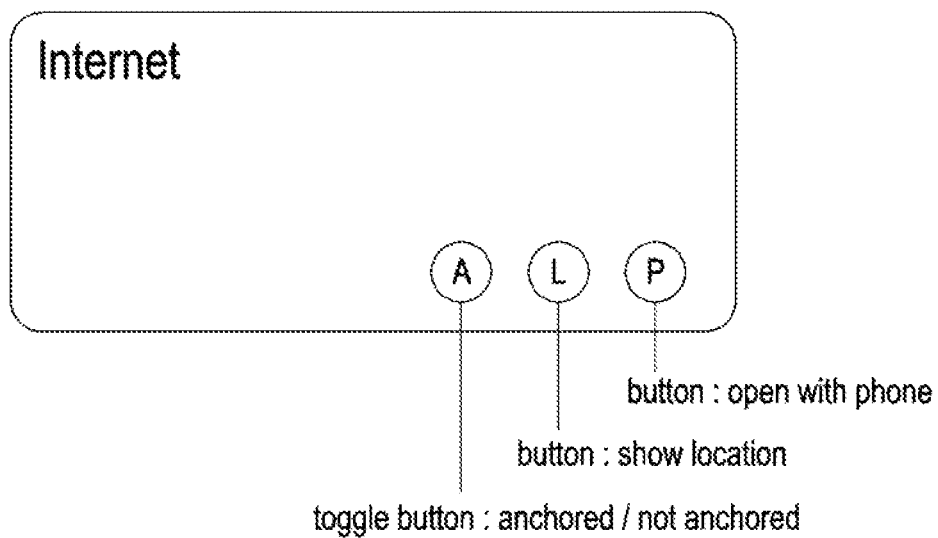
FIG. 29 is a diagram illustrating a workspace-related screen displayed through an external electronic device connected to a wearable electronic device according to an embodiment.

FIG. 29 is a diagram illustrating a screen related to a workspace displayed through an external electronic device connected to a wearable electronic device according to an embodiment of the disclosure.

According to an embodiment, referring to FIG. 29, the external electronic device (e.g., the electronic device 104 of FIG. 1) may further display a plurality of buttons on the thumbnails of the plurality of applications executed in the selected workspace. For example, the plurality of buttons include at least one of button A indicating whether a virtual object corresponding to a corresponding application (e.g., an Internet application) is anchored to a real object, button L for viewing the position of the application, or button P for executing the application in the external electronic device.

As such, the external electronic device may further display a plurality of buttons related to an application on the thumbnail of the application, thereby providing information about a virtual object, even though the user does not wear a wearable electronic device.

Figure 30:
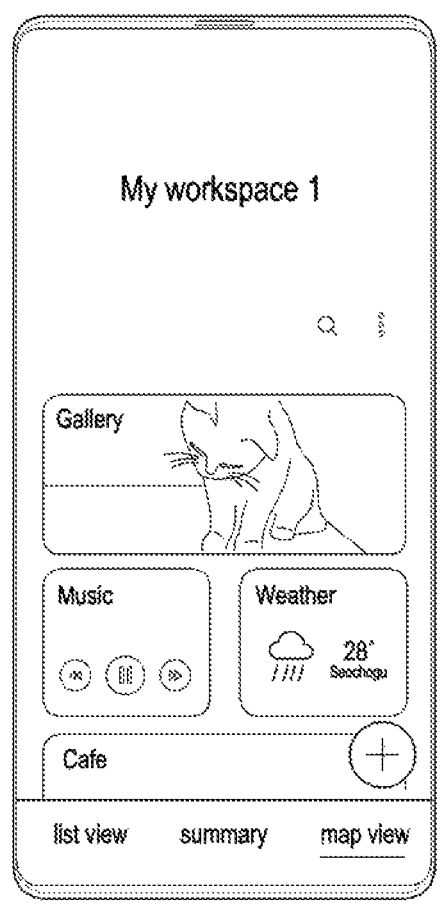
FIG. 30 is a diagram illustrating a workspace-related screen displayed through an external electronic device connected to a wearable electronic device according to an embodiment.

FIG. 30 is a diagram illustrating a screen related to a workspace displayed through an external electronic device connected to a wearable electronic device according to an embodiment of the disclosure.

According to an embodiment, referring to FIG. 30, an external electronic device (e.g., the electronic device 104 of FIG. 1) may provide thumbnails of a plurality of applications included in a selected workspace based on the types of the applications. For example, the external electronic device may display the thumbnail of a gallery application as a photo based on the gallery application being for viewing content, display the thumbnail of a music application as a playback user interface (UI) based on the music application being for providing media, and display the thumbnail of a weather application as summarized weather information based on the weather application being for providing weather information.

Figure 31:
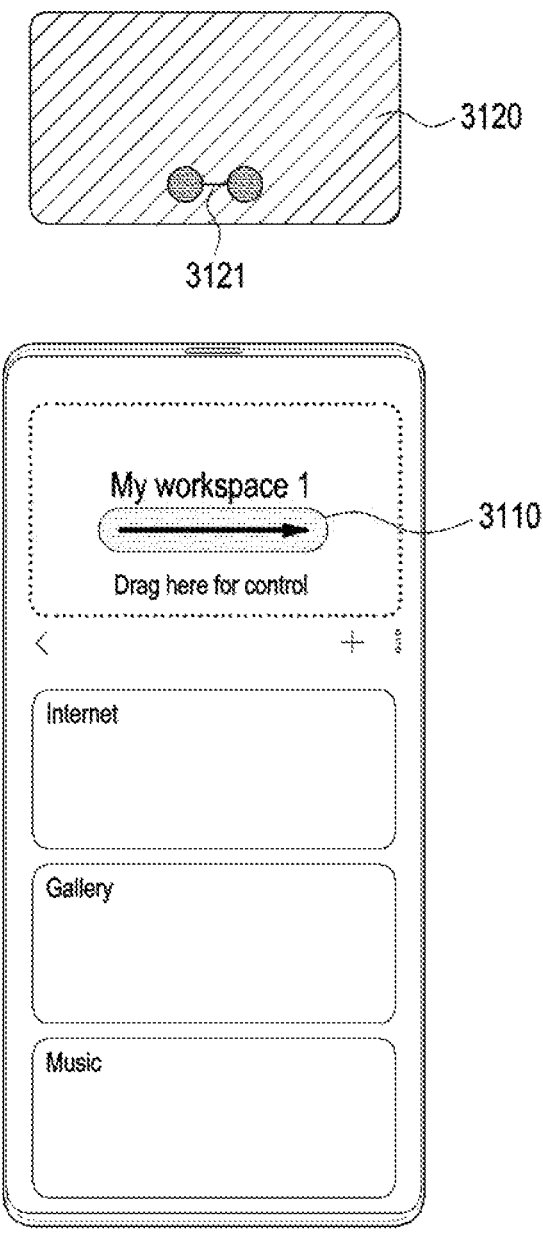
FIG. 31 is a diagram illustrating an operation of setting a workspace through an external electronic device connected to a wearable electronic device according to an embodiment.

FIG. 31 is a diagram illustrating an operation of setting a workspace through an external electronic device connected to a wearable electronic device according to an embodiment of the disclosure. For example, FIG. 31 illustrates an operation when a user input is performed through an external electronic device during use of the wearable electronic device.

According to an embodiment, referring to FIG. 31, upon receipt of a user input for selecting workspace 1, an external electronic device (e.g., the electronic device 104 of FIG. 1) may display information about workspace 1. For example, the external electronic device may display thumbnails of applications included in workspace 1.

According to an embodiment, upon receipt of a user input 3110 for dragging from left to right in the title area of workspace 1, the external electronic device may transmit information related to the drag input to a wearable electronic device (e.g., the electronic device 101 of FIG. 1).

According to an embodiment, the wearable electronic device may move a virtual object that the user is gazing at from left to right on a display (e.g., the display module 160 of FIG. 1) based on the information related to the drag input received from the external electronic device, as indicated by reference numeral 3121.

For example, the starting point of the drag input may serve as a reference point, and the virtual object may be moved based on the direction of the external electronic device in a three-dimensional (3D) space and the movement path of the drag. According to an embodiment, although the user input is received through the touch screen of the external electronic device, which is a two-dimensional (2D) plane, the virtual object may be moved in the 3D space.

According to an embodiment, a wearable electronic device (e.g., the electronic device 101 of FIG. 1) may include a display (e.g., the display module 160 of FIG. 1), a camera (e.g., the camera module 180 of FIG. 1), at least one sensor (e.g., the sensor module 176 of FIG. 1), memory (e.g., the memory 130 of FIG. 1), and at least one processor (e.g., the processor 120 of FIG. 1). The at least one processor may be configured to, upon receipt of a first user input for executing a workspace of a first space, stored in the memory in a second space different from the first space through the camera, obtain spatial information about the second space using the at least one sensor, wherein the workspace including at least one virtual object, and display at least one virtual object included in the workspace of the first space on the display, based on the spatial information about the second space.

According to an embodiment, the workspace of the first space may be obtained based on a second user input for disposing or positioning at least one virtual object corresponding respectively to at least one application in the first space, and the second user input for disposing or positioning the at least one virtual object in the first space may include at least one of a gesture input received through the camera or a user input received through an external electronic device connected to the wearable electronic device.

According to an embodiment, the spatial information about the second space may include information about a space available to a user, and the at least one processor may be configured to obtain the information about the space available to the user based on at least one of distances to a plurality of objects included in the second space or sizes of at least some of the plurality of objects through the at least one sensor.

According to an embodiment, the at least one processor may be configured to, when a size of the space available to the user is less than a specified value based on the information about the space available to the user, change at least one of a size, a shape, or a position of a virtual object included in the workspace of the first space, and display the changed virtual object on the display.

According to an embodiment, the at least one processor may be configured to, upon receipt of a third user input for selecting one object from among a plurality of objects included in the second space as a reference object for executing the workspace of the first space, dispose or position the at least one virtual object included in the workspace of the first space based on the reference object.

According to an embodiment, the at least one processor may be configured to, based on determining that the at least one virtual object includes a non-displayable virtual object which is not displayable in the second space, display a different virtual object related to the non-displayable virtual object at a position corresponding to the non-displayable virtual object.

According to an embodiment, the at least one processor may be configured to identify or determine that the non-displayable virtual object is not displayable in the second space, when at least one application corresponding to the workspace of the first space is not executable in the second space, or when a real object to which the non-displayable virtual object is intended to be anchored is not included in the second space.

According to an embodiment, the at least one processor may be configured to, based on a first function of an application executed in the workspace of the first space being mapped to the first space, and a second function of the application being mapped to the second space, display a virtual object related to the second function instead of a virtual object related to the first function.

According to an embodiment, the at least one processor may be configured to change at least one of a size or a shape of the at least one virtual object based on the spatial information about the second space, and display the changed virtual object on the display.

According to an embodiment, the at least one processor may be configured to change a position of the at least one virtual object based on the spatial information about the second space, and display the at least one virtual object at the changed position on the display.

According to an embodiment, a method of controlling a wearable electronic device may include, upon receipt of a first user input for executing a workspace corresponding to a first space in a second space different from the first space through a camera, the workspace being stored in a memory, obtaining spatial information about the second space using at least one sensor, and displaying at least one virtual object included in the workspace of the first space on a display, based on the spatial information about the second space.

According to an embodiment, the workspace of the first space may be obtained based on a second user input for disposing or positioning the at least one virtual object in the first space, the at least one virtual object corresponding to at least one application, and the second user input for disposing the at least one virtual object in the first space may include at least one of a gesture input received through the camera and a user input received through an external electronic device connected to the wearable electronic device.

According to an embodiment, the spatial information about the second space may include information about a space available to a user, and the method may further include obtaining the information about the space available to the user based on at least one of distances to a plurality of objects included in the second space and sizes of at least some of the plurality of objects.

According to an embodiment, displaying the at least one virtual object on the display may include, when a size of the space available to the user is less than a specified value based on the information about the space available to the user, changing at least one of a size, a shape, or a position of a virtual object included in the workspace of the first space, and displaying the changed virtual object on the display.

According to an embodiment, the method may further include, upon receipt of a third user input for selecting one object from among a plurality of objects included in the second space as a reference object for executing the workspace of the first space, disposing or positioning the at least one virtual object included in the workspace of the first space based on the reference object.

According to an embodiment, displaying the at least one virtual object on the display may include, based on determining that the at least one virtual object includes a non-displayable virtual object which is not displayable in the second space, displaying a different virtual object related to the non-displayable virtual object at a position corresponding to the non-displayable virtual object.

According to an embodiment, displaying the at least one virtual object on the display may include identifying or determining that the non-displayable virtual object is not displayable in the second space, when at least one application corresponding to the workspace of the first space is not executable in the second space, or when a real object to which the non-displayable virtual object included in the workspace of the first space is intended to be anchored is not included in the second space.

According to an embodiment, displaying the at least one virtual object on the display may include, based on a first function of an application executed in the workspace of the first space being mapped to the first space, and a second function of the application being mapped to the second space, displaying a virtual object related to the second function instead of a virtual object related to the first function.

According to an embodiment, displaying the at least one virtual object on the display may include changing at least one of a size or a shape of the at least one virtual object included in the workspace of the first space based on the spatial information about the second space, and displaying the changed virtual object on the display.

According to an embodiment, displaying the at least one virtual object on the display may include changing a position of the at least one virtual object included in the workspace of the first space based on the spatial information about the second space, and displaying the virtual object at the changed position on the display.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", or "connected to" another element (e.g., a second element), this may mean that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A wearable electronic device comprising:
    a display;
    a camera;
    at least one sensor;
    at least one processor; and
    memory storing instructions that, when executed by the at least one processor individually or collectively, cause the wearable electronic device to:
        based on receiving, through the camera, a first user input selecting a workspace corresponding to a first space to be executed in a second space different from the first space, obtain spatial information about the second space using the at least one sensor, wherein the workspace is stored in the memory and includes at least one virtual object having a first spatial relationship with a first real object that is included in the first space and is not included in the second space, wherein the at least one virtual object includes an execution screen of a first application,
        detect a second real object that is included in the second space and is not included in the first space,
        determine a second spatial relationship between the at least one virtual object and the second real object based on the spatial information about the second space and information about the first spatial relationship,
        determine whether the at least one virtual object is displayable in the second space, and
        when the at least one virtual object is not displayable in the second space, display the at least one virtual object including an execution screen of a second application different from the first application or a widget screen stored in the memory, instead of the execution screen of the first application, on the display, based on the determined second spatial relationship.

2. The wearable electronic device of claim 1, wherein the workspace is obtained based on a second user input for positioning the at least one virtual object in the first space, the at least one virtual object corresponding to at least one application, and
    wherein the second user input includes at least one of a gesture input received through the camera or a user input received through an external electronic device connected to the wearable electronic device.

3. The wearable electronic device of claim 1, wherein the spatial information about the second space includes information about a space available to a user, and
    wherein the instructions, when executed by the at least one processor individually or collectively, cause the wearable electronic device to, obtain the information about the space available to the user based on at least one of distances to a plurality of objects included in the second space or sizes of at least some of the plurality of objects.

4. The wearable electronic device of claim 3, wherein the instructions, when executed by the at least one processor individually or collectively, cause the wearable electronic device to, based on a size of the space available to the user being less than a specified value based on the information about the space available to the user, change at least one of a size, a shape, or a position of a virtual object included in the workspace, and display the changed virtual object on the display.

5. The wearable electronic device of claim 1, wherein the instructions, when executed by the at least one processor individually or collectively, cause the wearable electronic device to, based on receiving a third user input for selecting an object from among a plurality of objects included in the second space as a reference object for executing the workspace, position the at least one virtual object based on the reference object.

6. The wearable electronic device of claim 1, wherein the instructions, when executed by the at least one processor individually or collectively, cause the wearable electronic device to, based on a first function of an application executed in the workspace being mapped to the first space, and a second function of the application being mapped to the second space, display a virtual object related to the second function instead of a virtual object related to the first function.

7. The wearable electronic device of claim 1, wherein the instructions, when executed by the at least one processor individually or collectively, cause the wearable electronic device to, change at least one of a size or a shape of the at least one virtual object based on the spatial information about the second space, and display the changed virtual object on the display.

8. The wearable electronic device of claim 1, wherein the instructions, when executed by the at least one processor individually or collectively, cause the wearable electronic device to, change a position the at least one virtual object based on the spatial information about the second space, and display the at least one virtual object at the changed position on the display.

9. A non-transitory storage medium storing one or more programs, the one or more programs comprising computer-executable instructions which, when executed by at least one processor of a wearable electronic device, cause the wearable electronic device to:
    based on receiving, through a camera, a first user input selecting a workspace corresponding to a first space to be executed in a second space different from the first space, the workspace being stored in a memory and including at least one virtual object having a first spatial relationship with a real object that is included in the first space and is not included in the second space, obtain spatial information about the second space using at least one sensor, wherein the at least one virtual object includes an execution screen of a first application;
    detect a second real object that is included in the second space and is not included in the first space;
    determine a second spatial relationship between the at least one virtual object and the second real object based on the spatial information about the second space and information about the first spatial relationship; and determine whether the at least one virtual object is displayable in the second space, when the at least one virtual object is not displayable in the second space, display the at least one virtual object including an execution screen of a second application different from the first application or a widget screen in the memory of the wearable electronic device, instead of the execution screen of the first application, on a display of the wearable electronic device, based on the determined second spatial relationships.

10. The method of claim 9, wherein the workspace is obtained based on a second user input for positioning the at least one virtual object in the first space, the at least one virtual object corresponding to at least one application, and wherein the second user input includes at least one of a gesture input received through the camera or a user input received through an external electronic device connected to the wearable electronic device.

11. The method of claim 9, wherein the spatial information about the second space includes information about a space available to a user, and wherein the method further comprises obtaining the information about the space available to the user based on at least one of distances to a plurality of objects included in the second space or sizes of at least some of the plurality of objects.

12. The method of claim 11, wherein the instructions, when executed by the at least one processor of the wearable device, cause the wearable electronic device to, based on a size of the space available to the user being less than a specified value based on the information about the space available to the user, change at least one of a size, a shape, or a position of a virtual object included in the workspace, and displaying the changed virtual object on the display.

13. The method of claim 9, wherein the instructions, when executed by the at least one processor of the wearable device, cause the wearable electronic device to, based on receiving a third user input for selecting an object from among a plurality of objects included in the second space as a reference object for executing the workspace, position the at least one virtual object based on the reference object.

14. The method of claim 9, wherein the instructions, when executed by the at least one processor of the wearable device, cause the wearable electronic device to, based on a first function of an application executed in the workspace being mapped to the first space, and a second function of the application being mapped to the second space, display a virtual object related to the second function instead of a virtual object related to the first function.

15. The method of claim 9, wherein the instructions, when executed by the at least one processor of the wearable device, cause the wearable electronic device to change at least one of a size or a shape of the at least one virtual object based on the spatial information about the second space, and displaying the changed virtual object on the display.

16. The method of claim 9, wherein the instructions, when executed by the at least one processor of the wearable device, cause the wearable electronic device to change a position of the at least one virtual object based on the spatial information about the second space, and displaying the at least one virtual object at the changed position on the display.

* * * * *